US008016596B2

(12) United States Patent
Blank

(10) Patent No.: US 8,016,596 B2
(45) Date of Patent: Sep. 13, 2011

(54) LITERACY SYSTEM

(76) Inventor: Marion S. Blank, Tenafly, NJ (US)

( * ) Notice: Subject to any disclaimer, the term of this patent is extended or adjusted under 35 U.S.C. 154(b) by 29 days.

(21) Appl. No.: 11/581,894

(22) Filed: Oct. 17, 2006

(65) Prior Publication Data
US 2007/0048696 A1    Mar. 1, 2007

Related U.S. Application Data

(63) Continuation of application No. 10/350,849, filed on Jan. 24, 2003, now abandoned.

(60) Provisional application No. 60/362,749, filed on Mar. 7, 2002.

(51) Int. Cl.
*G09B 19/00* (2006.01)
(52) U.S. Cl. ........................................................ 434/156
(58) Field of Classification Search .................. 434/156, 434/157, 167, 169
See application file for complete search history.

(56) References Cited

U.S. PATENT DOCUMENTS

| | | | |
|---|---|---|---|
| 2,193,048 A | 3/1940 | Vander Velde | |
| 2,361,154 A | 10/1944 | Schoolfield | |
| 3,363,336 A * | 1/1968 | Skinner ........................ | 434/162 |
| 3,774,318 A | 11/1973 | Sterriti | |
| 4,437,837 A | 3/1984 | Schnettler et al. | |
| 4,713,008 A | 12/1987 | Stocker et al. | |
| 5,057,020 A | 10/1991 | Cytanovich | |
| 5,405,153 A | 4/1995 | Hauck | |
| 5,429,513 A | 7/1995 | Diaz-Plaza | |
| 5,451,163 A | 9/1995 | Black | |
| 5,649,826 A * | 7/1997 | West et al. ..................... | 434/157 |
| 5,735,693 A | 4/1998 | Groiss | |
| 5,788,503 A | 8/1998 | Shapiro et al. | |
| 5,893,717 A | 4/1999 | Kirsch et al. | |
| 5,920,838 A | 7/1999 | Mostow et al. | |
| 5,951,258 A | 9/1999 | Lueschow et al. | |
| 5,957,693 A | 9/1999 | Panec | |
| 6,009,397 A | 12/1999 | Siegel | |
| 6,022,222 A | 2/2000 | Guinan | |
| 6,215,901 B1 | 4/2001 | Schwartz | |
| 6,224,384 B1 | 5/2001 | Jenkins et al. | |
| 6,227,863 B1 | 5/2001 | Spector | |
| 6,254,395 B1 | 7/2001 | Breland et al. | |
| 6,261,101 B1 | 7/2001 | Benitz et al. | |
| 6,299,452 B1 | 10/2001 | Wasowicz et al. | |
| 6,302,695 B1 | 10/2001 | Rtischev et al. | |
| 6,305,942 B1 | 10/2001 | Block et al. | |
| 6,334,776 B1 | 1/2002 | Jenkins et al. | |
| 6,358,059 B1 | 3/2002 | Li | |
| 6,468,084 B1 | 10/2002 | MacMillan | |
| 6,491,524 B2 | 12/2002 | Bender | |

(Continued)

OTHER PUBLICATIONS

Blank et al. (1993) "Write Moves—A specialized pre-writing to handwriting program".

(Continued)

*Primary Examiner* — Xuan Thai
*Assistant Examiner* — Evan Page

(57) ABSTRACT

A literacy system provides teaching for reading and writing skills. In one embodiment, the literacy system may include exercises for teaching visual sequencing, motor skills, phonology, semantics, syntax, and text. The literacy system may have a pre-reading section, which includes exercises for developing visual sequencing skills and motor skills prior to teaching the skills of reading and writing words. Also, the literacy system may have a language skills section that includes exercises to collectively teach all four of the language skills of phonology, semantics, syntax, and text.

27 Claims, 99 Drawing Sheets

U.S. PATENT DOCUMENTS

| | | |
|---|---|---|
| 6,511,324 B1 * | 1/2003 | Wasowicz ..................... 434/167 |
| 6,544,039 B2 * | 4/2003 | Fiedorowicz et al. ........ 434/167 |
| 6,601,850 B1 | 8/2003 | Ross |
| 6,604,947 B1 | 8/2003 | Rai |
| 6,632,174 B1 | 10/2003 | Breznitz |
| 6,729,882 B2 | 5/2004 | Noble |
| 6,736,641 B2 | 5/2004 | Quiroz |
| 6,755,657 B1 | 6/2004 | Wasowicz |
| 6,796,798 B1 | 9/2004 | Sanocki |
| 6,954,199 B2 | 10/2005 | Soto et al. |
| 2002/0106617 A1 | 8/2002 | Hersh |
| 2002/0164563 A1 | 11/2002 | Wasowicz et al. |

OTHER PUBLICATIONS

Blank (1994) "Seeing Sequences Part II".

Blank (1996) "The Sentence Master—A Program for Success in Reading Level 3".

Shea, Gail, "Contemporary's The Write Stuff Shaping Sentence" Contemporary Books, Richmond Hill, Canada 1985.

* cited by examiner

1200

1201

| Introduction To This Level | Exercise Book 1 |

1202 — BOARDING is the first PHAT Phonics reading/writing program. Your child starts this workbook after completing Sequences in Sight & Letters to Write or if the Skills Check (in Your Guide to PHAT Phonics) shows it is the one to start with. It contains the following words:

| Content Words | 1206 | Non-Content Words |
| words that describe the world | | words that combine to form sentences |
| kid  girl  kids  girls  boy, boys | | some  a  more |

1204                                              1205

What To Do

→ In each session, teach a single word, using all the forms your child has learned (such as *boy, boys*).

→ Teach only the words your child does not already know.

→ Follow the directions on each page in carrying out the teaching.

1208 → Have a blank index card available to use when the instructions tell you to cover the words.

→ Immediately correct errors, saying, "*No, that is not right,*" then:
a) for reading errors, say the correct word & have your child repeat it.
b) for writing errors, show the correct model & have your child redo the writing.

→ Aim for 4 to 6 sessions a week. Each session lasts about 20–30 minutes.

→ When the words are completed, go to Book 1.

Target Word: kid

❓ Is It Known?

What To Do: Without showing the word, provide pencil & lined paper. Say, "Write kid." If spelling is correct, skip word & go to next word (girl). If spelling is not correct, provide pencil & have child complete both sides of page.

🔊 Savvy Sounds

What To Do: 1. Point to target word. Say, "This is kid." 2. Cover word. 3. Point to ki in 1st row below. Say, "This says ki" (kid without d). 4. Point to kid/kiss. Say, (a) "Find kid;" (b) "circle it;" (c) "say kid." Immediately correct any error. Repeat for each row.

| ki  | kid  | kiss |
|-----|------|------|
| ki  | kick | kid  |
| ki  | kid  | kiln |
| ki  | kick | kid  | kiss |
| ki  | kiln | kin  | kid  |

📁 Spot 'n Sort

What To Do: 1. Say, "Some words here say kid & some do not." 2. Point to ➔ in 1st row. Say, "Cross out any word that does NOT say kid." Make sure child works left to right across row. Immediately correct any error. Repeat for each row.

| ➔ | apple | kid   | kiss | toy  |
|---|-------|-------|------|------|
| ➔ | kid   | kid   | star | kin  |
| ➔ | kid   | star  | book | kid  |
| ➔ | kite  | kid   | sit  | kick |
| ➔ | idea  | sick  | kid  | kid  |
| ➔ | stop  | kid   | dig  | kid  |

1a                                                    Please Turn Over >>

FIG. 12B

Pick the Picture

What To Do: 1. Say, "Find the 1st picture that shows a kid." 2. "Write kid on the line under that picture." 3. "Now say kid." Immediately correct any error. Repeat for all pictures showing target word. Leave other lines free of writing.

Find 'n Fill

What To Do: 1. Point to → in 1st row. Say, "Find any word in this row that can become kid." 2. "Add the letters to make it say kid." 3. "Now say kid." 4. Make sure child works left to right across row.   Immediately correct any error. Repeat for each row.

| | | | |
|---|---|---|---|
| k _ d | s _ n | d _ d | _ i d |
| m _ t h | k _ d | b u _ | k i _ |
| s _ n | _ i d | l i _ | d _ d |
| k _ _ | k _ n | k n _ _ | k i _ |
| m _ n | k _ _ | k i _ e | _ _ d |

1b   End of Session.

FIG. 12C

Target Word: girl

? Is It Known?

What To Do: Without showing the word, provide pencil & lined paper. Say, "Write girl." If spelling is correct, skip word & go to next word (kids). If spelling is not correct, provide pencil & have child complete both sides of page.

🔊 Savvy Sounds

What To Do: 1. Point to target word. Say, "This is girl." 2. Cover word. 3. Point to gir in 1st row below. Say, "This says gir" (girl without l). 4. Point to girl/gild. Say, (a) "Find girl;" (b) "circle it;" (c) "say girl." Immediately correct any error. Repeat for each row.

| gir | girl | gild |
|-----|------|------|
| gir | gill | girl |
| gir | gift | girl |
| gir | give | girl | gig |
| gir | gird | giddy | girl |

Spot 'n Sort

What To Do: 1. Say, "Some words here say girl & some do not." 2. Point to ➔ in 1st row. Say, "Cross out any word that does NOT say girl." Make sure child works left to right across row. Immediately correct any error. Repeat for each row.

| ➔ | gate | girl | rag | girl |
|---|------|------|-----|------|
| ➔ | road | girl | little | girl |
| ➔ | guy | list | girl | girl |
| ➔ | guest | girl | grill | gaze |
| ➔ | girl | grass | girl | girl |
| ➔ | get | girl | yell | girl |

2a                                                                                              Please Turn Over >>

1241 ↘  Pick the Picture

What To Do: 1. Say, "Find the 1st picture that shows a girl." 2. "Write girl on the line under that picture." 3. "Now say girl." Immediately correct any error. Repeat for all pictures showing target word. Leave other lines free of writing.

        

———————    ———————    ———————

        

———————    ———————    ———————

1242 ↘  Find 'n Fill

What To Do: 1. Point to → in 1st row. Say, "Find any word in this row that can become girl." 2. "Add the letters to make it say girl." 3. "Now say girl." 4. Make sure child works left to right across row.   Immediately correct any error. Repeat for each row.

| | | | |
|---|---|---|---|
| ➡ gi_l | di_ _ | gi_t | g_ _l |
| ➡ t_ol | li_e | _irl | g_ _l |
| ➡ g_ve | gi_ _ | g_r_ | dir_ |
| ➡ g_st | g_ _ _ | g_ _d | gu_l |
| ➡ r_n | r_le | g_r_ | l_g |

2b            End of Session.

⊙ Target Word: some Some

1248 — [?] Is It Known?

What To Do: Without showing the word, provide pencil & lined paper. Say, "Write some." If spelling is correct, skip word & go to next word (a). If spelling is not correct, provide pencil & have child complete both sides of page.

1249 — Write In To Read

What To Do: 1. Point to target word. Say, "This is some." 2. Cover word. 3. Point to 1st line in left box below. Say, "Write some here." 4. "Read the whole thing." Immediately correct any error. Repeat for each box. 5. Cover boxes. Say, "Now you'll do some more writing." Provide lined paper & dictate words in 1st box, 1 word at a time. If any errors, stop, show words, cover them, provide fresh paper, & have child redo writing from 1st word.

1250a — _____ kids          1250c —

1250b — _____ girls

1251 — Word Scanner

What To Do: 1. Say, "Some of these words say some." 2. Point to ➔ in 1st row. Say, "Find the 1st some & circle it." 3. "Now say the word." 4. Make sure child works left to right across row. Immediately correct any error. Repeat for each row.

1252 —

| ➔ | pink | some | hats | Some |
|---|------|------|------|------|
| ➔ | some | More | bed | cow |
| ➔ | blue | cake | some | sun |
| ➔ | Kids | Some | jet | some |
| ➔ | One | some | Some | runs |
| ➔ | Some | Pets | sat | some |

5a                                                                 Please Turn Over >>

FIG. 12F

Detect 'n Select

What To Do: 1. Point to left box. Say, "Circle the 1st word that says some." 2. "Now say the word." 3. Repeat for each some in box. 4. Do NOT have child read any other words. 5. Repeat for middle & right boxes. 6. Make sure child works left to right across rows. Immediately correct any error.

| 1261a | 1261b | 1261c |
|---|---|---|
| A girl had some books. Some of the books had pictures and some did not. She liked them all. | Some kids went shopping. They got some candy and some toys. They did not get anything else. | There were some kids here. Some looked at cars and some looked at trucks. They looked for some time. |

Letter In

What To Do: 1. Say, "All these words can become some when you add the right letters." 2. Point to → in 1st row. Say, "Start here & write in the letters you need." 3. Cover all words other than one child is completing. 4. Make sure child works left to right within word & across row. Immediately correct any error. Repeat for each row.

| → | s o m _ | | s _ _ e |
| → | s o _ e | s _ _ _ | s _ _ e |
| → | | _ o _ e | s _ _ _ |
| → | s _ m _ | s _ m e | s _ _ e |
| → | | s _ m _ | s _ _ e |

5b — End of Session.

Target Word: boy boys

⍰ Is It Known?

What To Do: Without showing the word, provide pencil & lined paper. Say, "Write boy." If spelling is correct, skip word & go to next word (more). If spelling is not correct, provide pencil & have child complete both sides of page.

🔊 Savvy Sounds

What To Do: 1. Point to target word. Say, "This is boy, boys." 2. Cover words. 3. Point to boy in 1st row below. Say, "This says boy." 4. Point to boys/bond. Say, (a) "Find boys;" (b) "circle it;" (c) "say boys." Immediately correct any error. Repeat for each row.

| boy | boys | bond |
|---|---|---|
| boy | bolt | boys |
| boy | boys | born |
| boy | boys | boy | bond |
| boy | boss | boys | boat |

🖼 Spot 'n Sort

What To Do: 1. Say, "Some words here say boy or boys & some do not." 2. Point to ➜ in 1st row. Say, "Cross out any word that does NOT say boy or boys." Make sure child works left to right across row. Immediately correct any error. Repeat for each row.

| ➜ | boys | cars | kids | boy |
|---|---|---|---|---|
| ➜ | toy | girls | books | bout |
| ➜ | boat | boys | bolt | bark |
| ➜ | boy | men | boys | kid |
| ➜ | boys | balls | boys | bake |
| ➜ | kid | flag | kid | boy |

7a — Please Turn Over >>

FIG. 12J

Target Word: more More

Is It Known?

What To Do: Without showing the word, provide pencil & lined paper. Say, "Write more." If spelling is correct, skip word & go to Book 1. If spelling is not correct, provide pencil & have child complete both sides of page.

Write In To Read

What To Do: 1. Point to target word. Say, "This is more." 2. Cover word. 3. Point to 1st line in left box below. Say, "Write more here." 4. "Read the whole thing." Immediately correct any error. Repeat for right box. 5. Cover boxes. Say, "Now you'll do some more writing." Provide lined paper & dictate words in 1st box, 1 word at a time. If any error, stop, show words, cover them, provide fresh paper, & have child redo writing from 1st word.

a boy

_____ boys a some _____

Word Scanner

What To Do: 1. Say, "Some of these words say more." 2. Point to → in 1st row. Say, "Find the 1st more & circle it." 3. "Now say the word." 4. Make sure child works left to right across row. Immediately correct any error. Repeat for each row.

| → | more | help | more | man |
| → | some | Money | More | club |
| → | shirt | lift | mow | more |
| → | read | more | ore | more |
| → | more | Many | pore | More |
| → | Some | girls | more | more |

8a     Please Turn Over >>

FIG. 12L

Detect 'n Select

What To Do: 1. Point to left box. Say, "Circle the 1st word that says *more*." 2. "Now say the word." 3. Repeat for each *more* in box. 4. Do NOT have child read any other words. 5. Repeat for middle & right boxes. 6. Make sure child works left to right across rows. Immediately correct any error.

| Some animals wanted more food. The dogs wanted more meat and the cats wanted more fish. | A girl wanted to play some more. She wanted more time on the slide and more time on the swings. | Do more kids like summer? Yes, more kids do. The sun shines more and there are more things to do then. |
|---|---|---|

Letter In

What To Do: 1. Say, "All these words can become *more* when you add the right letters." 2. Point to ➔ in 1st row. Say, "Start here & write in the letters you need." 3. Cover all words other than one child is completing. 4. Make sure child works left to right within word & across row. Immediately correct any error. Repeat for each row.

➔              m _ _ _      m _ _ e

➔  m _ _ e          m o _ e     m _ r _

➔  m o r _      _ o _ e          m _ _ e

➔              m _ r _      m _ r e

➔  m _ _ e               m _ _ _

8b        Congratulations! Go to Book 1.

FIG. 12M 1300
1310

What To Do

For page 1:
1. Say to child, "Read this page to me."
2. If error, tell child correct word. Then say, "Say that word." Then have child re-read from 1st word on the page.

1312

For pages 2–8:
Repeat #1–2 above for each page.

End of session. Give book to your child. Say, "You can keep this book & read it anytime you like."

Next session. Go to Workbook 2.

FIG. 13B

Book 1: Some Kids
1322 { some girls,
       some boys
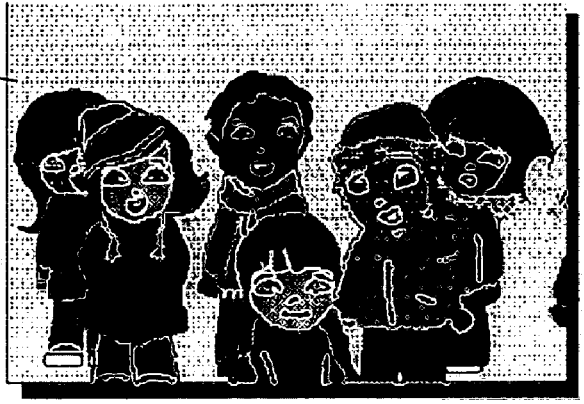
2
FIG. 13D 1300
1338
 Book 1: Some Kids
1340 some    more    girls
1342 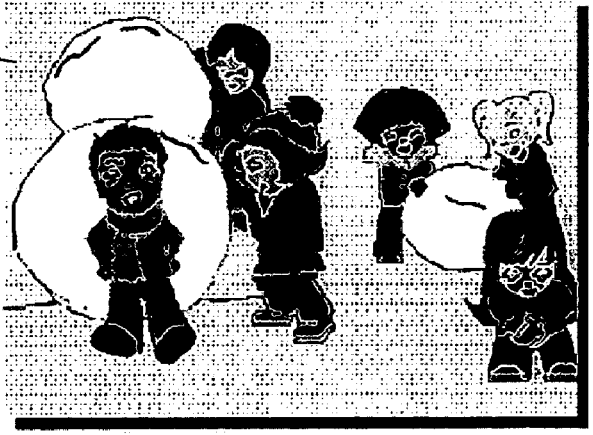
6
FIG. 13G

1400

1402

| Introduction To This Workbook | Exercise Book 2 |

Your child starts this workbook after completing Workbook 1 & Book 1. It contains the following words:

Content Words
*words that describe the world*
cat, cats   bird, birds
pet, pets

1404

What To Do

→ In each session, teach a single word, using all the forms your child has learned (such as *cat, cats*).

→ Teach only the words your child does not already know.

→ Follow the directions on each page in carrying out the teaching.

→ Have a blank index card available to use when the instructions tell you to cover the words.

→ Immediately correct errors, saying, "*No, that is not right,*" then:
a) for reading errors, say the correct word & have your child repeat it.
b) for writing errors, show the correct model & have your child redo the writing.

→ Aim for 4 to 6 sessions a week. Each session lasts about 20–30 minutes.

→ When the words are completed, go to Book 2.

Target Word: cat cats

❓ Is It Known?

What To Do: Without showing the word, provide pencil & lined paper. Say, "Write cat." If spelling is correct, skip word & go to next word (bird). If spelling is not correct, provide pencil & have child complete both sides of page.

🔊 Savvy Sounds

What To Do: 1. Point to target word. Say, "This is cat, cats." 2. Cover words. 3. Point to ca in 1st row below. Say, "This says ca" (cat without t). 4. Point to cap/cat. Say, (a) "Find cat;" (b) "circle it;" (c) "say cat." Immediately correct any error. Repeat for each row, saying ca when target is cat & cat when target is cats.

| | | | |
|---|---|---|---|
| ▶ ca | | cap | cat |
| ▶ cat | | cats | cabs |
| ▶ ca | | cat | can |
| ▶ ca | call | cat | cad |
| ▶ cat | cast | cats | cans |

🖼 Spot 'n Sort

What To Do: 1. Say, "Some words here say cat or cats & some do not." 2. Point to ➡ in 1st row. Say, "Cross out any word that does NOT say cat or cats." Make sure child works left to right across row. Immediately correct any error. Repeat for each row.

| | | | | |
|---|---|---|---|---|
| ➡ | cat | cape | kid | cats |
| ➡ | boy | tack | cast | cats |
| ➡ | kite | girl | cat | cats |
| ➡ | come | cat | try | cost |
| ➡ | cats | cat | dog | kids |
| ➡ | kid | cats | bird | cat |

1a                                                                 Please Turn Over >>

FIG. 14B

Pick the Picture

What To Do: 1. Say, "Find the 1st picture that shows a cat." 2. "Write cat on the line under that picture." 3. "Now say cat." Immediately correct any error. Repeat for all pictures showing target word (writing cat or cats, as appropriate). Leave other lines free of writing.

Find 'n Fill

What To Do: 1. Point to ➔ in 1st row. Say, "Find any word in this row that can become cat." 2. "Add the letters to make it say cat." 3. "Now say cat." 4. Make sure child works left to right across row. Immediately correct any error. Repeat for each row.

| ➔ | c a _ | m _ t _ | c _ _ | m _ _ e |
| ➔ | n _ c _ | _ a t _ | c _ t | t _ r n |
| ➔ | _ a _ | t a _ _ | c _ t | a _ t _ |
| ➔ | d _ g | c u _ s | p _ _ s | f _ _ s t |
| ➔ | p _ t s | _ a _ | s _ c _ | _ _ t |

1b     End of Session.

⊙ Target Word: bird birds                    Boarding ⓟ

❓ Is It Known?

What To Do: Without showing the word, provide pencil & lined paper. Say, "Write bird." If spelling is correct, skip word & go to next word (pet). If spelling is not correct, provide pencil & have child complete both sides of page.

1432 — 🔊 Savvy Sounds

What To Do: 1. Point to target word. Say, "This is bird, birds." 2. Cover words. 3. Point to bir in 1st row below. Say, "This says bir" (bird without d). 4. Point to bid/bird. Say, (a) "Find bird;" (b) "circle it;" (c) "say bird." Immediately correct any error. Repeat for each row, saying bir when target is bird & bird when target is birds.

1434a →

| bir  | bid   | bird  |       |
|------|-------|-------|-------|
| bird | birds | bikes |       |
| bird | bind  | birds |       |
| bir  | bit   | bird  | bite  |
| bird | bills | bits  | birds |

1434b →

1436 — 🎬 Spot 'n Sort

What To Do: 1. Say, "Some words here say bird or birds & some do not." 2. Point to ➡ in 1st row. Say, "Cross out any word that does NOT say bird or birds." Make sure child works left to right across row. Immediately correct any error. Repeat for each row.

1438a →

| ➡ | cup   | birds | boys  | bird  |
|---|-------|-------|-------|-------|
| ➡ | birds | dirt  | bird  | bad   |
| ➡ | kids  | pets  | dog   | birds |
| ➡ | eat   | bats  | birds | birds |
| ➡ | girls | bird  | bids  | fly   |
| ➡ | rest  | cats  | bird  | bird  |

1438b →

2a                                              Please Turn Over >>

FIG. 14D

Target Word: pet pets

Is It Known?

What To Do: Without showing the word, provide pencil & lined paper. Say, "Write pet." If spelling is correct, skip word & go to Book 2. If spelling is not correct, provide pencil & have child complete both sides of page.

Savvy Sounds

What To Do: 1. Point to target word. Say, "This is pet, pets." 2. Cover words. 3. Point to pe in 1st row below. Say, "This says pe" (pet without t). 4. Point to pen/pet. Say, (a) "Find pet;" (b) "circle it;" (c) "say pet." Immediately correct any error. Repeat for each row, saying pe when target is pet & pet when target is pets.

| pe  |      | pen  |      | pet  |      |
|-----|------|------|------|------|------|
| pet |      | pets |      | pest |      |
| pe  |      | peck |      | pet  |      |
| pet | pets |      | pelt |      | pens |
| pet | pert |      | pets |      | peak |

Spot 'n Sort

What To Do: 1. Say, "Some words here say pet or pets & some do not." 2. Point to → in 1st row. Say, "Cross out any word that does NOT say pet or pets." Make sure child works left to right across row. Immediately correct any error. Repeat for each row.

| → | car  | pets | pet  | girl |
| → | pets | pert | bed  | pet  |
| → | pile | pets | tips | pet  |
| → | rest | ball | pet  | pet  |
| → | pet  | trap | pets | runs |
| → | cape | pets | pet  | talk |

3a                                                             Please Turn Over >>

FIG. 14F

Pick the Picture

What To Do: 1. Say, "Find the 1st picture that shows a pet." 2. "Write pet on the line under that picture." 3. "Now say pet." Immediately correct any error. Repeat for all pictures showing target word (writing pet or pets, as appropriate). Leave other lines free of writing.

Find 'n Fill

What To Do: 1. Point to → in 1st row. Say, "Find any word in this row that can become pet." 2. "Add the letters to make it say pet." 3. "Now say pet." 4. Make sure child works left to right across row. Immediately correct any error. Repeat for each row.

| → | p_t | per_ | d__h | pe_ |
| → | be_s | k__ | _et | d__e |
| → | p_ds | _e_ | t_p_ | p__ |
| → | p_p | c__e | p_rts | p__ |
| → | gr_b | p_p_ | p_t | g__l |

3b     Congratulations! Go to Book 2.

FIG. 14G

| Book | Content Words | Non-Content Words |
|---|---|---|
| 1 | kid, girl, kids, girls, boy, boys | some, a, more |
| 2 | cat, bird, pet | |
| 3 | eat, fly, rest | the, can, are, here, not |
| 4 | bug, swim, talk, jump | |
| 5 | walk, plane, toy, robot | is, -ing, but, this, it |
| 6 | doll, rocket, sit | they |
| 7 | thing, big, baby | she, who, also, that, do, I, am, we |
| 8 | frog | like, what, to, does, want, many, those |
| 9 | run, dog, look, puppy | one, other, which, there, at, now |
| 10 | man, fix, good, arm, leg, truck | of, yes, have, he, has |
| 11 | should have, wing, hop, use, stop | my, you, all, no, their |
| 12 | duck, water, way, move | by, these, and, both, in, for |
| 13 | sad, rocks, hurt, time | was, -ed, only, did, on, could, -'s |
| 14 | help, see, go, think, cry | where, his, very, me, near |
| 15 | play, face, food, ate, happy, fat | most, her, any |
| 16 | hole, find, push, mice, get | them, out, be, us, then |
| 17 | park, nice, place, pool, dirt, swing | still, -y, say, two, had |
| 18 | clean, bag, put, make, stay | will, would, said, with, were |
| 19 | plant, animal, kind, cold, seem, hot, small | another, too |
| 20 | happen, rain, fall, house, sun, same, rainbow | each, again, saw, when, about, just |
| 21 | safe, ant, work, nest, ground, together, group, long, dig | -er, why, because, up |
| 22 | drink, mother, lot, sea, live, come, salt, land | -n't, own, how |
| 23 | mouth, claw, teeth, take, funny, back, part, tongue | after |
| 24 | sky, moon, earth, people, start, day | our, until, than |
| 25 | home, scare, hungry, open, yell, luck, went, bad, candy | as, over, much |
| 26 | fish, ray, top, sand, float, better, try | so, because |
| 27 | ask, bite, name, letter, know, real, smile | such, your, sure, three, once |
| 28 | cliff, daisy, change, computer, sleep, got | ever, from, even, nothing |
| 29 | penny, tell, kite, hand, idea, high, hear, told | every, true |
| 30 | bull, head, slow, tree, down | never, -self |

| Introduction To This Workbook | Exercise Book 29 |

YOUR child starts this workbook after completing Workbook 28 & Book 28. It contains the following words:

Content Words
words that describe the world

Non-Content Words
words that combine to form sentences penny, pennies   tell, tells, telling
kite, kites    hand, hands, handed, handy
idea, ideas   high, higher   hear, hears, hearing
told every   true

1704

1703

What To Do

→ In each session, teach a single word, using all the forms your child has learned (such as *penny, pennies*).

→ Teach only the words your child does not already know.

→ Follow the directions on each page in carrying out the teaching.

→ Have a blank index card available to use when the instructions tell you to cover the words.

→ Immediately correct errors, saying, "*No, that is not right,*" then:
a) for reading errors, say the correct word & have your child repeat it.
b) for writing errors, show the correct model & have your child redo the writing.

→ Aim for 4 to 6 sessions a week. Each session lasts about 20–30 minutes.

→ When the words are completed, go to Book 29.

Target Word: penny pennies

❓ Is It Known?

What To Do: Without showing the word, provide pencil & lined paper. Say, "Write penny." If spelling is correct, skip word & go to next word (tell). If spelling is not correct, provide pencil & have child complete both sides of page.

🔊 Savvy Sounds

What To Do: 1. Point to target words. Say, "This is penny, pennies." 2. Cover words. 3. Point to pen in 1st row below. Say, "This says pen." 4. Point to penned/penny. Say; (a) "Find penny:" (b) "circle it:" (c) "say penny." Immediately correct any error. Repeat for each row, saying pen when target is penny & penni (like penny) when target is pennies.

| pen   | penned   | penny   |         |
|-------|----------|---------|---------|
| penni | pennies  | pending |         |
| penni | pennants | pennies |         |
| pen   | penny    | penal   | pension |
| pen   | penny    | pencil  | penned  |

📷 Spot 'n Sort

What To Do: 1. Say, "Some words here say penny or pennies & some do not." 2. Point to ➔ in 1st row. Say, "Cross out any word that does NOT say penny or pennies." Make sure child works left to right across row. Immediately correct any error. Repeat for each row.

| ➔ | pests | howl  | pennies | lends   |
|---|-------|-------|---------|---------|
| ➔ | penny | peppy | bets    | knot    |
| ➔ | help  | penny | angry   | know    |
| ➔ | penny | knot  | perky   | pennies |
| ➔ | jetty | noun  | penny   | now     |
| ➔ | penny | pint  | kite    | pennies |

Please Turn Over >>

FIG. 17B

Symbol Search

What To Do: 1. Point to 1st sentence. Say, "A word is missing. The symbols tell you what it is." (Point to symbol above & below 1st sentence.) 2. "Find the word & say it." 3. Cover word, point to 1st line, & say, "Write it on the line." 4. "Read the sentence." Immediately correct any error. Repeat for each row. 5. Cover all sentences & say, "Now you'll write a sentence." Provide lined paper. Dictate words of last sentence, 1 word at a time. If any error (including capitals & punctuation), stop, show sentence, cover it, provide fresh paper, & have child redo sentence from 1st word. 6. Repeat #5 with 2nd sentence.

♣♣

How many _____ do they still have with them?
♣♣ = pennies

♣♣     Λ     ♦

The kids had some _____ , but they _____ not get _____ with them.
Λ = could     ♦ = much     ♣♣ = pennies

♣♣     U     ♣

Three _____ ? No, it is _____ one _____ !
U = only     ♣ = penny     ♣ = pennies

⊗     ♠     ♣♣

Do you _____ _____ ones are really _____ ?
⊗ = know     ♣♣ = pennies     ♠ = which

Find 'n Fill

What To Do: 1. Point to ➡ in 1st row. Say, "Find any word in this row that can become penny." 2. "Add the letters to make it say penny." 3. "Now say penny." 4. Make sure child works left to right across row. Immediately correct any error. Repeat for each row.

| ➡ | p_nn_ | s_fe | p_st | p__t |
| ➡ | n__d | _e__y | s_at | _olly |
| ➡ | n__n | __nny | __ow_ | p___ |
| ➡ | __ppy | k_o_s | __nn_ | s__g |
| ➡ | t__e | p__t | p___y | boo_ |

1b     End of Session.

◉ Target Word: tell tells telling  Soaring

❓ Is It Known?

What To Do: Without showing the word, provide pencil & lined paper. Say, "Write tell." If spelling is correct, skip word & go to next word (every). If spelling is not correct, provide pencil & have child complete both sides of page.

1728

🔊 Savvy Sounds

What To Do: 1. Point to target words. Say, "This is tell, tells, telling." 2. Cover words. 3. Point to tell in 1st row below. Say, "This says tell." 4. Point to telling/testing. Say, (a) "Find telling," (b) "circle it," (c) "say telling." Immediately correct any error. Repeat for each row, saying te (tell without ll) when target is tell & tell when target is telling.

| tell | telling | testing | |
|------|---------|---------|---|
| tell | telling | tempting | |
| te   | term    | tell | |
| tell | testing | temping | telling |
| te   | teem    | tear | tell |

1729

✏️ Find 'n Fill

What To Do: 1. Point to → in 1st row. Say, "Find any word in this row that can become tells." 2. "Add the letters to make it say tells." 3. "Now say tells." 4. Make sure child works left to right across row. Immediately correct any error. Repeat for each row.

| ➡ | t_ll_ | s_fe | f_ll | p__t |
| ➡ | l__d | te__s | _o_e | _olly |
| ➡ | n__n | __nny | __ow_ | t__l_ |
| ➡ | __ppy | t_l_s | __nn_ | s__g |
| ➡ | t__e | p___ | p___ | t_ll_ |

2a                                Please Turn Over »

FIG. 17D

Stay 'n Play

What To Do: 1. Point to 1st sentence. Say, "Cross out all words with dots over them." 2. "Read the words that are left." Immediately correct any error. Repeat for each row. 3. Cover sentences. Say, "Now you'll write a sentence." Provide lined paper & dictate words of 3rd sentence, 1 word at a time. If any error (including capitals & punctuation), stop, show sentence, cover it, provide fresh paper, & have child redo sentence from 1st word. 4. Repeat #3 with 4th sentence.

• •
Do can not try to tell us went things like that!

• •
She's are good at knowing telling kids funny things.

• • •
Do He is here forever telling each of the them to stop yelling.

• •
The three water on the ground tells us that some it has rained here.

Spot 'n Sort

What To Do: 1. Say, "Some words here say tell or tells & some do not." 2. Point to ➡ in 1st row. Say, "Cross out any word that does NOT say tell or tells." Make sure child works left to right across row. Immediately correct any error. Repeat for each row.

| | | | | |
|---|---|---|---|---|
| ➡ | pests | howl | tell | tells |
| ➡ | tells | peppy | pills | knot |
| ➡ | help | tell | angry | bell |
| ➡ | tells | knot | tell | tolls |
| ➡ | games | tell | tall | now |
| ➡ | tell | tall | lets | tells |

2b                                                                                   End of Session.

◉ Target Word: every Every  Soaring

[?] Is It Known?

What To Do:   Without showing the word, provide pencil & lined paper. Say, "Write every." If spelling is correct, skip word & go to next word (kite). If spelling is not correct, provide pencil & have child complete both sides of page.

1736 —

✎ Write In To Read

What To Do:   1. Point to target word. Say, "This is every." 2. Cover word. 3. Point to 1st line in left box below. Say, "Write every here." 4. "Read what it says." Immediately correct any error. Repeat for each box. 5. Cover boxes. Say, "Now you'll do some more writing." Provide lined paper & dictate words in 1st box. 1 word at a time. If any error (including capitals & punctuation), stop, show words, cover them, provide fresh paper, & have child redo writing from 1st word.

| There were three trucks. E_____ one of them did not look good. Still they could go. Some people tried them out and they said they were still good. | E_____ day, a group of frogs jumps on these rocks. Stay here and you can also see them do it. |
| | Some kids looked into _____ house and they saw nothing in any of them. |

1737 —

🔍 Word Scanner

What To Do:   1. Say, "Some of these words say every." 2. Point to ➤ in 1st row. Say, "Find the 1st every & circle it."
3. "Now say the word." 4. Make sure child works left to right across row.   Immediately correct any error. Repeat for each row.

| | | | | |
|---|---|---|---|---|
| ➤ | evening | open | each | every |
| ➤ | things | Every | north | even |
| ➤ | eagles | shop | every | how |
| ➤ | three | kneel | mother | every |
| ➤ | Ever | every | very | Every |
| ➤ | very | never | every | eating |

3a                                                                  Please Turn Over >>

FIG. 17F 1700
1738
1739

 Replace the Space

What To Do: 1. Say, "Some words need to be filled in." 2. Point to box at bottom. Say, "You can find them here." 3. Point to top row. Say, "Start here & find the 1st word you need." 4. When child finds word, say, "Say the word." 5. Cover word (in box) & say, "Now write it in." 6. Repeat for each fill-in. 7. Make sure child works left to right across each row. Immediately correct any error.

E _ e _ y _ kid _ h _ went to the
1739a pool _ _ ied to f _ _ _ t and all of them _ ou _ _ do it.

Th _ y a _ _ c _ ul _ _ _ oa _ .

1740 | all could every float they tried who |

1741

 Detect 'n Select

What To Do: 1. Point to left box. Say, "Circle the 1st word that says every." 2. "Now say the word." 3. Repeat for each every in box. 4. Do NOT have child read any other words. 5. Repeat for middle & right boxes. 6. Make sure child works left to right across rows. Immediately correct any error.

| Every book, every toy, and every game has been put away. If you want any of them, you have to ask the teacher and she can get them for you. | Those people walked through every street and every park in the city. They saw every one of the things they came to see. They were so happy. | Every pet is not the same as every other pet. Every pet is different. If you're going to get one, you have to know the kind you want. Did you know that? |

3b  End of Session.

FIG. 17G

⊙ Target Word: kite kites                                        Soaring

[?] Is It Known?

What To Do: Without showing the word, provide pencil & lined paper. Say, "Write kite." If spelling is correct, skip word & go to next word (hand). If spelling is not correct, provide pencil & have child complete both sides of page.

[♪] Savvy Sounds

What To Do: 1. Point to target words. Say, "This is kite, kites." 2. Cover words. 3. Point to ki in 1st row below. Say, "This says ki" (kite without te). 4. Point to kite/kitten. Say, (a) "Find kite;" (b) "circle it;" (c) "say kite." Immediately correct any error. Repeat for each row, saying ki when target is kite & kite when target is kites.

| ki   |       | kite  |       | kitten |
|------|-------|-------|-------|--------|
| kite |       | kites |       | kinds  |
| ki   |       | kiln  |       | kite   |
| kite | kits  | kites |       | kinds  |
| ki   | kick  | kite  |       | kid    |

[✎] Stay 'n Play

What To Do: 1. Point to 1st sentence. Say, "Cross out all words with dots over them." 2. "Read the words that are left." Immediately correct any error. Repeat for each row. 3. Cover sentences. Say, "Now you'll write a sentence." Provide lined paper & dictate words of 2nd sentence, 1 word at a time. If any error (including capitals & punctuation), stop, show sentence, cover it, provide fresh paper, & have child redo sentence from 1st word. 4. Repeat #3 with 4th sentence.

•         •          •
Those two plants kites were are too big for us to play used with.
_____

•            •                •
The people are didn't trying to many find some kites again but they can't find any.
_____

•              •
You will see! This The kite will not stay ever fly up into the sky.
_____

•                    •   •
Not Yes, the kid really knows how to can fly hop that funny kite.

4a                                          Please Turn Over >>

FIG. 17H

Pick the Picture

What To Do: 1. Say, "Find the 1st picture that shows a kite." 2. "Write kite on the line under that picture." 3. "Now say the word." Immediately correct any error. Repeat for all pictures showing target word (writing kite or kites, as appropriate). Leave other lines free of writing.

Spot 'n Sort

What To Do: 1. Say, "Some words here say kite or kites & some do not." 2. Point to ➡ in 1st row. Say, "Cross out any word that does NOT say kite or kites." Make sure child works left to right across row. Immediately correct any error. Repeat for each row.

| | | | |
|---|---|---|---|
| ➡ | kids | kite | tick | kite |
| ➡ | kittens | kits | water | kites |
| ➡ | kites | tech | kite | appear |
| ➡ | kite | kilt | ballet | forever |
| ➡ | cliff | kites | near | kite |
| ➡ | kite | kites | close | kills |

| Target Word: hand hands handed handy | | Soaring |

❓ Is It Known?

What To Do: Without showing the word, provide pencil & lined paper. Say, "Write hand." If spelling is correct, skip word & go to next word (idea). If spelling is not correct, provide pencil & have child complete both sides of page.

1752

🔊 Savvy Sounds

What To Do: 1. Point to target words. Say, "This is hand, hands, handed, handy." 2. Cover words. 3. Point to han in 1st row below. Say, "This says han" (hand without d). 4. Point to hank/hand. Say, (a) "Find hand;" (b) "circle it;" (c) "say hand." Immediately correct any error. Repeat for each row, saying han when target is hand & hand when target is handy.

| han | hank | hand | |
|---|---|---|---|
| hand | handy | hanger | |
| han | hang | hand | |
| hand | hanker | handy | hanger |
| han | hang | hank | hand |

1753

🎮 Stay 'n Play

What To Do: 1. Point to 1st sentence. Say, "Cross out all words with dots over them." 2. "Read the words that are left." Immediately correct any error. Repeat for each row. 3. Cover sentences. Say, "Now you'll write a sentence." Provide lined paper & dictate words of 1st sentence, 1 word at a time. If any error (including capitals & punctuation), stop, show sentence, cover it, provide fresh paper, & have child redo sentence from 1st word. 4. Repeat #3 with 2nd sentence.

•     •
The You can use your even hands for many things, but not for walking.

•     •
When he put one of his such hands in the open ground, he got some small bugs.

•   •   •
The bus man is handy up at fixing also lots of things that we use at home.

•   •
The What girl put handed over some big bags to me when I needed them.

| 5a | Please Turn Over >> |

FIG. 17J

Pick the Picture

What To Do: 1. Say; "Find the 1st picture that shows something with hands." 2. "Write hands on the line under that picture." 3. "Now say hands." Immediately correct any error. Repeat for all pictures showing target word. Leave other lines free of writing.

Find 'n Fill

What To Do: 1. Point to ➙ in 1st row. Say; "Find any word in this row that can become hand." 2. "Add the letters to make it say hand." 3. "Now say hand." 4. Make sure child works left to right across row. Immediately correct any error. Repeat for each row.

| | | | |
|---|---|---|---|
| ne_r | ha_d | n _ _ e | _and |
| _ _ t | h _ _ m | e _ _ n | da _ _ s |
| _a_d | al_ | d _ _ t | h _ _ _ |
| a_t | _am | _a_d | f_s_ |
| ha _ _ | n _ _ l | _ _ _ h | _an_ |

5b     End of Session.

FIG. 17K

⊙ Target Word: idea ideas                                    Scoring

❓ Is It Known?

What To Do: Without showing the word, provide pencil & lined paper. Say; "Write idea." If spelling is correct, skip word & go to next word (high). If spelling is not correct, provide pencil & have child complete both sides of page.

🔊 Savvy Sounds

What To Do: 1. Point to target words. Say; "This is idea, ideas." 2. Cover words. 3. Point to idea in 1st row below. Say; "This says idea." 4. Point to ideas/idols. Say; (a) "Find ideas" (b) "circle it;" (c) "say ideas." Immediately correct any error. Repeat for each row, saying i (like I) when target is idea & idea when target is ideas.

| idea | ideas | idols |
|------|-------|-------|
| i    | ideal | idea  |
| idea | ideas | idles |
| i    | ideal | idea  | idol |
| idea | idiom | identical | ideas |

📁 Spot 'n Sort

What To Do: 1. Say; "Some words here say idea or ideas & some do not." 2. Point to → in 1st row. Say; "Cross out any word that does NOT say idea or ideas." Make sure child works left to right across row. Immediately correct any error. Repeat for each row.

| ➡ | dense | hurt  | ideas | lends |
|---|-------|-------|-------|-------|
| ➡ | dons  | idea  | deal  | ideas |
| ➡ | idea  | deals | alert | know  |
| ➡ | ideas | move  | idea  | penny |
| ➡ | icy   | noun  | earns | ideas |
| ➡ | peals | idea  | idea  | idol  |

6a                                            Please Turn Over >>

FIG. 17L

 Symbol Search

What To Do: 1. Point to 1st sentence. Say, "A word is missing. The symbols tell you what it is." (Point to symbol above & below 1st sentence.) 2. "Find the word & say it." 3. Cover word, point to 1st line, & say, "Write it on the line." 4. "Read the sentence." Immediately correct any error. Repeat for each row. 5. Cover all sentences & say, "Now you'll write a sentence." Provide lined paper. Dictate words of last sentence, 1 word at a time. If any error (including capitals & punctuation), stop, show sentence, cover it, provide fresh paper, & have child redo sentence from 1st word. 6. Repeat #5 with 3rd sentence.

♣♣
Are any of his _____ ever really good for anyone?
♣♣ = Ideas

♣                    ♦
No one has any _____ about _____ to open that toy.
♣ = Idea              ♦ = how U                    ♣
"_____ you say that _____ once more so we can think about it?"
U = Could             ♣ = Idea ♠♠                   ♣♣
The _____ have some _____ about getting everyone to do the work.
♣♣ = Ideas            ♠♠ = people

 Find 'n Fill

What To Do: 1. Point to ➡ in 1st row. Say, "Find any word in this row that can become idea." 2. "Add the letters to make it say idea." 3. "Now say idea." 4. Make sure child works left to right across row.  Immediately correct any error. Repeat for each row.

| ➡ | d_als | s_fe | p_st | i___ |
| ➡ | n__d | _d__ | s_at | _olly |
| ➡ | d__n | __ea | __ow_ | p___ |
| ➡ | _ee_s | k_o_s | __nn_ | i__a |
| ➡ | t__e | i___ | p___y | boo_ |

6b     End of Session.

FIG. 17M 1700
1765
1766

Target Word: high higher  Soaring

❓ Is It Known?

What To Do: Without showing the word, provide pencil & lined paper. Say, "Write high." If spelling is correct, skip word & go to next word (true). If spelling is not correct, provide pencil & have child complete both sides of page.

1767

🔊 Savvy Sounds

What To Do: 1. Point to target words. Say, "This is high, higher." 2. Cover words. 3. Point to high in 1st row below. Say, "This says high." 4. Point to hiker/higher. Say, (a) "Find higher;" (b) "circle it;" (c) "say higher."  Immediately correct any error. Repeat for each row.

| high | hiker  | higher |        |
|------|--------|--------|--------|
| high | higher | hires  |        |
| high | higher | hind   |        |
| high | higher | hired  | hiker  |
| high | hidden | higher | hinder |

1768

📁 Spot 'n Sort

What To Do: 1. Say, "Some words here say high or higher & some do not." 2. Point to ➡ in 1st row. Say, "Cross out any word that does NOT say high or higher." Make sure child works left to right across row.  Immediately correct any error. Repeat for each row.

| ➡ | mite   | hill | high   | ghost  |
|---|--------|------|--------|--------|
| ➡ | high   | big  | both   | thigh  |
| ➡ | biter  | high | home   | high   |
| ➡ | higher | bite | home   | hides  |
| ➡ | hugs   | bone | higher | bitter |
| ➡ | hips   | bite | same   | high   |

7a  Please Turn Over >>

FIG. 17N

 Pick the Picture

What To Do: 1. Say, "Find the 1st picture that shows something that is higher than something else." 2. "Write higher on the line under that picture." 3. "Now say higher." Immediately correct any error. Repeat for all pictures showing target word. Leave other lines free of writing.

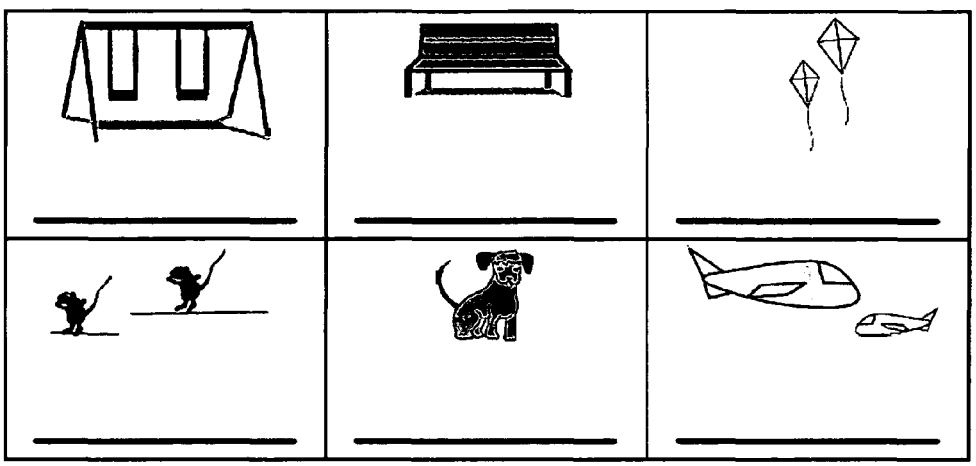

 Find 'n Fill

What To Do: 1. Point to ➔ in 1st row. Say, "Find any word in this row that can become high." 2. "Add the letters to make it say high." 3. "Now say high." 4. Make sure child works left to right across row. Immediately correct any error. Repeat for each row.

| | | | |
|---|---|---|---|
| ➔ _pen_ | h_t_ | __gh | b_d |
| ➔ __ge | _u_s | _n_er | h_g_ |
| ➔ gh___ | al_o | s__ts | _i__ |
| ➔ b_t_s | h_g_ | __en | ___t |
| ➔ _o_e | han_ | h__h | m_ts |

7b     End of Session.

FIG. 17O

◎ Target Word: true

🎯 Is It Known?

What To Do: Without showing the word, provide pencil & lined paper. Say, "Write true." If spelling is correct, skip word & go to next word (hear). If spelling is not correct, provide pencil & have child complete both sides of page.

✏️ Write In To Read

What To Do: 1. Point to target word. Say, "This is true." 2. Cover word. 3. Point to 1st line in left box below. Say, "Write true here." 4. "Read what it says." Immediately correct any error. Repeat for each box. 5. Cover boxes. Say, "Now you'll do some more writing." Provide lined paper & dictate words in 1st box, 1 word at a time. If any error (including capitals & punctuation), stop, show words, cover them, provide fresh paper, & have child redo writing from 1st word.

| It is _____ ! The moon is still in the sky in the daytime. | "Are you sure that what you are saying is _____ ? Are you really sure?" "Yes, every one of the things we said is _____." |
| The kids did not think that the man was saying things that were _____. | |

🔍 Detect 'n Select

What To Do: 1. Point to left box. Say, "Circle the 1st word that says true." 2. "Now say the word." 3. Repeat for each true in box. 4. Do NOT have child read any other words. 5. Repeat for middle & right boxes. 6. Make sure child works left to right across rows. Immediately correct any error.

| Everything in this book is true. It really is true. We checked it out and all the things are true. You read it and see. | That can't be true. It is not true. I just know it is not true. I don't care what you say. That idea is just not true. | I can't tell if what she is saying is true. Do you think it is true? What can we do to find out if it is true? |

8a     Please Turn Over >>

FIG. 17P

 Cipher Wiz

What To Do: 1. Say, "You need to write in words & marks here. The numbers tell you what to write." 2. Point to 1st number in box. Say, "Look under the line & find the ones for this number." 3. If they are not punctuation marks, say "Read them." 4. Cover words or marks, point to 1st line & say, "Write them in here." 5. If error, show words or marks, cover them & have child correct error. 6. Repeat until write-ins completed. 7. "Now read what it says." Make sure child works left to right across lines. Complete 2nd set in same manner.

```
2 6 7 2 3 6 7 5 1 4 7
```

➤ 1 = can eat   2 = It is   3 = really   4 = small bugs   5 = Some plants   6 = true   7 = .

```
4 2 1 9 4 3 7 5 9 8 6 10
```

1 = be true   2 = can it   3 = could anyone   4 = How   5 = to a rainbow   6 = that did not happen
7 = walk   8 = We know   9 = ?   10 = .

 Word Scanner

What To Do: 1. Say, "Some of these words say true." 2. Point to ➤ in 1st row. Say, "Find the 1st true & circle it." 3. "Now say the word." 4. Make sure child works left to right across row.   Immediately correct any error. Repeat for each row.

| | | | | |
|---|---|---|---|---|
| ➤ | trust | rule | each | true |
| ➤ | things | turn | true | even |
| ➤ | twigs | true | urns | how |
| ➤ | true | kneel | mother | ever |
| ➤ | ever | true | very | truth |
| ➤ | true | ruin | true | eats |

8b     End of Session.

FIG. 17Q

Pick the Picture

What To Do: 1. Say, "Find the 1st picture that shows something that can hear." 2. "Write hear on the line under that picture."
3. "Now say hear." Immediately correct any error. Repeat for all pictures showing target word. Leave other lines free of writing.

Find 'n Fill

What To Do: 1. Point to → in 1st row. Say, "Find any word in this row that can become hear." 2. "Add the letters to make it say hear." 3. "Now say hear." 4. Make sure child works left to right across row. Immediately correct any error. Repeat for each row.

| | | | |
|---|---|---|---|
| ➡ _ e a _ | b _ t _ | _ _ a r | h _ d |
| ➡ d _ _ s | _ u _ s | h e _ r | b _ n _ |
| ➡ _ h _ n | a l _ o | s _ _ t s | h _ _ r |
| ➡ h _ t s | b _ s _ | _ a _ _ | _ _ _ t |
| ➡ h _ a _ | b a n _ | a _ o u _ | m _ t s |

9b     End of Session.

FIG. 17S

Target Word: told

[?] Is It Known?

What To Do: Without showing the word, provide pencil & lined paper. Say, "Write told." If spelling is correct, skip word & go to Book 29. If spelling is not correct, provide pencil & have child complete both sides of page.

Savvy Sounds

What To Do: 1. Point to target word. Say, "This is told." 2. Cover word. 3. Point to to in 1st row below. Say, "This says to" (like toe). 4. Point to toll/told. Say: (a) "Find told;" (b) "circle it;" (c) "say told." Immediately correct any error. Repeat for each row.

| to | toll | told |     |
|----|------|------|-----|
| to | toes | told |     |
| to | toad | told |     |
| to | told | tone | toast |
| to | told | toll | total |

Stay 'n Play

What To Do: 1. Point to 1st sentence. Say, "Cross out all words with dots over them." 2. "Read the words that are left." Immediately correct any error. Repeat for each row. 3. Cover sentences. Say, "Now you'll write a sentence." Provide lined paper & dictate words of 1st sentence, 1 word at a time. If any error (including capitals & punctuation), stop, show sentence, cover it, provide fresh paper, & have child redo sentence from 1st word. 4. Repeat #3 with 3rd sentence.

• •
When if the man changed everything he told you, what so did you do?

• •
Someone told after the boy that but the computer would not work.

• •
Over and why over again, they as told the boy not to be scared. Still he was scared.

• •
What Who told go you that she went away from here to find her pet?

10a    Please Turn Over >>

FIG. 17T

Find 'n Fill

What To Do: 1. Point to → in 1st row. Say, "Find any word in this row that can become told." 2. "Add the letters to make it say told." 3. "Now say told." 4. Make sure child works left to right across row. Immediately correct any error. Repeat for each row.

| → | p_al | s_fe | l_st | t___ |
| → | n__d | _o__ | t_as | _oll |
| → | m__n | __ld | __ow | _p___ |
| → | _oys | k_w_s | t_me | t__d |
| → | t__e | t___ | p__t | moo_ |

Symbol Search

What To Do: 1. Point to 1st sentence. Say, "A word is missing. The symbols tell you what it is." (Point to symbol above & below 1st sentence.) 2. "Find the word & say it." 3. Cover word, point to 1st line, & say, "Write it on the line." 4. "Read the sentence." Immediately correct any error. Repeat for each row. 5. Cover all sentences & say, "Now you'll write a sentence." Provide lined paper. Dictate words of last sentence, 1 word at a time. If any error (including capitals & punctuation), stop, show sentence, cover it, provide fresh paper, & have child redo sentence from 1st word. 6. Repeat #5 with 2nd sentence.

♣
Who _____ the people to get away from here?
♣ = told

♣　　　　　　　　　♦　　　　　　　□
The man _____ us we had to _____ the _____. It's not good anymore.
♦ = change　　　□ = computer　　　♣ = told ♣　　　　　　　　∉
We were _____ that we had to _____ here just now.
∉ = come　　　♣ = told ♣　　　　　　♠
He _____ them _____ they wanted to hear about the swimmers.
♠ = everything　　　♣ = told

10b　　　　　　　　　　　　　　　　Congratulations! Go to Book 29.

FIG. 17U

What To Do

For page 1:
1. Say to child, "Read this page to me."
2. If error, tell child correct word. Then say, "Say that word." Then have child re-read from 1st word on the page.

For pages 2-11:
Repeat #1-2 above for each page.

For page 12 Gleaning Meaning:
1. Say to child, "This tells a summary of the story, but you need to fill in some of the words." Point to words at bottom of page & say, "Use these words to do that."
2. Point to 1st blank space & say, "Find the word that goes here." (If error, tell child correct choice.)
3. Continue until all the words are filled in.
4. Then say, "Read the page to me." (If any error, tell child correct word & have child re-read from 1st word on that page.)

End of session. Give book to your child. Say, "You can keep this book & read it anytime you like."

Next session. Go to Workbook 30.

Book 29: The Kite That Could

Gleaning Meaning

A girl had a ___⎰¹⁸⁴⁰___ that could do many ___⎰¹⁸⁴⁴___. The kite tried to tell the ___⎰¹⁸⁴⁶___ what it could do. But the girl did not hear what the kite tried to _____ her. Then one day, some kids tried to take the kite _____. The kite did not _____ that to happen. It did many of the things it could _____, and it stopped the kids from doing what they were trying to do. When that happened, the girl saw what the kite had said was _____. After that, when the kite talked, the girl did _____ what the kite wanted to tell her.

1842 ⭨ away  do  girl  hear  kite  tell  things  true  want

| Introduction To This Workbook | Exercise Book 30 |

YOUR child starts this workbook after completing Workbook 29 & Book 29. It contains the following words:

Content Words
words that describe the world bull, bulls, bully   head, heads, headed, heading
slow, slower   tree, trees

1903

Non-Content Words
words that combine to form sentences never   -self   down

1904

What To Do

→ In each session, teach a single word, using all the forms your child has learned (such as *head, heads, headed, heading*).

→ Teach only the words your child does not already know.

→ Follow the directions on each page in carrying out the teaching.

→ Have a blank index card available to use when the instructions tell you to cover the words.

→ Immediately correct errors, saying, "*No, that is not right,*" then:
   a) for reading errors, say the correct word & have your child repeat it.
   b) for writing errors, show the correct model & have your child redo the writing.

→ Aim for 4 to 6 sessions a week. Each session lasts about 20–30 minutes.

→ When the words are completed, go to Progress Check.

 Stay 'n Play

What To Do: 1. Point to 1st sentence. Say, "Cross out all words with dots over them." 2. "Read the words that are left." Immediately correct any error. Repeat for each row. 3. Cover sentences. Say, "Now you'll write a sentence." Provide lined paper & dictate words of 1st sentence, 1 word at a time. If any error (including capitals & punctuation), stop, show sentence, cover it, provide fresh paper, & have child redo sentence from 1st word. 4. Repeat #3 with 4th sentence.

• •
Is Are the three some bullfrogs you told us about still here near your home?

• •
"Don't That try to bully us. We can are not scared of you."

• • •
Those dogs animals are not as big as bulls. We They think they really are bulls.

• • •
Bats Bulls don't eat everything. They will only say eat swim these plants.

1913 ⭨  Spot 'n Sort

What To Do: 1. Say, "Some words here say bull or bulls & some do not." 2. Point to ➔ in 1st row. Say, "Cross out any word that does NOT say bull or bulls." Make sure child works left to right across row. Immediately correct any error. Repeat for each row.

| | | | | |
|---|---|---|---|---|
| ➔ | bull | rally | bold | bulbs |
| ➔ | really | bulls | ready | lull |
| ➔ | house | really | bull | rake |
| ➔ | bull | other | soar | deed |
| ➔ | reader | bulls | bills | been |
| ➔ | cull | bunt | bull | bulls |

1b                                              End of Session.

◎ Target Word: never Never                                   Soaring

[?] Is It Known?

What To Do: Without showing the word, provide pencil & lined paper. Say, "Write never." If spelling is correct, skip word & go to next word (head). If spelling is not correct, provide pencil & have child complete both sides of page.

1917

✎ Write In To Read

What To Do: 1. Point to target word. Say, "This is never." 2. Cover word. 3. Point to 1st line in left box below. Say, "Write never here." 4. "Read what it says." Immediately correct any error. Repeat for each box. 5. Cover boxes. Say, "Now you'll do some more writing." Provide lined paper & dictate words in 1st box, 1 word at a time. If any error (including capitals & punctuation), stop, show words, cover them, provide fresh paper, & have child redo writing from 1st word.

| That dog is _____ nice. No one ever wants to be near him. | "Are you sure Cliff _____ got here? He said he would be here but you are saying that he isn't here. I don't know what happened. Do you have any ideas about this?" |
|---|---|
| N_____ stop trying to do good things! It is very nice to be like that. | |

1918

🔍 Word Scanner

What To Do: 1. Say, "Some of these words say never." 2. Point to ➤ in 1st row. Say, "Find the 1st never & circle it." 3. "Now say the word." 4. Make sure child works left to right across row. Immediately correct any error. Repeat for each row.

| ➤ | never | their | ever | needed |
|---|---|---|---|---|
| ➤ | needle | Every | reeds | Never |
| ➤ | here | hop | never | not |
| ➤ | never | names | New | never |
| ➤ | Then | Never | every | even |

2a                                                  Please Turn Over >>

FIG. 19D

 Detect 'n Select

What To Do: 1. Point to left box. Say, "Circle the 1st word that says never." 2. "Now say the word." 3. Repeat for each never in box. 4. Do NOT have child read any other words. 5. Repeat for middle & right boxes. 6. Make sure child works left to right across rows. Immediately correct any error.

| Those people never do those things. They never swim, they never ski, and they never jog. They just don't do those things. But they do other things that they like. | Look! Those men are leaving. They never stay for the whole meeting. They just don't. I wonder why they never want to stay. The rest of us never leave like that. Why do they? | Never in my life have I seen a rainbow. Just never! My friend has also never seen one. We both want to see a rainbow soon. Do you think that we will get what we want? |

 Letter In

What To Do: 1. Say, "All these words can become never when you add the right letters." 2. Point to → in 1st row. Say, "Start here & write in the letters you need." 3. Cover all words other than one child is completing. 4. Make sure child works left to right within word & across row. Immediately correct any error. Repeat for each row.

➡ ___er        nev__        __ver

➡              _ev__                      n____

➡ ne__r                     _e__r    __ve_

➡ _e_e_        n___r        _e___

➡ ___e_        _e_e_                     n__e_

➡ ne_er        __v__        _e__r

2b                                          End of Session.

FIG. 19E

Target Word: head heads headed heading

❓ Is It Known?

What To Do: Without showing the word, provide pencil & lined paper. Say, "Write head." If spelling is correct, skip word & go to next word (slow). If spelling is not correct, provide pencil & have child complete both sides of page.

🔊 Savvy Sounds

What To Do: 1. Point to target words. Say, "This is head, heads, headed, heading." 2. Cover words. 3. Point to head in 1st row below. Say, "This says head." 4. Point to herds/heads. Say: (a) "Find heads;" (b) "circle it;" (c) "say heads." Immediately correct any error. Repeat for each row, saying hea (head without d) when target is head & head when target is heads.

| head | herds | heads |
|------|-------|-------|
| hea  | heap  | head  |
| head | heads | heeds |
| hea  | head  | heat  | heal  |
| head | hears | heirs | heads |

📷 Spot 'n Sort

What To Do: 1. Say, "Some words here say head or heading & some do not." 2. Point to ➡ in 1st row. Say, "Cross out any word that does NOT say head or heading." Make sure child works left to right across row. Immediately correct any error. Repeat for each row.

| ➡ | high    | milling | bite    | heading |
|---|---------|---------|---------|---------|
| ➡ | bees    | head    | head    | kite    |
| ➡ | head    | bright  | home    | heart   |
| ➡ | hiding  | bite    | heeding | head    |
| ➡ | hearing | head    | bead    | bits    |
| ➡ | hump    | bite    | heating | heading |

3a     Please Turn Over >>

FIG. 19F

Pick the Picture

What To Do: 1. Say, "Find the 1st picture that shows something with a head." 2. "Write head on the line under that picture."
3. "Now say head." Immediately correct any error. Repeat for all pictures showing target word. Leave other lines free of writing.

Find 'n Fill

What To Do: 1. Point to → in 1st row. Say, "Find any word in this row that can become head." 2. "Add the letters to make it say head." 3. "Now say head." 4. Make sure child works left to right across row. Immediately correct any error. Repeat for each row.

| → | l_ad | h__l | __me | __ad |
| → | _e_d | s_u_ | s_n_er | b_n_ |
| → | h___ | a_d_ | s__ts | d___ |
| → | b_t_s | __ad | s__e | n___t |
| → | _ea_s | ban_ | h_ad | m_ts |

3b     End of Session.

FIG. 19G

Target Word: slow slower

Soaring

❓ Is It Known?

What To Do: Without showing the word, provide pencil & lined paper. Say, "Write slow." If spelling is correct, skip word & go to next word (-self). If spelling is not correct, provide pencil & have child complete both sides of page.

🔊 Savvy Sounds

What To Do: 1. Point to target words. Say, "This is slow, slower." 2. Cover words. 3. Point to slow in 1st row below. Say, "This says slow." 4. Point to slower/slopes. Say, (a) "Find slower." (b) "circle it." (c) "say slower." Immediately correct any error. Repeat for each row, saying sl (slow without ow) when target is slow & slow when target is slower.

| slow | slower | slopes | |
|------|--------|--------|---|
| sl | slot | slow | |
| slow | slugger | slower | |
| slow | slower | slope | slush |
| sl | slow | sly | slug |

📁 Spot 'n Sort

What To Do: 1. Say, "Some words here say slow or slower & some do not." 2. Point to ➔ in 1st row. Say, "Cross out any word that does NOT say slow or slower." Make sure child works left to right across row. Immediately correct any error. Repeat for each row.

| ➔ | slower | silly | bite | slow |
|---|--------|-------|------|------|
| ➔ | sees | bite | mow | blower |
| ➔ | wall | low | home | slow |
| ➔ | slow | looser | slow | bode |
| ➔ | silt | slower | biting | bits |
| ➔ | jumpy | bite | same | slower |

4a   Please Turn Over >>

FIG. 19H

Symbol Search

What To Do: 1. Point to 1st sentence. Say, "A word is missing. The symbols tell you what it is." (Point to symbol above & below 1st sentence.) 2. "Find the word & say it." 3. Cover word, point to 1st line, & say, "Write it on the line." 4. "Read the sentence." Immediately correct any error. Repeat for each row. 5. Cover all sentences & say, "Now you'll write a sentence." Provide lined paper. Dictate words of last sentence, 1 word at a time. If any error (including capitals & punctuation), stop, show sentence, cover it, provide fresh paper, & have child redo sentence from 1st word. 6. Repeat #5 with 1st sentence.

♣

Those trucks are very _____ and they will take a long time to get here.

♣ = slow

♦ ♣

_____ those very small frogs over there are _____ at jumping.

♣ = slow  ♦ = All

♥ ⊇ ♣

We _____ that it is _____ too _____ to go that way.

♥ = know  ⊇ = much  ♣ = slow

ᴧᴧ ♣

The _____ who are _____ can rest in the house.

ᴧᴧ = people  ♣ = slower

Find 'n Fill

What To Do: 1. Point to → in 1st row. Say, "Find any word in this row that can become slow." 2. "Add the letters to make it say slow." 3. "Now say slow." 4. Make sure child works left to right across row. Immediately correct any error. Repeat for each row.

| | | | | |
|---|---|---|---|---|
| ➡ | s _ _ w | s _ f e | w _ r _ | p _ _ t |
| ➡ | k _ n _ | _ l o _ | s _ a t | _ o _ k |
| ➡ | s _ l _ | _ _ o w | p e _ r | n _ _ d |
| ➡ | _ l _ w | p _ t s | _ _ c k | s _ _ g |
| ➡ | t _ _ e | s l _ _ | _ a c _ | b e n _ |

4b  End of Session.

◉ Target Word: -self                                                                 Soaring

[?] Is It Known?

What To Do: Without showing the word, provide pencil & lined paper. Say, "Write himself." If spelling is correct, skip word & go to next word (tree). If spelling is not correct, provide pencil & have child complete both sides of page.

1948

✎ Write In To Read

What To Do: 1. Point to target word. Say, "This is -self." 2. Cover word. 3. Point to 1st line in left box below. Say, "Write -self here." 4. "Read what it says." Immediately correct any error. Repeat for each box. 5. Cover boxes. Say, "Now you'll do some more writing." Provide lined paper & dictate words in 1st box, 1 word at a time. If any error (including capitals & punctuation), stop, show words, cover them, provide fresh paper, & have child redo writing from 1st word.

| "I can do it. I can! I can do things all by my_____." | A girl was thinking to her_____, "I am not going to be scared anymore. I can change my_____." Then the girl did what she said she would do. |
|---|---|
| A boy wanted to walk to the park all by him_____, but his mother did not want him to do that. | |

1949

🔍 Word Scanner

What To Do: 1. Say, "Some of these words end in '-self'". 2. Point to → in 1st row. Say, "Find the 1st word ending in -self & circle it." 3. "Now say the whole word." 4. Make sure child works left to right across row. Immediately correct any error. Repeat for each row.

| → | himself | shelf | sell | stay |
| → | elf | itself | thin | herself |
| → | jumps | shells | herself | yourself |
| → | himself | felt | where | fled |
| → | yourself | rested | myself | these |

5a                                                                            Please Turn Over >>

FIG. 19J

Replace the Space

What To Do: 1. Say, "Some words need to be filled in." 2. Point to box at bottom. Say, "You can find them here." 3. Point to top row. Say, "Start here & find the 1st word you need." 4. When child finds word, say, "Say the word." 5. Cover word (in box) & say, "Now write it in." 6. Repeat for each fill-in. 7. When fill-ins completed, say, "Read what it says." 8. Make sure child works left to right across each row. Immediately correct any error.

When the man s _ w the puppies t _ y _ _ ng to bite him, he smiled to h _ ms _ _ _ . He was _ _ ink _ _ g, "I _ ' _ lucky they are n _ _ big."

| himself it's not saw thinking trying |

Detect 'n Select

What To Do: 1. Point to left box. Say, "Circle the 1st word that ends in -self." 2. "Now say the whole word." 3. Repeat for each word with -self in box. 4. Do NOT have child read any other words. 5. Repeat for middle & right boxes. 6. Make sure child works left to right across rows. Immediately correct any error.

| "I can do lots of things by myself, and I would like to do this myself, but I can't do it by myself. I will have to get some help with this." | For the first time, the baby saw himself in the mirror. He looked at himself one time, then he looked at himself again. | The girl made herself a sandwich. Then she made herself another one. After that, she made some more things for herself. |

5b · End of Session.

◉ Target Word: tree trees        *Soaring*

❓ Is It Known?

What To Do:    Without showing the word, provide pencil & lined paper. Say, "Write tree." If spelling is correct, skip word & go to next word (down). If spelling is not correct, provide pencil & have child complete both sides of page.

1958 ─┐

🔊 Savvy Sounds

What To Do:    1. Point to target words. Say, "This is tree, trees." 2. Cover words. 3. Point to tree in 1st row below. Say, "This says tree." 4. Point to tree/trees. Say, (a) "Find trees." (b) "circle it." (c) "say trees." Immediately correct any error. Repeat for each row, saying tr (tree without ee) when target is tree & tree when target is trees.

| tree | treat | trees |
|------|-------|-------|
| tr   | tree  | trek  |
| tree | trees | treads |
| tr   | trend | tree  | treat |
| tree | treads | trees | treks |

1959 ─┐

👁 Stay 'n Play

What To Do:    1. Point to 1st sentence. Say, "Cross out all words with dots over them." 2. "Read the words that are left." Immediately correct any error. Repeat for each row. 3. Cover sentences. Say, "Now you'll write a sentence." Provide lined paper & dictate words of 1st sentence, 1 word at a time. If any error (including capitals & punctuation), stop, show sentence, cover it, provide fresh paper, & have child redo sentence from 1st word. 4. Repeat #3 with 4th sentence.

•            •
We did sure not know how these kinds of trees could be this here.

•            •
A That group of bugs was hopping living in that tree near the water.

•         •
Did you know that a good small girl went got up this big tree all by herself?

•           •
They He walked that day until they push saw the trees they needed to find.

6a              Please Turn Over >>

⊙ Target Word: down Down    Soaring

❓ Is It Known?

What To Do: Without showing the word, provide pencil & lined paper. Say, "Write down." If spelling is correct, skip word & go to Progress Check. If spelling is not correct, provide pencil & have child complete both sides of page.

1967

✍ Write In To Read

What To Do: 1. Point to target word. Say, "This is down." 2. Cover word. 3. Point to 1st line in left box below. Say, "Write down here." 4. "Read what it says." Immediately correct any error. Repeat for each box. 5. Cover boxes. Say, "Now you'll do some more writing." Provide lined paper & dictate words in 1st box, 1 word at a time. If any error (including capitals & punctuation), stop, show words, cover them, provide fresh paper, & have child redo writing from 1st word.

| | |
|---|---|
| The rocket went _____ because it could not fly. | "Look _____ when you are walking in this place! You need to do that. It is not safe near here and so you have to be sure about what you are doing. Then you will not fall." |
| "Who was _____ in the ground? Was it that funny animal? It sometimes digs there." | |

1969

🔍 Word Scanner

What To Do: 1. Say, "Some of these words say down." 2. Point to ➡ in 1st row. Say, "Find the 1st down & circle it." 3. "Now say the word." 4. Make sure child works left to right across row. Immediately correct any error. Repeat for each row.

| | | | | |
|---|---|---|---|---|
| ➡ | down | How | up | Down |
| ➡ | own | down | pun | when |
| ➡ | up | down | up | here |
| ➡ | done | does | to | down |
| ➡ | am | up | Down | in |
| ➡ | down | gone | won | out |

7a                                                    Please Turn Over »

FIG. 19N

Replace the Space

What To Do: 1. Say, "Some words need to be filled in." 2. Point to box at bottom. Say, "You can find them here." 3. Point to top row. Say, "Start here & find the 1st word you need." 4. When child finds word, say, "Say the word." 5. Cover word (in box) & say, "Now write it in." 6. Repeat for each fill-in. 7. When fill-in completed, say, "Read what it says." 8. Make sure child works left to right across each row. Immediately correct any error.

---

This plane is nice, b _ _ we st _ _ _ think it wo _ _ _ be b _ t _ er to be _ _ wn on the ground. We do not like flying _ _ l that _ uc _ .

| all | better | but | down | much | still | would |

---

Detect 'n Select

What To Do: 1. Point to left box. Say, "Circle the 1st word that says down." 2. "Now say the word." 3. Repeat for each down in box. 4. Do NOT have child read any other words. 5. Repeat for middle & right boxes. 6. Make sure child works left to right across rows. Immediately correct any error.

| Down there are some things that are nice to see. We can go down there if we want. So would you want to go down or not? It's fine either way. | I don't like having to say this over and over. Just sit down! I will say it only one more time. Sit down! It's important for you to sit down. | What things are down in the ground? So many things are down there. Plants are down there. Bugs are down there. Lots of things are down there. |

7b    End of Session. Next session: Go to Progress Check.

FIG. 190

Progress Check: Soaring Program

Your child has almost completed the Soaring Program. At this point, you carry out a Progress Check to see how well he or she is doing. It generally takes less than 15 minutes. Make sure your child is rested and you are in a quiet area for working.

What to do:
1. Arrange this paper so child cannot see the sentences.
2. Provide a pencil, or thin marker, and a clean sheet of lined paper.
3. Go to Sentence #1 in list below and say, *"Listen to this sentence."* Read aloud the words of the sentence. Then say, *"Now I'll repeat this, one word at a time, and you write each word after I say it."* Dictate the 1st word.
4. Wait until your child has finished writing a word & then dictate the next word.
5. If child cannot write a word, say, *"Let's move on,"* & dictate the next word.
6. Continue in this way until he or she completes the sentence.
7. Do not offer any assistance.
8. Provide clean, lined paper and repeat Steps 1–7 with each sentence.
9. After your child has completed the writing, take the papers and on the sentences below, score the writing.
10. After scoring, follow the guidelines under Action to Take.

Scoring:
Circle any word child writes correctly. A word is correct if the spelling and capitalization are totally accurate. (Errors include omitting a letter, introducing a letter that is not in the word, and putting a letter in the wrong place.)

| Sentence | # Words Correct |
|---|---|
| 1. The girl was never scared to go out by herself. | |
| 2. Do most of the kids know how to read their names? | |
| 3. When the computer went down, the girl really started to yell. | |
| Total | # Correct |

Action to Take

| If the total correct is 26 or more: | If the total correct is 25 or less: |
|---|---|
| In the next session, complete Book 30. Then congratulations! Your child has completed all the programs of the PHAT Phonics system. | Some review is needed. In the next session, begin the review activities outlined in Your Guide to PHAT Phonics (Review Material: Soaring Program). |

FIG. 19P

Book 30: The Bullheaded Bullfrog

Rocky was a _____ (2022) ⚭. That is a kind of frog that is very big. But Rocky was _____ (2026) ψ a baby, and so he was not as big as he was going to be. Rocky was not only a bullfrog. He was also _____ (2028) ⚯.

⚭ = bullfrog   ⚯ = bullheaded   ψ = still

Book 30: The Bullheaded Bullfrog

After some time, the cat got up.

She ____2042____ that the frog was not
         △

____2046____! Was the cat mad
     ↔

2048
____?
  ♠

2044

♠ = now   △ = saw   θ = slow   ↔ = there

Book 30: The Bullheaded Bullfrog  P

Rocky _____ went back to that
         Ω
tree and he never went to places his
mother told him not to go. From
that time on, Rocky was _____
                                    ψ
a _____, but he was not
      ⚭
bullheaded.

⚭ = bullfrog   Ω = never   ψ = still   ∪ = tree

Book 30: The Bullheaded Bullfrog

Gleaning Meaning

There was a baby _____ that was very _____. He liked to go to places on his _____ and he did not stay with his mother. One day, he saw a tree with holes in it. He was going into one of the holes when a _____ jumped near him. The cat wanted to get the bullfrog. The bullfrog stayed in the tree for a long time. He was too scared to sleep, but the cat did go to _____. When that happened, the bullfrog went out of the _____ and he got away. When the cat got up, she was very mad but she could not get the bullfrog. After that, the baby bullfrog did what his mother _____ him to do and he _____ went to places on his own.

bullfrog bullheaded cat never own sleep told tree

FIG. 20G

LITERACY SYSTEM

CROSS-REFERENCE TO RELATED APPLICATION

This application is a continuation of U.S. patent application Ser. No. 10/350,849 entitled "Literacy System," filed on Jan. 24, 2003 now abandoned, which claims priority to U.S. Provisional Application Ser. No. 60/362,749 entitled "Literacy System," filed on Mar. 7, 2002. The complete disclosures of these previous applications are herein incorporated by reference in their entirety.

TECHNICAL FIELD

This document relates to a system of literacy education, including methods and systems for teaching reading and writing skills.

BACKGROUND

Literacy is a skill often taken for granted even though mastery of that skill eludes millions of people from all age groups. For those that are literate, an intricate set of skills enable reading and writing to be smooth and automatic processes. This set of skills, referred to as "hidden abilities," generally appear first at a young age when a person begins to comprehend the speech of others and when that person begins to speak. For example, even a young child may know that the statement "I am looking at she" is incorrect while the statement "I am looking at her" is proper. Generally, any individual does not know the technical reason behind the proper version, but instead, may offer the rationale that "it just sounds right." (The technical reason is that when a pronoun referring to a feminine individual is used as the object of a preposition, the correct form of the pronoun is "her," not "she.") This example illustrates the essence of the hidden abilities that allow a literate person to do amazingly intricate constructions with language without knowing why. These same abilities are constantly operating in written language as well. For example, in a sentence such as The soldier decided to desert in the desert. a skilled reader automatically uses different pronunciations for the two instances of the identically spelled word. For people who are not literate, and especially for young children, these hidden abilities must be developed via literacy education. However, modern systems for teaching literacy fail to address the full range of necessary skills to promote the development of hidden abilities.

In general, two major systems dominate the literacy education field: phonics and whole language. Phonics emphasizes the skill of converting the letters on a page into sounds that become real words (i.e. teaching children to read a word by "sounding out" each letter so that c-a-t becomes "cat"). The processing of sounds falls under a language category known as phonology. The phonics system seems logical because phonology is a significant element in reading, but in practice, phonics teaching is hindered by the complexities of the English language. Phonics relies on teaching that each letter makes a single, distinctive sound. The reality, however, is that this concept holds true for only a tiny fraction of English words. Indeed, of the seventeen words in the preceding sentence, not a single one meets this criterion. The problem is illustrated by the fact that, under the phonics system of teaching, the word "phonics" itself should be spelled "foniks." In order to overcome this problem, the system relies on children memorizing hundreds of rules, such as the "silent e" rule, the double vowel rule, and the consonant combination rules. However, the memorization of these rules and "sounding out" individual letters may cause reading and writing to be a laborious process and may discourage individual students. The whole language system of teaching literacy focuses on complete stories or groups of words to form meaningful messages, which is different from the phonics system that concentrates on the dissection of individual words. However, children in early stages of reading may encounter a wider range of words that they can mange. As such, the situation may appear overwhelming to the student.

The prevailing assumption is that these two systems, in combination, address all of the skills necessary to literacy. Unfortunately, these two systems, alone or in combination, cover only a portion of the skills that reading requires. The skills that are not addressed by these systems may leave gaps in the literacy education that many students are able to overcome. For those students who are not able to overcome the gaps of the current literacy systems, reading and writing may become a frustrating activity that is to be avoided.

Among the components needed for an effective literacy system are ones that develop the pre-reading skills of visual sequencing and fine motor abilities. In addition, other components needed for an effective literacy system are ones that collectively teach all four of the language skills of phonology, semantics, syntax, and text.

SUMMARY

In some embodiments, a system for teaching skills associated with literacy can include a pre-reading section that includes exercises selected from a group consisting of sequencing exercises and letter writing exercises. The system may also include a language skills section that includes language exercises viewable on a display apparatus to collectively teach all four of the language skills of phonology, semantics, syntax, and text. The language skills section may include a first level of exercises that introduce a first set of content words and non-content words in a first combination of exercises to collectively teach all four of the language skills of phonology, semantics, syntax, and text. The language skills section may also include a second level of exercises that integrate the first set of content words and non-content words with a second set of content words and non-content words in a second combination of exercises to collectively teach all four of the language skills of phonology, semantics, syntax, and text. The language skills section may further include a third level of exercises that integrate the first and second sets of content words and non-content words with a third set of content words and non-content words in a third combination of exercises to collectively teach all four of the language skills of phonology, semantics, syntax, and text.

In particular embodiments, a method of presenting exercises of a literacy system may include presenting to a student a set of pre-reading exercises selected from a group consisting sequencing exercises and letter writing exercises. The method may also include presenting to the student a first level of language skills exercises that introduce a first set of content words and non-content words in a first combination of exercises to collectively teach all four of the language skills of phonology, semantics, syntax, and text. The method may further include presenting to the student a second level of language skills exercises that integrate the first set of content words and non-content words with a second set of content words and non-content words in a second combination of exercises to collectively teach all four of the language skills of phonology, semantics, syntax, and text. The method may also include presenting to the student a third level of language skills exercises that integrate the first and second sets of content words and non-content words with a third set of content words and non-content words in a third combination of exercises to collectively teach all four of the language skills of phonology, semantics, syntax, and text.

In other embodiments, a method of practicing exercises in a literacy system may include performing a set of pre-reading exercises selected from a group consisting sequencing exercises and letter writing exercises. The method may also include performing a first level of language skills exercises viewable on a first display apparatus. The first level of exercises may introduce a first set of content words and non-content words in a first combination of exercises to collectively teach all four of the language skills of phonology, semantics, syntax, and text. The method may also include performing a second level of language skills exercises viewable on the first or a second display apparatus. The second level of exercises may integrate the first set of content words and non-content words with a second set of content words and non-content words in a second combination of exercises to collectively teach all four of the language skills of phonology, semantics, syntax, and text.

In some embodiments, a series of exercise books and story books in a literacy system can collectively teach all four of the language skills of phonology, semantics, syntax, and text. Each exercise book may include a plurality of sheets with a set of language skills exercises introducing a targeted set of content words and non-content words. Each exercise book in the series may be followed by an associated story book. Each story book may include a plurality of pages with text that provides a story and with one or more images related to the story. The text of each story book may consist only of those content words and non-content words that were introduced by earlier exercise books in the series of books such that the reader of the story book is exposed only to those content words and non-contents words that were previously introduced with the language skills exercises of the earlier exercise books in the series.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 12A-M depict an example first exercise book in the embodiment of the literacy system of FIG. 11.

FIGS. 13A-H depict an example story book associated with the exercise book of FIGS. 12A-M.

FIGS. 14A-G depict an example second exercise book in the embodiment of the literacy system of FIG. 11.

FIG. 16 depicts example content words and non-content words taught within particular levels and books in an embodiment of the literacy system.

FIGS. 18A-I depict an example story book associated with the exercise book of FIGS. 17A-U.

FIGS. 20A-G depict an example story book associated with the exercise book of FIGS. 19A-P.

Like reference symbols in the various drawings indicate like elements.

DETAILED DESCRIPTION

Certain embodiments of the literacy system described herein teach one or all of the following skills associated with total competence in literacy:

(1) sequencing—the ability to read, and retain, letters in the appropriate order, (2) motor skills—the hand-eye coordination required for writing, (3) phonology—the ability to recognize and produce the sounds of letters, (4) semantics—comprehension of the meaning of words, (5) syntax—the ability to recognize and use grammar, and (6) text—combining words to form meaningful messages.

Sequencing and motor skills are both types of physical skills associated with reading and writing, as described later in more detail. Briefly, visual sequencing exercises may be used to teach left-to-right scanning and memorization of symbols, letters, and words. Motor skills exercises may be used to develop handwriting abilities in a student such that subsequent reading and writing skills may be taught in tandem.

Phonology is a language skill relating to the processing of sounds, such as the sounds of individual letter combinations in a word. For example, a literate reader may know that "ph" has the sound of "f" in certain instances (i.e. elephant), but not in other instances (i.e. uphill is not pronounced as "ufill" and shepherd is not pronounced as "sheferd"). The skill of recognizing the proper sounds of letter combinations falls under the category of phonology.

Semantics is another language skill and is associated with the meaning of words. For example, in the statement "the girl did not hear the band," the word band refers to a group of musicians, while the word band in the sentence "the girl did not wear the band" refers to a piece of jewelry that can be put on one's body. The skill of phonology may be used to show that the pronunciation of "band" and "band" are identical, but the language skill of semantics enables a student to recognize the different meanings.

The language skill relating to the grammar of sentences is referred to as syntax. One example of a syntax skill is the proper usage of the words "they're," "there," and "their" in a sentence such as "they're there at their house." In another example, the word "read" may be pronounced as "red" or "reed" depending upon the grammatical construction of the sentence (i.e. "yesterday, they read the magazine," or "usually, they read the magazine").

Lastly, the language skill of text is associated with the ability to use combinations of words and sentences to form meaningful messages. In the early stages of learning to read, a student may be able to read only several words, and those words may not be combined so as to form a statement or sentence. As that student learns to read additional words, that student must also develop textual skills of combining those words in the appropriate order in order to express a desired message.

Figure 1:
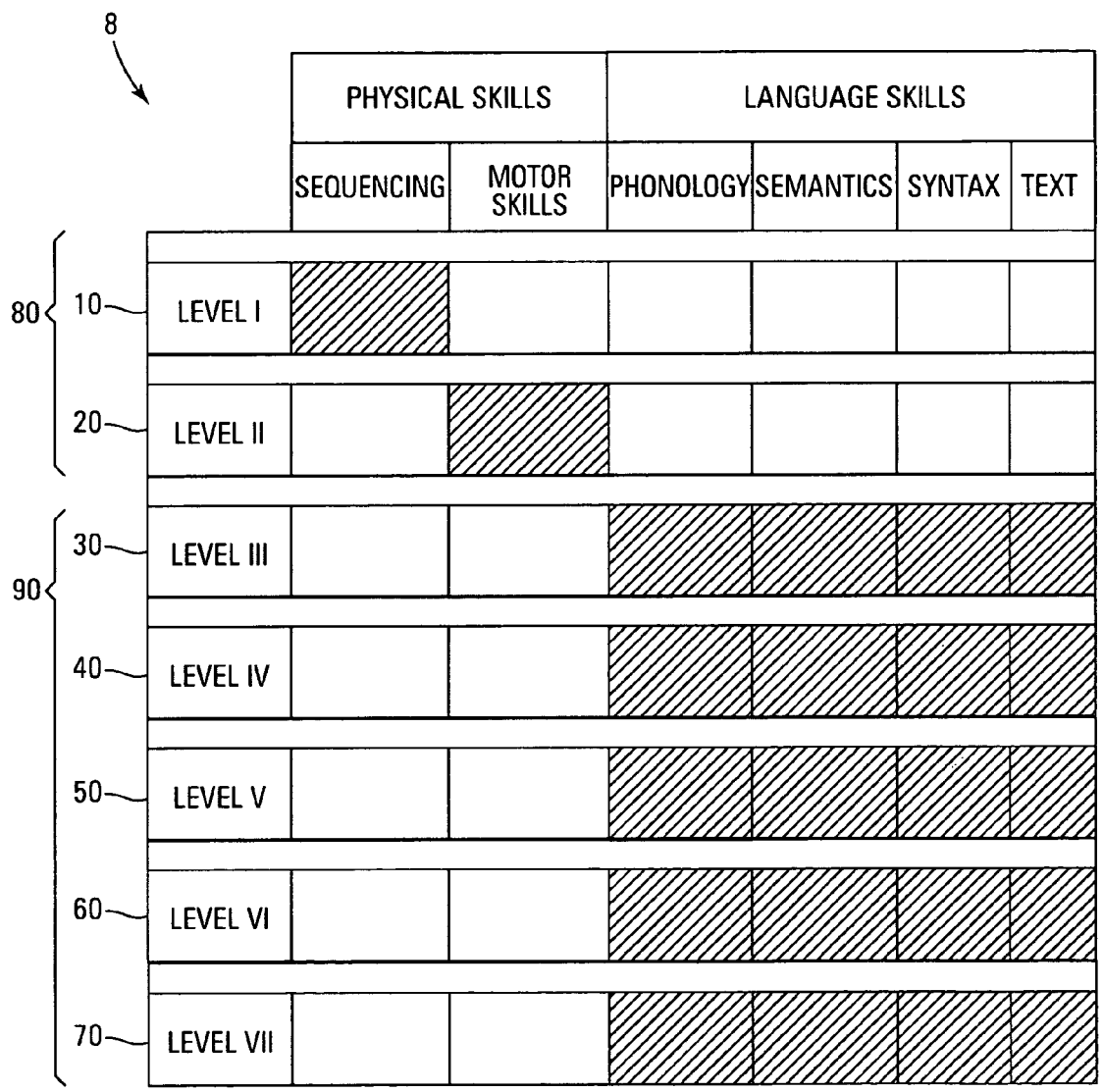
FIG. 1 is a chart depicting aspects of one embodiment of a literacy system in accordance with the invention.

In one embodiment of the invention, as shown in FIG. 1, a literacy system 8 comprises two sections 80 and 90, which focus on teaching physical skills and language skills, respectively. The literacy system 8 is divided into distinct levels. By way of example, the literacy system shown in FIG. 1 comprises seven levels 10, 20, 30, 40, 50, 60, and 70, but the literacy system 8 may include any number of levels. Each level teaches particular skill sets that may be used as building blocks for the following level in the literacy system 8. For example, the sequencing and motor skills taught in level I 10 and level II 20, respectively, may be used as foundations for the language skills taught in subsequent levels 30, 40, 50, 60, and 70.

In general, sequencing and motor skills are physical skills that may be taught to a student before the student actually begins to read words. Level I 10 teaches sequencing skills that are fundamental to the subsequent skills of reading and writing. Sequencing skills developed in level I 10 include the concept of scanning in a left to right pattern and retaining in memory sequences of letters or symbols. Level II 20 teaches the motor skills of writing letters of the alphabet in a manner that removes the mental "roadblocks" developed by traditional handwriting systems. The section 80 of the literacy system that includes level I 10 and level II 20 is referred to as the pre-reading section 80 because the skills taught in level I 10 and level II 20 may be developed before the student learns to read.

Section 90 of the literacy system 8 includes level III 30, level IV 40, level V 50, level VI 60, and level VII 70. Each of these levels 30, 40, 50, 60, and 70 develops the language skills of phonology, semantics, syntax, and text in the context to teaching the student to read and write. Thus, section 90 is referred to as the early reading section 90, or the language skills section 90, and may include both reading and writing exercises. The difficulty of the reading and writing exercises in each level 30, 40, 50, 60, and 70 increases as the student progresses to the subsequent level. Although the reading and writing exercises of each level may be the same, the words used by the literacy system increase in difficulty due to the length, meaning, and grammatical category. The reading and writing exercises of each level may be used to teach the student particular rules or words and develop hidden abilities generally possessed by literate people.

Figure 2:
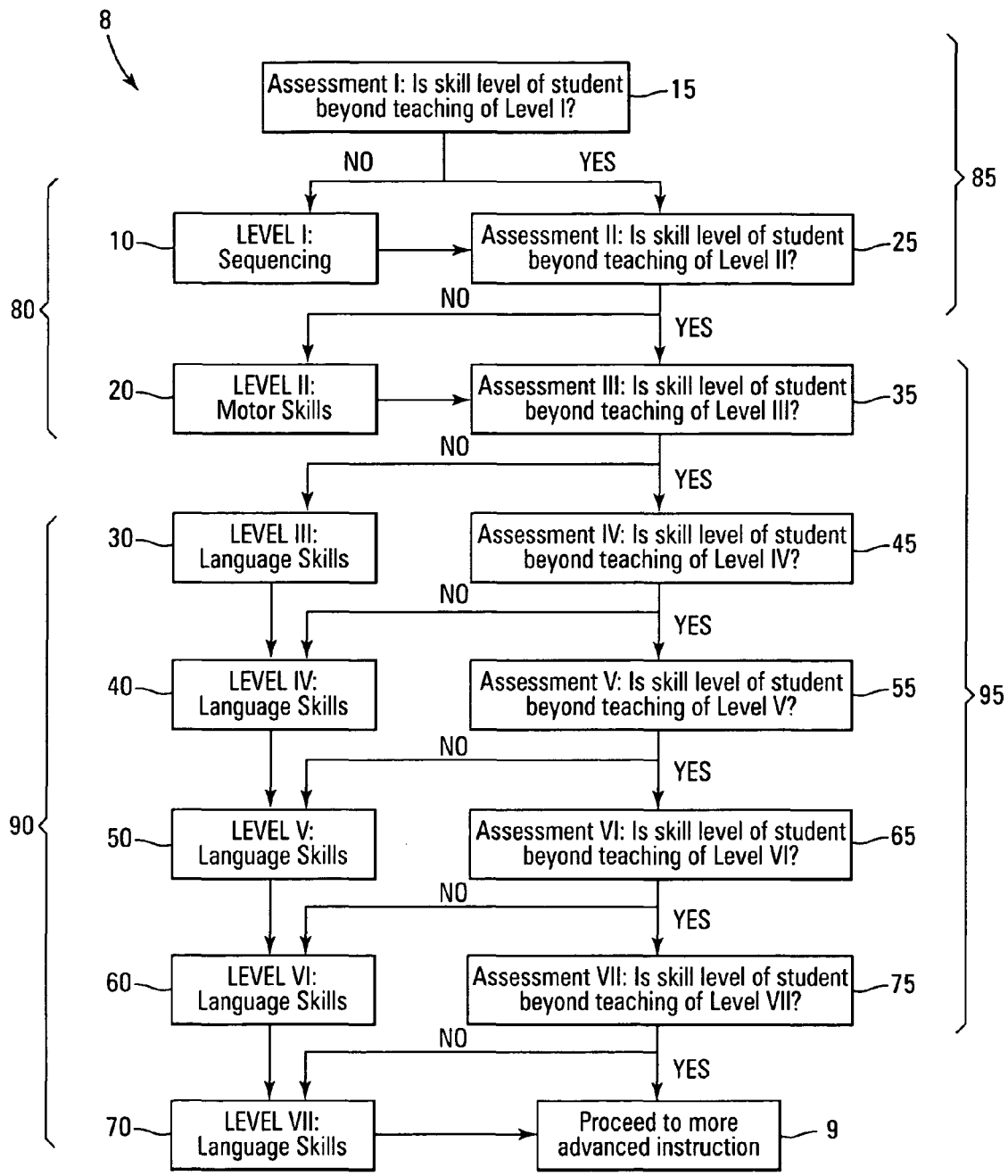
FIG. 2 is a flow diagram of the literacy system of FIG. 1.

Referring to FIG. 2, one embodiment of the literacy system 8 includes a series of assessment tests 15, 25, 35, 45, 55, 65, and 75 to enable the student to bypass particular levels of teaching where the student has already learned that material. The literacy system 8 may be individually tailored to the needs of particular students using the assessments 15, 25, 35, 45, 55, 65, and 75. For example, if a student possesses satisfactory sequencing and motor skills but not necessarily language skills, then the assessment-I 15, assessment-II 25, and assessment-III 35 may be completed to show that the student should bypass the pre-reading section 80 and begin learning from the literacy system 8 at level III 30.

As shown in FIG. 2, the student first completes assessment-I 15 to determine if the student's abilities surpass the sequencing skills taught in level I 10. The assessment-I 15 may include several example and practice exercises similar to those that are used in the actual teaching of level I 10 (described in further detail below). If the student performs satisfactorily during the assessment-I 15, the literacy system 8 may recommend that the student should bypass the teaching of level I 10 and proceed to assessment-II 25. However, if the student's performance during assessment-I 15 is not satisfactory, then the literacy system 8 may recommend that the student should begin receiving instruction from level I 10.

After the student satisfactorily completes assessment-I 15, or after the student satisfactorily completes level I 10, the student then proceeds to assessment-II 25 to determine if she already possesses satisfactory motor skills as taught in level II 20. Again, if the student's motor skills are beyond the teaching of level II 20, then the student should proceed to assessment-III 35. Otherwise, the student should complete level II 20 before continuing on to assessment-III 35. Alternatively, the student may perform both assessment-I 15 and assessment-II 25 at the same time before proceeding to level I 10, level II 20, or both. Because a student may have a solid grasp of some pre-reading skills and not others, the assessment-I 15 and assessment-II 25 are not necessarily dependent on one another. For this reason, the assessment-I 15 and assessment-II 25 may be grouped as pre-reading assessments 85. For example, a student may need further instruction on sequencing skills, but that same student may have a satisfactory understanding of the alphabet and handwriting skills. As such, the student may complete assessment-I 15 and assessment-II 25 prior to working on any levels 10 or 20 so as to determine which levels 10 or 20, if any, should the student bypass before proceeding to assessment-III 35.

If the student satisfactorily completes assessment-III 35 to show that she possesses language skills beyond the teaching of level III 30, then that student should proceed to assessment-IV. This pattern continues until the student does not satisfactorily complete an assessment 35, 45, 55, 65, or 75, in which case that student proceeds to receive instruction from the appropriate level 30, 40, 50, 60, or 70. If the student satisfactorily completes all of the early reading assessments 95, then that student should proceed to more advanced instruction 9 beyond the early reading sections 90.

Because level III 30 through level VII 70 teach the same type of skills while increasing in difficulty, the early reading assessments 95 may be developed to be dependent on one another. For example, if a student satisfactorily completes assessment-III 35 but fails to perform as well on the subsequent assessment-IV 45, then that student should begin to receive instruction from level IV 40. After that student successfully completes level IV 40 instruction, then the student proceeds directly to level V 50 without the need to complete assessment-V 55, which results is a more productive use of time. Because level V 50 provides instruction on language skills similar to level IV, but having a greater degree of difficulty, the early reading assessments 95 may be developed so that there is no need to return to the assessments 95 after the student has not satisfactorily completed a particular assessment. One reason for this is that a student who does not possess language skills for a particular set of words is unlikely to possess those same language skills (phonology, semantics, syntax, and text) for words having a greater degree of difficulty. Alternatively, the early reading assessments 95 may be implemented such that the student does return to an assessment corresponding to the subsequent level after completing the prior level.

Once the early reading assessments 95 lead the student to the appropriate starting level 30, 40, 50, 60, or 70 for that individual, the student proceeds through the levels in order. For example, if the early reading assessments 95 lead the student to begin instruction at level III 30, then the student should proceed to level IV 40 after successfully completing level III 30. This pattern continues through completion of level VII where the student may then proceed to more advanced instruction 9 beyond the early reading levels 90.

Figure 3:
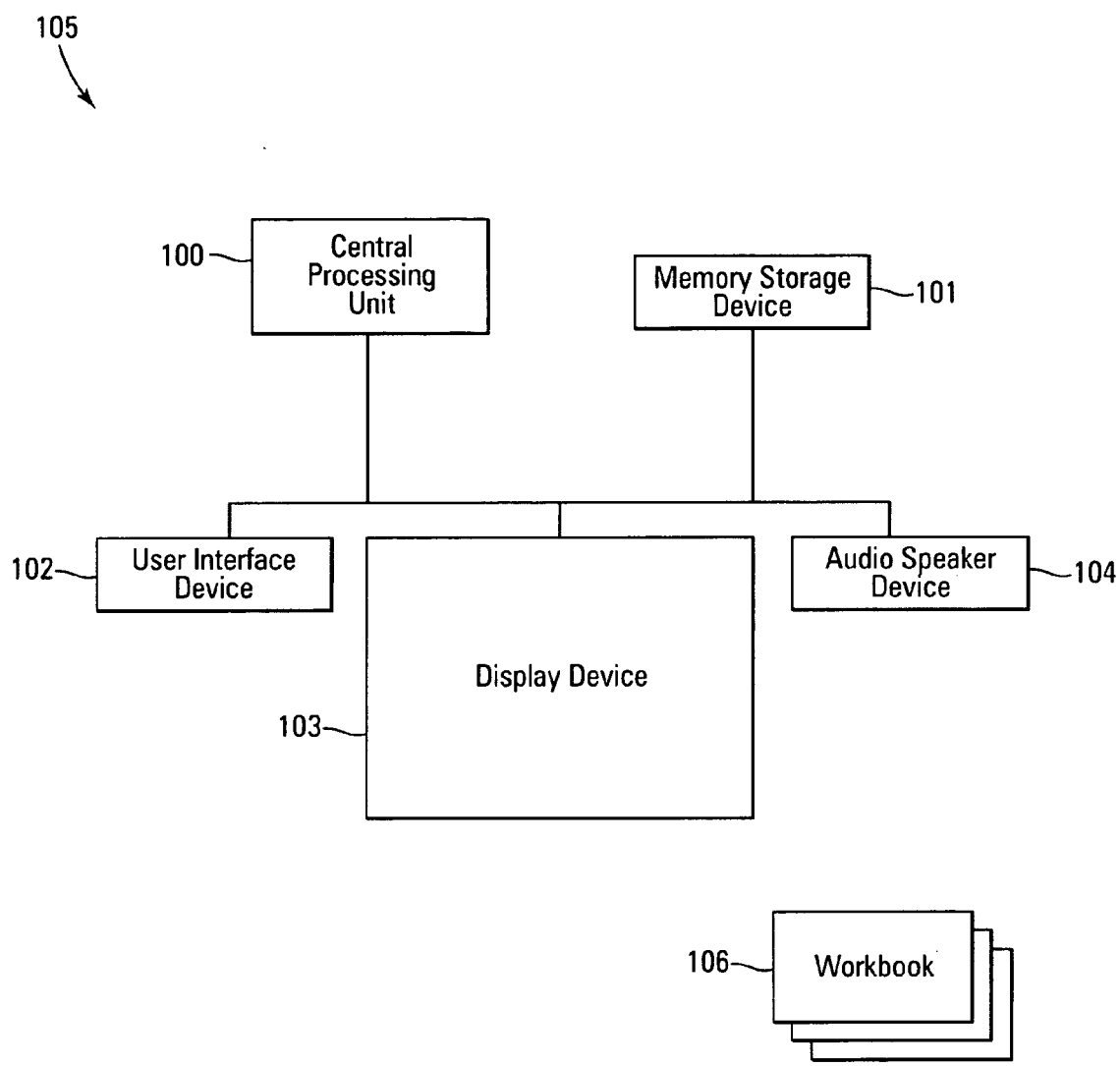
FIG. 3 is a diagram of a computer system that may be used to operate the literacy system in accordance with one embodiment of the invention.

The teaching of the literacy system 8 may be delivered to the student in the format of paper workbooks, video or classroom presentations, computer software, or a combination thereof. For example, the individual reading and writing exercises may be presented in a workbook format such that the exercises occupy individual worksheets in the workbook. As shown in FIG. 3, the literacy system 8 may alternatively be used as a computer software such that the student interacts with the computer system 105 to complete some or all of the exercises. In one embodiment, the literacy system 8 may be executable as a software program stored on a computer readable medium in a computer memory storage device 101, such as a computer hard drive, a floppy disk drive, a CD-ROM drive, or other conventional devices. The user may utilize a user interface device 102, such as a keyboard, computer mouse, touchscreen, or a combination thereof, to execute the literacy system 8 from the computer memory storage device 101 using a central processing unit 100 (CPU). The display device 103 may be used to display the various images, instructions, and exercises of the literacy system 8. The computer system 105 may include an audio speaker device 104 for delivering audible instructions or feedback to the user. In addition to the computer system 105, a workbook 106 may be used in conjunction with the computer system 105 to provide the student with further instructions and a tangible medium for particular reading and writing exercises.

The pre-reading section 80 of the literacy system 8 is described below, followed by a further description of the language skills section 90. It should be understood that U.S. patent application Ser. No. 10/350,849 and U.S. Provisional Application Ser. No. 60/362,749, both entitled "Literacy System" and both being previously incorporated by reference herein, also describe embodiments of the pre-reading section 80 and the language skills section 90.

Returning to the description of the pre-reading section 80 of the literacy system 8, the physical skill of sequencing may be developed through repetition of carefully constructed exercises. In one embodiment of the literacy system 8, sequencing exercises may be taught by the literacy system in level I 10 of the pre-reading section 80, as shown in FIGS. 1 and 2. While scanning from left to right to read letters may seem automatic to most literate people, the skill of sequencing is not necessarily a natural skill possessed by non-literate students. This is especially true for young children. Unlike the sequencing of letters to form words, most other objects that people visually perceive do not require left-to-right sequencing. For example, a car is still a car regardless of whether the student visually perceives it from the left or the right. From the perspective of a young child who has spent her past 4 or 5 years learning to overlook the left-to-right sequencing of objects, learning a language in which the sequence of objects forms the basis of understanding may be a daunting task. Even minute changes in the left-to-right sequence of letters may cause critical changes to the meaning of the letter or word. For example, left-to-right sequencing plays an important role in the difference between the letters "b" and "d", the letters "p" and "q", or the words "top" and "pot". Despite the fact that left-to-write sequencing is a critical skill required for reading and writing, the dominant view among literacy systems is that students will "pick it up." While some students do glean the necessary skills without instruction, those students who do not "pick it up" often experience frustration and displeasure with learning to read and write.

A student who cannot read may be familiar with the letters of the alphabet and give the appearance of knowing how to read sequences of letters. Without the physical skill of sequencing, however, actual reading may not be taking place. This is due to the fact that the student may rely on memorizing the letter names rather than on visually retaining the set of symbols during the sequencing exercises. As such, the use of foreign symbols which cannot be named by the child is one component that may be used by the literacy system 8 to teach visual sequencing. Foreign symbols may be any symbols that are not associated with the letters of the written language taught by the literacy system. In one example, a literacy system that teaches the English language may use symbols of the Greek language ($\alpha$, $\beta$, $\gamma$, and so forth) as foreign symbols in the sequencing exercises. The use of foreign symbols in sequencing exercises mirrors certain aspects of reading without requiring actual reading.

Figure 4:
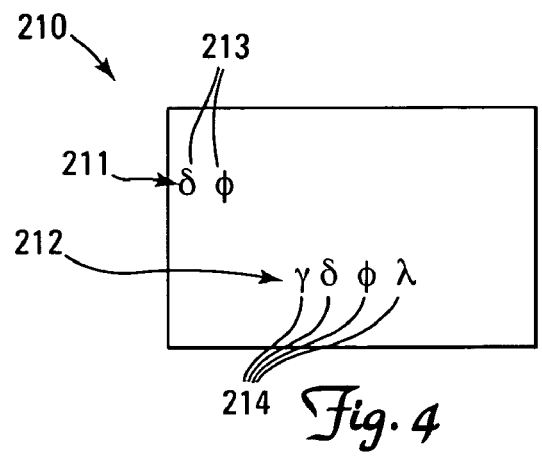
FIG. 4 is an image of a visual sequencing exercise in accordance with one embodiment of the invention.

Visual sequencing may be so novel to a student that even sequences of two elements may be problematic. Therefore, the initial sequencing exercises of the literacy system 8 begin with short patterns of two or three symbols that will be easiest for the student, as shown in FIG. 4. In one embodiment of a sequencing exercise 210, the student is shown two rows 211 and 212 of symbols with the top row 211 presenting a short sequence of two symbols 213 ($\delta\phi$). The symbols 214 ($\gamma\,\delta\,\phi\,\lambda$) of the bottom row 212 includes the same two symbols intermingled with additional ones. Thus, the bottom row 212 includes all of the symbols as the top row 211 in left-to-right sequence, but the bottom row 212 includes additional symbols intermingled with those from the top row 211. The student is instructed, via an instructor, a workbook, a computer system, or other instructional means, to view the symbols on the top row 211. Then the student is instructed to identify the symbols in the bottom row 212 that are the same as the symbols in the top row 211. To successfully complete the individual exercise 210, the student must identify, in the correct left to right order, to the same two symbols 213 in the bottom row 212 that appear in the top row 212. This type of sequencing exercise 210 is repeated over several sessions until the student displays a high level of skill. At this point, the student has begun to develop an important hidden ability possessed by literate people. The student is scanning, in a left-to-right order, short sequences of symbols that are not necessarily easy to label.

Figure 5A:
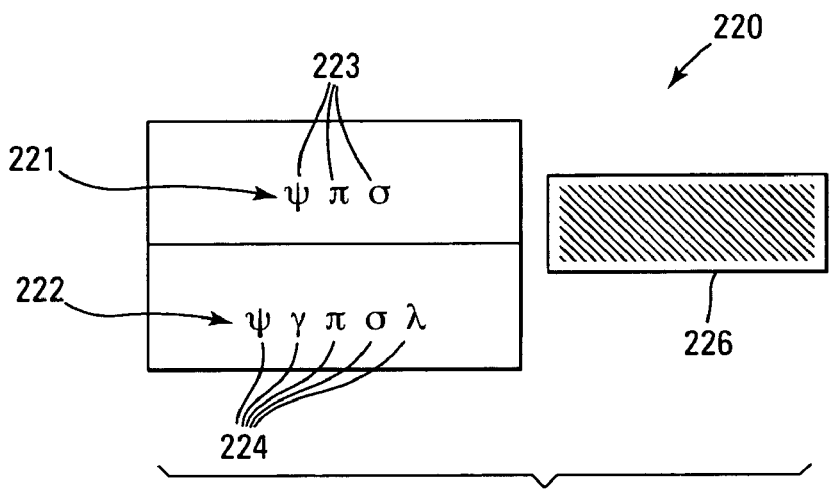
FIGS. 5A-C is a series of images showing another visual sequencing exercise in accordance with one embodiment of the invention.
Figure 5B:
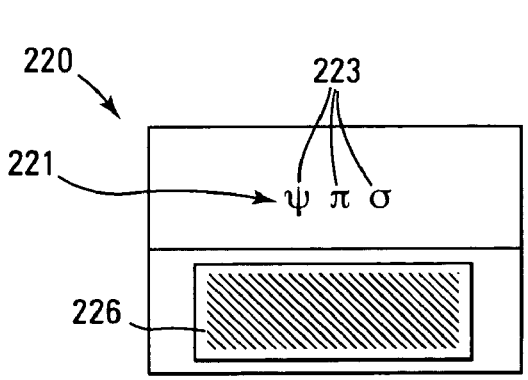
Figure 5C:
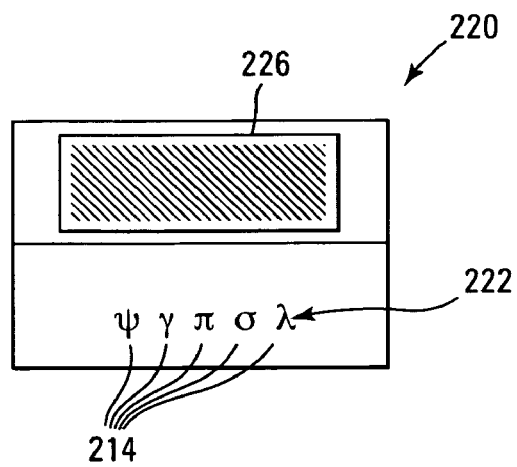

One embodiment of the next type of sequencing exercise 220 is shown in FIGS. 5A-C. This sequencing exercise 220 may be used to develop the skill of retaining in short term memory the sequence of symbols. The exercise 220 includes a top row 221 and a bottom row 222 of symbols 223 and 224. In addition, the exercise 220 may use a covering element 226, which may be used to cover either the top row 221 or the bottom row 222 of symbols. The sequencing-memory exercise 220 may be practiced using a workbook format, a flash card format, a computer system format, or another convention format. Certain formats, such as a computer format, might eliminate the need of the covering element 226.

To successfully complete the exercise 220, the student is instructed to view the symbols 223 in the top row 221 while the symbols 224 of the bottom row 222 are not displayed, as is shown in FIG. 5B. The covering element 226 may be used to cover the bottom row 222. Then, the symbols 223 from the top row 221 are hidden from the student's view, and the symbols 224 in the bottom row 222 are displayed, as shown in FIG. 5C. Without looking back to the symbols 223 in the top row 221, the student is instructed to select, in left to right order, the same symbols from the top row 221 that included in the bottom row 224. At this point, the student is working from memory. Without being able to see the top row 221, the student is forced to make the correct selection is by retaining an image of the original pattern, which develops a hidden ability possessed by literate people to memorize sequences of symbols.

After the student has become accustomed to retaining sequences of two and three symbols, the patterns increase to four symbols. While four symbols are merely one more than three, it may represent a significant leap in difficulty for the student. When the longer patterns are introduced, the literacy system 8 may revert back to sequencing exercises of direct matching with no memory demands, similar to that of FIG. 4. This is an example of a teaching principal that uses review of prior material with steady additions of new material. In such a case, the literacy system 8 begins to incorporate new, slightly more complex content after the student has shown a mastery of less complex content. However, the literacy system 8 continues to systematically use the less complex skills attained by the student when exposing the student to slightly more complex content.

Figure 6:
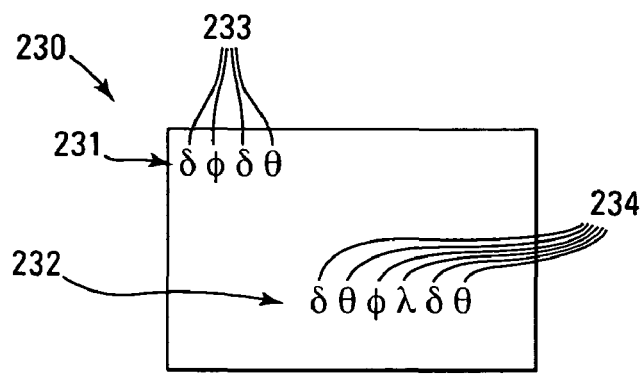
FIG. 6 is an image of a visual sequencing exercise in accordance with one embodiment of the invention.

As shown in FIG. 6, one embodiment of such a sequencing exercise 230 includes two rows 231 and 232 of symbols with the top row 231 presenting a sequence of four symbols 233. Similar to the embodiment shown in FIG. 4, the bottom row 232 includes all of the symbols as the top row 231 in left-to-right sequence, but the bottom row 232 includes additional symbols intermingled with those from the top row 231. The student is instructed to identify the symbols in the bottom row 232 that are the same as the symbols in the top row 231. To successfully complete the individual exercise 230, the student must identify, in the correct left to right order, to the same symbols 233 in the bottom row 232 that appear in the top row 231.

Figure 7A:
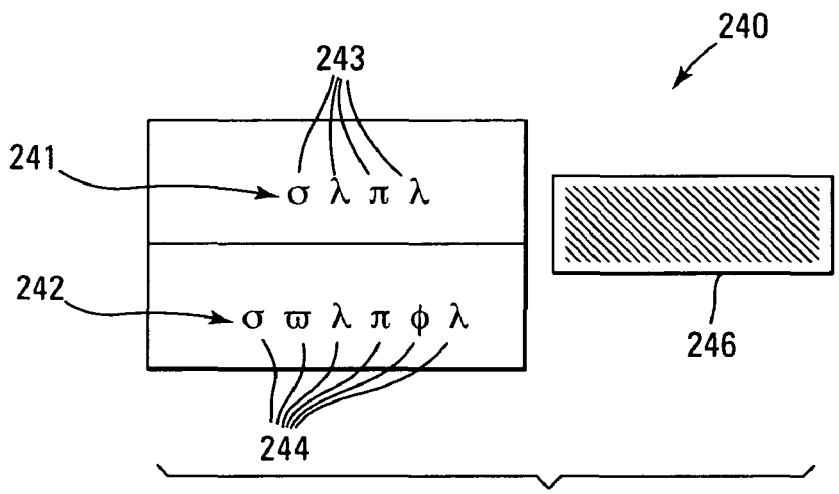
FIG. 7A-C is a series of images of a visual sequencing exercise in accordance with one embodiment of the invention.
Figures 7B, 7C:
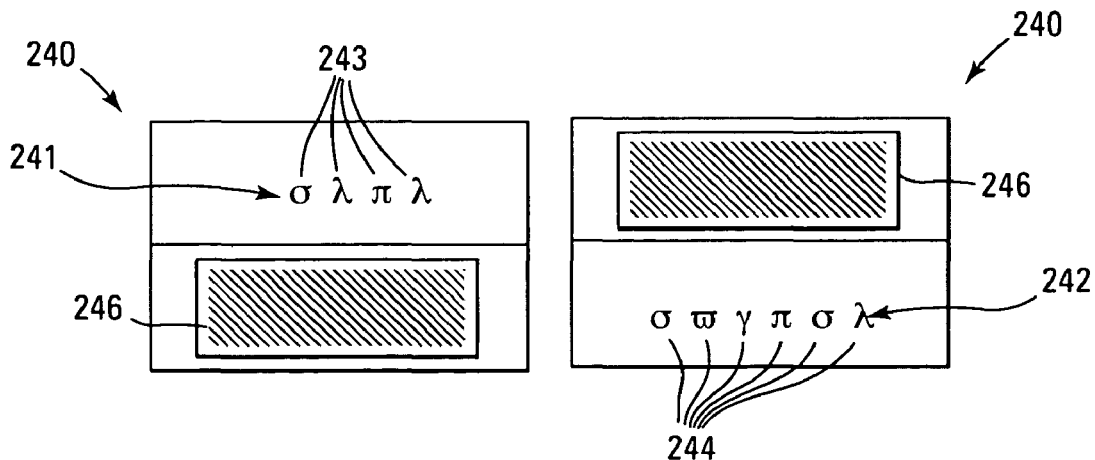

FIGS. 7A-C show another embodiment of a sequencing exercise 240 using a sequence of four symbols. In this exercise 240 the student progresses to memorization of sequences having four symbols. The exercise 240 includes a top row 241 and a bottom row 242 of symbols 243 and 244. Similar to the exercise 220 shown in FIGS. 5A-C, the student is instructed to view the symbols 243 in the top row 241 while the symbols 244 of the bottom row 242 are not displayed, as is shown in FIG. 7B. The covering element 246 may be used to cover the bottom row 242. Then, the symbols 243 from the top row 241 are hidden from the student's view, and the symbols 244 in the bottom row 242 are displayed, as shown in FIG. 7C. Without looking back to the symbols 243 in the top row 241, the student is instructed to select, in left to right order, the same symbols from the top row 241 that included in the bottom row 244.

Figure 8:
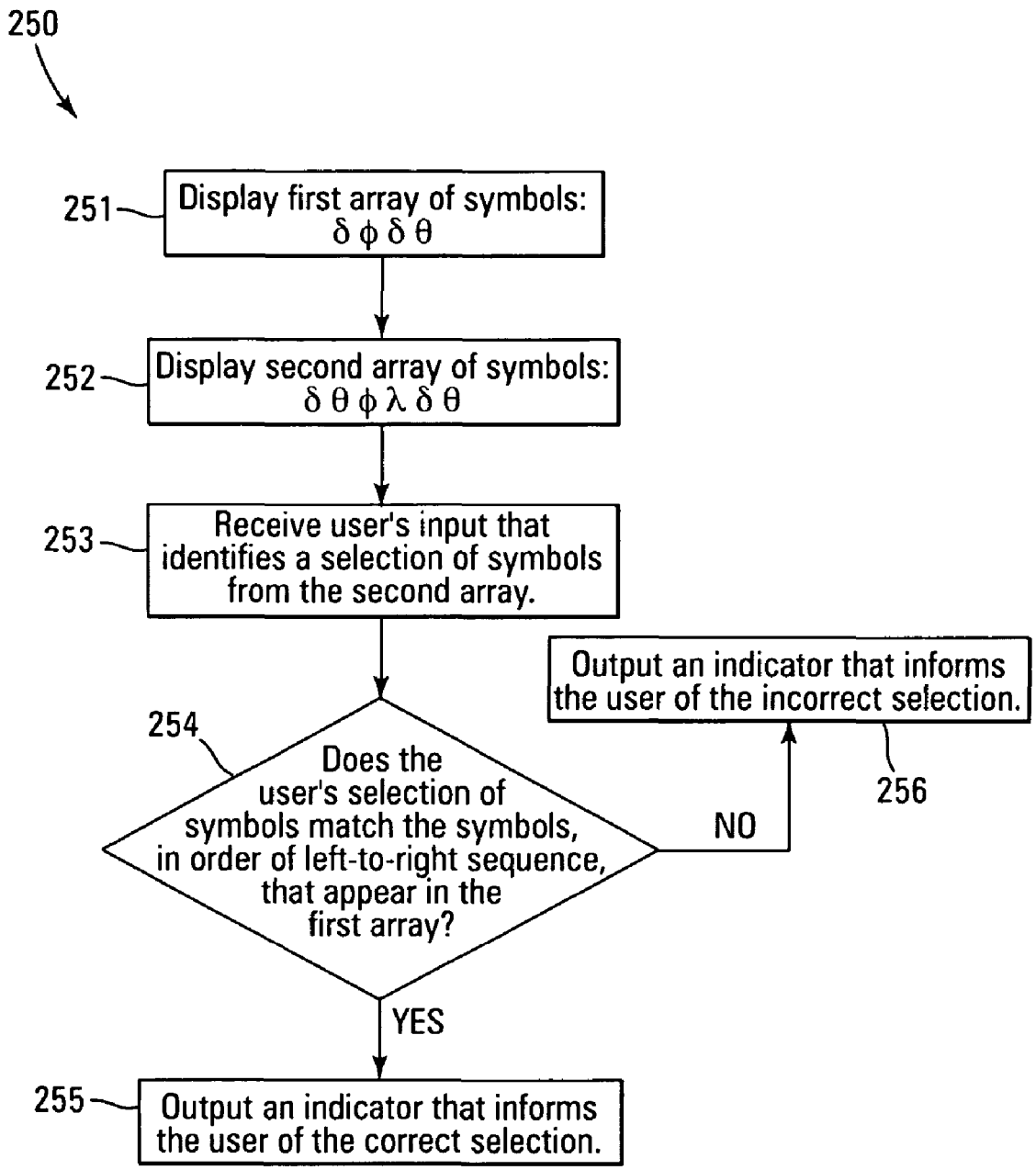
FIG. 8 is a flow chart of instructions for a visual sequencing exercise in accordance with one embodiment of the invention.

In accordance with one embodiment of the literacy system 8, the visual sequencing exercises may be implemented using a computer system. As shown in FIG. 8, a series of functions 250 may be performed by the computer system so as to enable the student to practice the sequencing exercises. The computer system may display a first array of symbols, as shown in step 251. In this example, the symbols are the same foreign symbols shown in FIG. 6. The next step 252 displays a second array of symbols. Depending on the type of visual sequencing exercise that is used, the first array may be displayed while the second array is also displayed such that the student performs direct matching exercises. Otherwise, the first array of symbols may be removed from display while the second array is displayed such that the student performs the sequencing exercise using memorization of the symbols. The student is instructed to identify, in left-to-right order, the symbols in the second array that match those of the first array. In step 253, the computer system receives the student's selection of symbols. The student may input the selection using a user interface device, as previously described. In step 254, the computer system determines whether the student's selection of symbols from the second array correctly matches, in left-to-right order, the symbols from the first array. As shown in step 255, if the student's selection was correct, then the computer system outputs an indicator informing the student of the correct selection, such as a visual indicator on a computer screen or an audible indicator from a speaker. If the student's selection was incorrect, then the computer system outputs an indicator informing the student of the incorrect selection, as shown in step 256. In such a case, the computer system may repeat the steps 251, 252, 253, and 254 so that the student may retry the identical sequencing exercise.

U.S. patent application Ser. No. 10/350,849 and U.S. Provisional Application Ser. No. 60/362,749, both entitled "Literacy System" and both being previously incorporated by reference herein, also describe embodiments of sequencing exercises including foreign symbols that are not associated with letters of a written language taught by the literacy system. As described in the previously incorporated U.S. application Ser. Nos. 10/350,849 and 60/362,749, the visual sequencing exercises may be implemented using a computer system, one or more workbooks, a video or classroom presentation, or the like to enable the student to practice the sequencing exercises.

Other physical skills that may be taught in the pre-reading section 80 of the literacy system 8 are the motor skills associated with writing. In one embodiment of the literacy system 8, the motor skills exercises may be taught in level II 20 of the pre-reading section 80, as shown in FIGS. 1 and 2. One reason for teaching a student to effectively write letters prior to reading, or at the start thereof, is that the student may then be able to write any word that she reads. Reading and writing may then be practiced in tandem, each promoting the other. Unlike the skills of visual sequencing, the alphabet generally receives significant attention in the area of early literacy instruction. For example, young children are exposed to the alphabet via letters printed on toys, discussed in songs, or used in children's games. While exposing young children to the alphabet may encourage their tendency to learn reading, the act of writing those same letters calls upon a range of intricate motor skills, which may be difficult to master. As described below, the literacy system 8 may include certain aspects to develop these intricate motor skills, such as an early emphasis on lower case letters (in contrast to the emphasis on upper case letters in most early instruction) or sequencing handwriting exercises from simple to complex letter shapes (not by letters in alphabetical order).

In accordance with one aspect of the inventive literacy system 8, the student is not necessarily instructed to practice handwriting of letters in alphabetical order. Learning to write letters in alphabetical order (i.e. practicing the letter "a" prior to practicing the letter "b") may seem more instinctual to a literate person who was previously instructed in this manner or to prior art systems, but the letters "a" and "b" are relative complex shapes compared to other letters. Instead, the literacy system 8 may use exercises of handwriting the letters in order of motor skill simplicity. As such, letters with simpler shape, size and placement may be practiced during the initial steps of the motor skills exercises, and after the student has successfully learned to write these letters, the exercises proceed to teaching letters of more complex shape.

In accordance with another aspect of the inventive literacy system 8, the motor skills exercises emphasize the use of lower case letters in writing. In prior art systems, capital letters dominate the early handwriting training, or at least play an overly-prominent role, which cause students to focus on the less commonly used capital letters and to develop poor habits. By some estimates, fewer than 1% of the letters on pages read by early reading students appear as capital letters, which may lead to conflict between their reading systems and writing systems. The inventive literacy system 8 highlights the similarities between reading and writing, not necessarily the differences.

Figure 9:
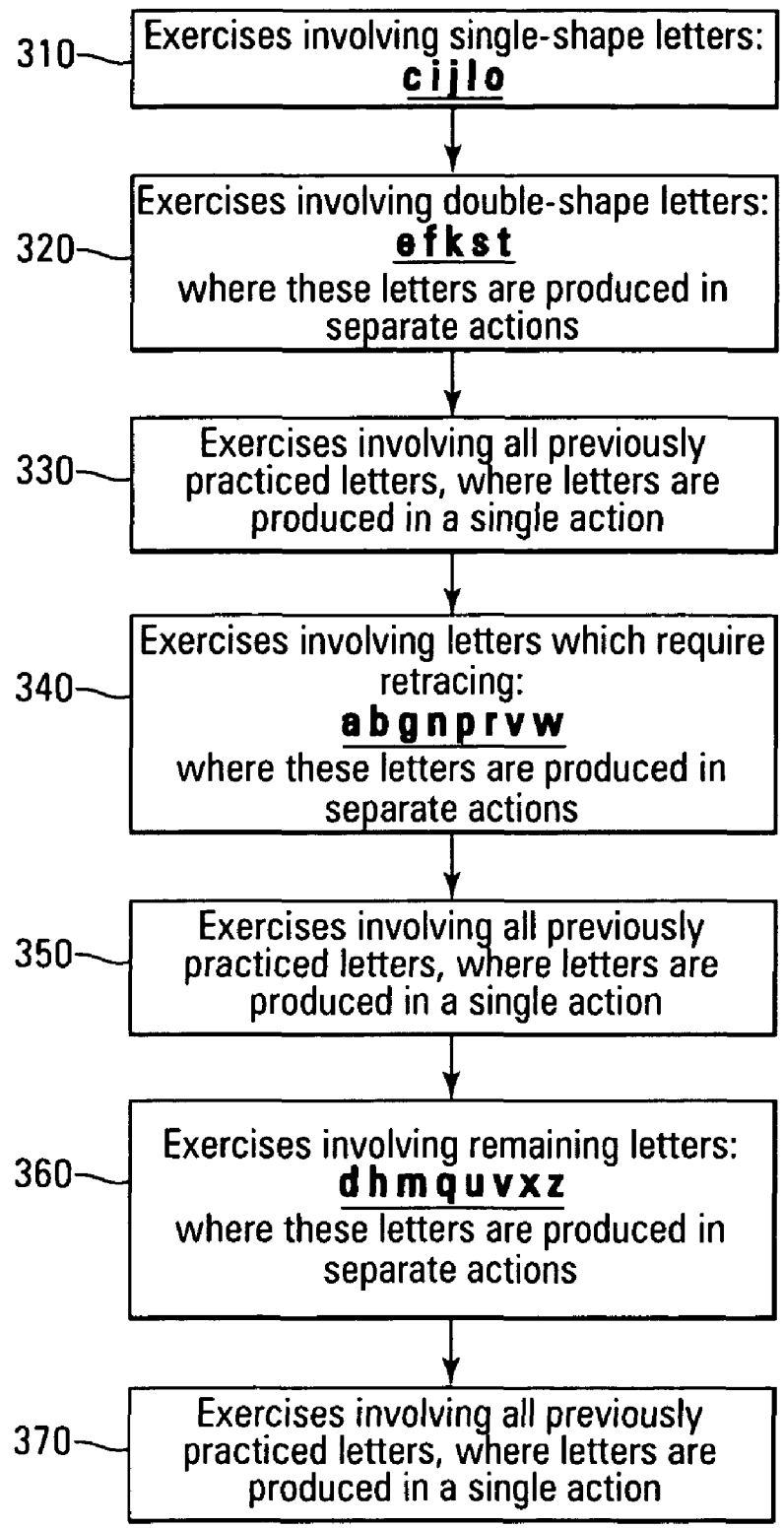
FIG. 9 is a flow diagram of motor skills exercises in accordance with one embodiment of the invention.

One embodiment of motor skills exercises of the literacy system 8 is shown in FIG. 9. The motor skills exercises are divided into seven steps 310, 320, 330, 340, 350, 360, and 370, wherein four steps 310, 320, 340, and 360 introduce new letters of the alphabet to the student. Letters composed of single shapes (c, i, j, l, and o) are introduced to the student in the first step 310. The student may produce each letter by modeling movements of an instructor, such as a human instructor, an image displayed from a computer system, or the like. In the next step 320, the student is introduced to exercises involving double-shape letters (e, f, k, s, and t), but these letters are produced in separate actions. For example, the letter "e" may be constructed with two separate actions: a small horizontal line (-) and a curved shape (C). In such a case, the student would model the horizontal line (-) after the instructor's line, and then the student would model the curved shape (C) after the instructor's action. In keeping with the teaching principal of reviewing prior materials with steady additions of new material, the single-shaped letters that were practiced in the previous step 310 are continued in the handwriting exercises of step 320.

The third step 330 does not introduce new letters, but instead the letters from steps 310 and 320 are produced by the student using a single action. Unlike the previous example of using separate actions to produce the letter "e," this step 330 of the motor skills exercises requires the student to model the letter "e" in a single action after the instructor initially produces the letter in a single action. The next step 340 in the motor skills exercises proceeds to more complex letters that require a retracing action. For example, the letter "n" requires a vertical line (l) in the downward direction with a retracing action over part of the vertical line in the upward direction before completing the letter with a curved shape (℩). The letters requiring a retracing action that are practiced in step 340 include a, b, g, n, p, r, y, and w. Each of these letters is produced by the student using separate actions, such as the downward vertical line (l) for the letter "n" followed by the vertical retracing action in combination with the curved shape (℩). Again, the teaching principal of reviewing prior materials with steady additions of new material is utilized so that the letters from previous step 330 are continued in the handwriting exercises of step 340. Step 350 is similar to the previous step 330, in which all of the letters previously taught are practiced using single actions. However, step 350 includes the letters that were practiced in step 340 (a, b, g, n, p, r, y, and w).

So as not to overload the student, the letters which require retracing are introduced in two different steps 340 and 360. Step 360 introduces the remaining letters of the alphabet that have not yet been introduced (d, h, m, q, u, v, x, and z), including some letters that do not require retracing actions (x and z). Each newly introduced letter is produced by the student using separate actions, as described in previous examples. Also, previously practiced letters are included in the exercises of step 360 so as to review prior material with steady additions of new material. Subsequently, step 370 includes exercises involving all letters, but the student is required to complete each letter using a single action.

Figure 10:
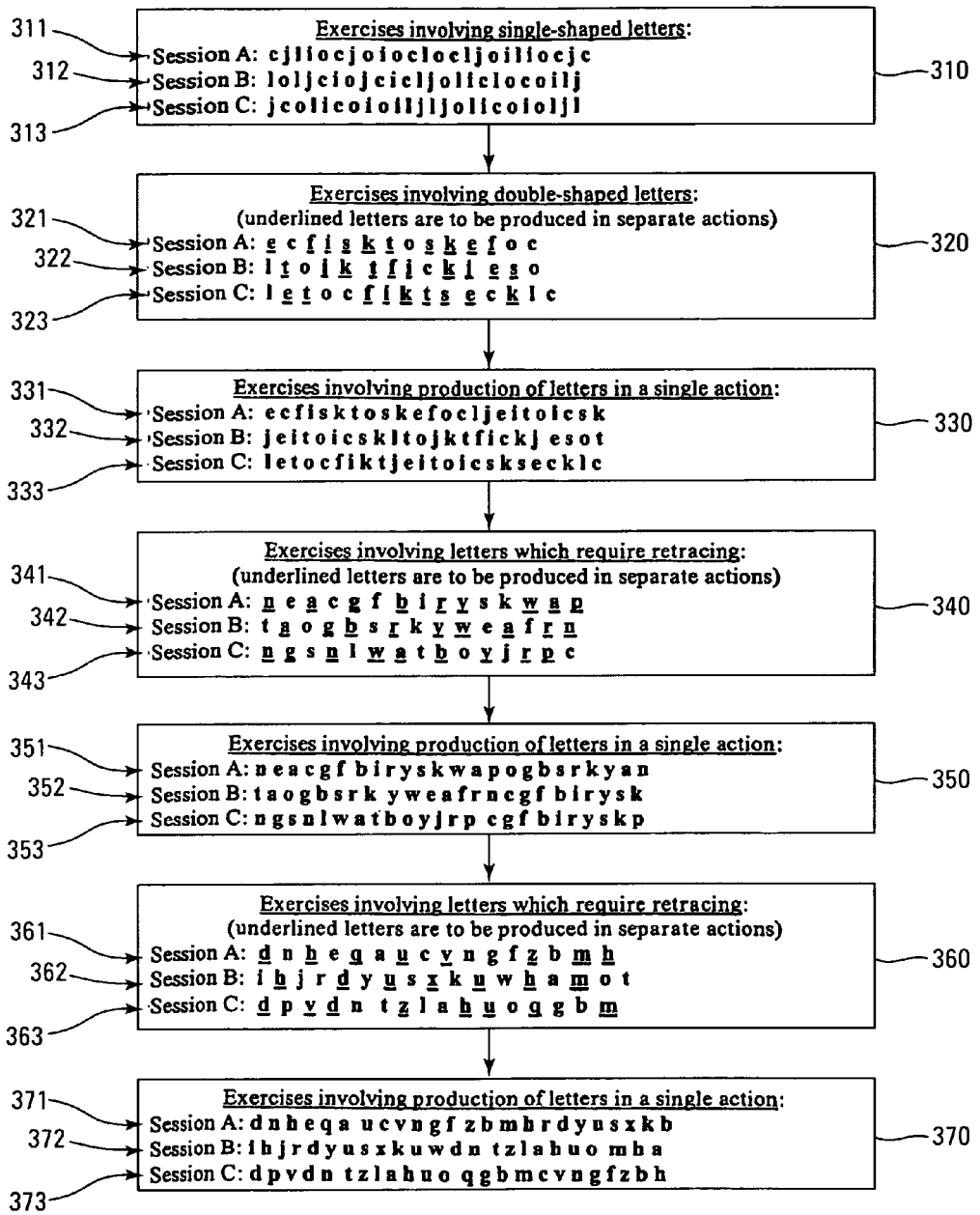
FIG. 10 is a flow diagram of a further embodiment of the motor skills exercises of FIG. 9.

FIG. 10 shows one embodiment of the steps 310, 320, 330, 340, 350, 360, and 370 used in the motor skills exercises of the literacy system 8. Each step includes sessions in which the student produces certain letters in a particular order. For example, step 310 includes three sessions 311, 312, and 313, which provide exercises for writing the single-shaped letters in a certain order. The student is not necessarily required to write the same letter in a repetitive manner, but instead the student shifts from one single-shaped letter to the next so as to resemble actual reading and writing skills. In one embodiment, the student may be required to complete each session 311, 312, and 313 up to six times for a total of eighteen sessions, at which point the student may proceed to the next step 320.

The sessions 321, 322, and 323 of step 320 in FIG. 10 show the intermingling of single-shaped letters (c, i, j, l, and o) with double-shaped letters (e, f, k, s, and t) throughout the exercise. Certain letters in step 320 (i, j, e, f, k, s, and t) may be completed by the student using separate actions. Again, one embodiment of the motor skills exercises may require the student to complete each session 321, 322, and 323 up to six times for a total of eighteen sessions. After the student has completed the required sessions, then the student may proceed to the subsequent step 330. The pattern continues in a similar manner until the student has completed the required sessions through step 370, at which point the student has completed the motor skills exercises of the pre-reading section 85 of the literacy system 8.

U.S. patent application Ser. No. 10/350,849 and U.S. Provisional Application Ser. No. 60/362,749, both entitled "Literacy System" and both being previously incorporated by reference herein, also describe embodiments of the motor skills exercises introduce letters in order of shape, size, and placement simplicity. As described in the previously incorporated U.S. application Ser. Nos. 10/350,849 and 60/362, 749, the motor skills exercises may be implemented using a computer system, one or more workbooks, a video or classroom presentation, or the like to enable the student to practice the sequencing exercises.

Turning now to the description of the language skills section 90 of the literacy system 8, the skills of phonology, semantics, syntax, and text may be collectively developed through repetition of carefully constructed exercises. In one embodiment of the literacy system 8, language skills exercises may be taught by the literacy system in level III 30, level IV 40, level V 50, level VI 60, and level VII 70 as shown in FIGS. 1 and 2. Starting with the first level III 30, the exercises are configured to collectively develop the language skills of phonology, semantics, syntax, and text in the context to teaching the student to read and write. In other words, the language skills exercises are configured to develop all of the language skills of phonology, semantics, syntax, and text from the beginning level (e.g., level III 30), without a supreme emphasis on "phonics" which can hinder the development of the semantics, syntax, and text skills. Each of the subsequent levels 40, 50, 60, and 70 also includes exercises collectively develop the language skills of phonology, semantics, syntax, and text. The difficulty of the reading and writing exercises in each level 30, 40, 50, 60, and 70 increases as the student progresses to the subsequent level. For example, the exercises in level 30 may introduce a first set of content words and non-content words. Then, the exercises in level 40 may integrate the first set of content words and non-content words with a second set of content words and non-content words. In general, the second set of content words and non-content words may be more challenging to the student so that the exercises in level 40 build upon the words and exercises practiced in level 30. As described in more detail below, content words can be nouns, verbs, adjectives or adverbs used to tell a story, and non-content words can be pronouns, articles, prepositions or word particles (e.g., -ed, -'s, -ing or -self on the end of a word).

Figure 11:
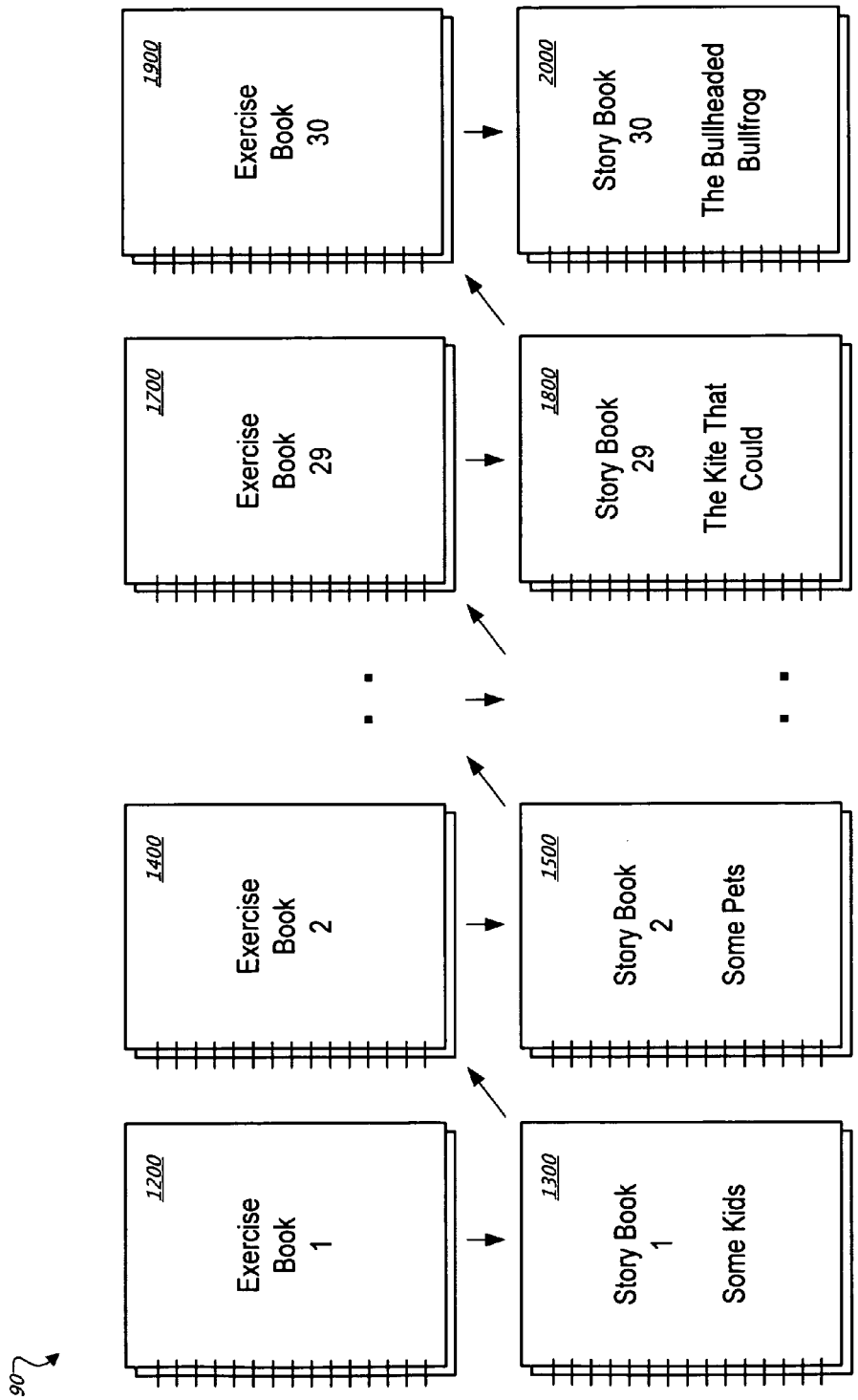
FIG. 11 shows an embodiment of the literacy system using sequence of exercise books and associated story books.

Referring to FIG. 11, the language skills section 90 can be implemented using a computer system (for example, as described in connection with FIG. 3), one or more workbooks (for example, as described in connection with FIG. 3), a video or classroom presentation, or the like, which displays exercise books 1200, 1400, 1700 and 1900 and their associated story books 1300, 1500, 1800 and 2000. In this embodiment, the exercise books 1200, 1400, 1700 and 1900 and the story books 1300, 1500, 1800 and 2000 are depicted in the form of workbooks. The exercise books 1200, 1400, 1700 and 1900 are designed to teach the student language skills of phonology, semantics, syntax, and text using a sequence of manageable sessions and increasingly more challenging exercises within each exercise book. A session can include several exercises, each of which can teach one or more of the four complementary language skills. Each session also makes use of skills and words learned in previous sessions, as well as previous exercise books. Upon completion of a given exercise book, the student may proceed to the corresponding story book. For example, upon developing the skills within "Exercise Book 1" 1200, the student can immediately practice and reinforce those learned skills by reading "Story Book 1" 1300. Then, after completing "Story Book 1" 1300, the student can continue with the next workbooks in the sequence, in this case "Exercise Book 2" 1400 and then "Story Book 2" 1500. This progression through the workbooks continues through completion of the remaining workbooks 1700, 1800, 1900 and 2000. Upon completion of the final workbook 1900 (e.g., "Story Book 30"), the student may have practiced and developed the generally more challenging skills and words in the literacy system 8. It should be understood that, in some embodiments, some or all of the exercise books 1200, 1400, 1700 and 1900 and the storybooks 1300, 1500, 1800 and 2000 can be displayed and implemented using a computer system, as previously described in connection with FIG. 3. Exemplary embodiments of exercise books and story books that can be used in the language skills section 90 within the literacy system 8 now follow.

Referring to FIG. 12A, the language skills section 90 may begin with the exercise book 1200 that collectively develops the language skills of phonology, semantics, syntax, and text at an introductory level. The exercise book 1200 can be one of several workbooks within level III 30 for developing language skills. It should be understood from the description herein that "Exercise Book 1" 1200 can be displayed using a computer system, a series of printed exercise sheets in a workbook format, or a combination thereof. The difficulty level here can be based on the student having developed the prerequisite skills, such as the sequencing skills and motor skills practiced in the pre-reading section 80 of the literacy system 8.

Still referring to FIG. 12A, the exercise book 1200 can include an exemplary instruction page 1201 that includes a summary 1202 describing the purpose of the exercise book and its position within the program. For example, the summary 1202 identifies the exercise book 1200 as being part of the "Boarding" level (e.g., in this embodiment, corresponding to level III 30 described in connection with FIG. 1 and FIG. 10) and indicates that the student already should have completed "Sequences in Sight" and "Letters to Write" levels (e.g., in this embodiment, corresponding to level I 10 and level II 20) or the corresponding skills check. The summary 1202 further lists the main objectives of the exercise book 1200, which in this case are the targeted words for the student is to learn. The target words here include content words 1204 (e.g., kid, girl, kids, girls, boy and boys) and non-content words 1205 (e.g., some, a and more) that are to be introduced in the current exercise book 1200. The boy, boys word pair 1206 is further grouped visually (shown here as a pair separated by commas) to indicate that they are to be covered in the same session of the exercise book. As previously described, a content word can be a noun, verb, adjective or adverb used to impart key concepts in a story. For example: nouns can be used for the characters, objects and events in the story; verbs can be used for the actions that the nouns carry out or experience in the story; adjectives are used to describe the characteristics of the nouns in the story; and adverbs are used to modify the verbs and adjectives in the story. A non-content word can be a pronoun, article, preposition or word "particle" (e.g., -ed, -'s, -ing or -self on the end of a word) that does not appear to have a direct meaning unto itself. For simplicity, the instruction sheet 1201 characterizes the content words 1204 as "words that describe the world" and the non-content words 1205 as "words that combine to form sentences." For example, the content words 1204 and non-content words 1205 shown here are all used in the subsequent "Story Book 1" (described in more detail below in connection with FIGS. 13A-13G), which follows completion of this exercise book 1200. These content words are selected for use in exercise book 1200 not on the basis of simplicity alone, but also on their potential to combine to form meaningful stories in the associated story book 1300 and in other subsequent story books of the language skills section 90. Also, the content words may also be selected to represent related concepts in a story; for example, boys and/or girls can be kids. Furthermore, the content words introduce the notion of singularity and plurality by simply adding the letter "s", which provides additional flexibility in creating meaningful stories in the associated story book 1300.

Still referring to FIG. 12A, the instruction sheet 1201 can include a "What To Do" section 1208 providing detailed instructions and techniques for supervising the student's learning program. For example, the "What To Do" section 1208 can state that an individual session will focus on a single target word and any variants, so that all forms (e.g., boy and boys) familiar with the student can be used. The "What To Do" section 1208 can further include guidelines for error correction. For example, the instructions here can suggest that the student be prompted to immediately repeat any misread word and immediately rewrite any incorrectly formed word. In computer-based implementations, re-read words can be processed by speech recognition systems or by a human instructor, and writing interfaces can employ pattern recognition logic to interpret characters written on a touch pad, or using a mouse, for example. The "What To Do" section 1208 can further suggest daily and weekly workloads for the student and identify the story book (e.g., "Story Book 1" 1300) that follows completion of the exercise book. Finally, the instruction sheet 1201 can include a "Continue to 1a" prompt 1209 identifying the next page of the exercise book 1200.

Referring to FIG. 12B, the exercise book 1200 may include several types of language skills exercises, which can be displayed, for example, on an exercise sheet 1212. Exercise sheet 1212 can be the first of several exercise sheets in the exercise book 1200, as indicated by page number "1a" 1213. The main purpose of exercise sheet 1212 is to introduce a target word kid 1214 using exercises that develop some or all of the languages skills selected from phonology, semantics, syntax, and text. The target word kid 1214 here corresponds to the first of several content words 1204 listed in the instruction sheet 1201 shown in FIG. 12A. To track and reinforce the progress through the various phases of the reading/writing program, the top portion of exercise sheet 1212 also includes an icon 1215 which identifies the current level or learning. Here, the "Boarding" level is highlighted, indicating that the current exercise sheet is part of that phase. An assessment instruction 1217 is the first section on exercise sheet 1212. The "Is It Known?" exercise 1217 provides the instructions used to determine if the student already knows the material covered in the current session (e.g., target word is kid). If the student, for example, can correctly write kid when asked to do so, the student can skip the target word kid (and its entire corresponding exercise sheet 1212) and move on to the next target word. Otherwise, the student may be asked to complete the exercises included here for the target word kid.

Still referring to FIG. 12B, one particular type of exercise displayed on exercise sheet 1212 is referred to, for example, as a "Savvy Sounds" exercise 1219. An accompanying "What To Do" caption 1220 provides detailed instructions for administering the exercise 1219. In particular, the instructions explain how the student is tested on the ability to differentiate the word kid from other words having similar properties. For example, after the target word kid 1214 is pointed to and then covered up, the teacher points to the prefix ki_ on row 1221, and say "this says ki." The teacher then points to the kid and kiss entries on the line, and tell the student to "find kid." The student circles the correct answer kid and leaves the incorrect answer (e.g., kiss) un-circled. In such an exercise 1219, blending of sounds is required of the student, and the use of "bit blends" enhances success. Bit blends can eliminate many of the problems raised by some traditional "sounding out" techniques. Bit blends enable students to experience steady success in combining sounds to form words. For example, on row 1221 the student is provided the "bit" ki, containing the initial sounds in kid, and need only to "blend" the final "bit" d to complete the word. In this early reading exercise, the student is not required to read nontargeted words (such as kiss, kick, kiln, and kin in this example exercise); rather, the student must only recognize that those nontargeted words are different from the target word kid. In this exercise, the student also learns that "ending" letters in words can be important—a concept frequently overlooked by some traditional "sounding out" techniques. Similarly, other "Savvy Sounds" exercises throughout the literacy system 8 may present word groups with similar beginning- and middle-of-word properties. After completing the first row 1221, the actions of locating the kid entries would then continue for the remaining rows in the exercise. Upon successful completion of the last row of the "Savvy Sounds" exercise 1219, the student could advance to the next exercise on exercise sheet 1212.

Still referring to FIG. 12B, another type of exercise displayed on exercise sheet 1212 is referred to, for example, as a "Spot 'n Sort" exercise 1223. The "Spot 'n Sort" exercise 1223 includes an accompanying "What To Do" instructions 1224. Again, the instructions 1224 describe the recommended actions and interactions required to successfully lead the student through the exercise. Here the student is asked to "cross out any word that does NOT belong," in particular, words that don't match the target word kid. For example, in row 1225, the student would cross out apple, kiss and toy, leaving kid unchanged. If the "Spot 'n Sort" exercise 1223 is the last exercise on the exercise sheet 1212, the student would simply turn over the exercise sheet, as directed to do so by the "Please Turn Over" prompt 1226. In implementations in which the literacy system 8 is hosted on a computer, the student may instead click a control button, or give a voice command, to advance to the next screen.

The action of crossing out non-kid words in the "Spot 'n Sort" exercise 1223 contrasts with the action of circling kid words in the "Savvy Sounds" exercise 1219, but both exercises 1223 and 1219 can be used to collectively develop a number of language skills such as phonology and semantics. For example, the "Savvy Sounds" exercise 1219 can develop phonology skills because the student recognizes the target word kid on each row and reproduces the sounds of the letters in kid. The "Spot 'n Sort" exercise 1223 also develops phonology skills because the student recognizes the target word kid within each row and crosses out words that are not kid. The "Savvy Sounds" exercise 1219 can further develop semantics skills because reciting the word kid on each row can improve comprehension of the meaning of the word kid.

Referring to FIG. 12C, the exercise book 1200 may include another type of language skills exercise referred to, for example, as a "Pick the Picture" exercise 1228. In this exercise shown on exercise sheet 1213, the student begins to practice writing skills for the first time within the "Boarding" level (e.g., in this embodiment, corresponding to level III 30). Here the student is asked to find the picture that shows kid and to write the word on the line below the picture. For example, the student would write kid under the boy picture 1229a, the girl picture 1229b, and the boy picture 1229c. The pictures 1229a, 1229b and 1229c all depict various kids, thus identifying them and writing kid on the lines teaches semantics and text skills.

The "Pick the Picture" exercise 1228 can collectively develop a number of language skills, including phonology and semantics. For example, the student can learn phonology skills by writing the letters comprising the target word kid in boxes 1229a, 1229b and 1299c and then reciting the word kid. In addition, the student can learn semantics skills by comprehending the meaning of kid while recognizing pictures of kids in the boxes 1229a, 1229b and 1299c. Furthermore, the student is not required to recognize or write nontargeted words (such as truck, plane, and cat as depicted in this example exercise); rather, the student need only recognize pictures that show the targeted word (e.g., kid in this example) and to write that particular target word.

Accurate spelling is required from the outset in the language skills section 90, so any spelling errors made here by the student can be immediately corrected with the help of a supervisor (or a computer system in some embodiments). To avoid over-reliance on three-letter words, some of the words (especially in later exercise books) can be longer and more complex than those in other learn-to-read systems.

Still referring to FIG. 12C, another type of exercise displayed on exercise sheet 1213 is referred to, for example, as a "Find 'n Fill" exercise 1230. In this exercise, the student is asked to find any incomplete words on a given row "that can become kid." For example, the first incomplete word on row 1231 is k_d, thus adding the letter i would complete the word. The same is true for the last word in row 1231, where adding the beginning letter k to _id completes the word. By contrast, incomplete words s_n and d_d cannot become kid, thus the student would skip those words. For words that are successfully completed, the student is asked to then recite those words. Any errors in identifying a word, writing to complete the word, or reciting the word may be immediately corrected with the help of a supervisor (or a computer system in some embodiments). The actions here continue for the remaining rows of the exercise, where generally more challenging incomplete words can be presented, such as words missing multiple letters in various places. In this embodiment, upon completion of the "Find 'n Fill" exercise 1230, the session is complete, as indicated by an "End of Session" caption 1233. The student can then proceed to the next session.

The "Find 'n Fill" exercise 1230 can collectively develop a number of language skills, including phonology and semantics. For example, the student can learn phonology skills by comparing (and pronouncing) the letters comprising the target word kid versus the letters that form nontargeted words. In addition, "Find 'n Fill" exercise 1230 can further develop semantics skills because reciting the word kid on each row can improve comprehension of the meaning of the word kid. Here, the student is not required to recognize or write letters of the nontargeted words; rather, the student need only recognize that the letters of those nontargeted words are different from the target word kid.

Referring to FIG. 12D, the next session of the exercise book 1200 may include one or more exercises as previously described, except that the target word is different from that of the first session. For example, this session covers a target word girl 1236. The exercise sheet 1235 includes an assessment instruction 1237 similar to the assessment instruction 1217 described in connection with FIG. 12B, but the instructions here are geared toward the target word girl. Exercise sheet 1235 also includes similar exercises as were included in exercise sheet 1212. For example, exercise sheet 1235 includes a "Savvy Sounds" exercise 1238 which is similar to the "Savvy Sounds" exercise 1219 described in connection with FIG. 12B, except here the rows show the girl prefix gir_. and the student is directed to point to and recite occurrences of girl, as compared to exercise 1219 which focuses on kid. The exercise sheet 1235 also includes a "Spot 'n Sort" exercise 1239 similar to the "Spot 'n Sort" exercise 1223 described in connection with FIG. 12B, but exercise 1239 targets the word girl, as compared to kid in exercise 1223. As previously described, these exercises 1238 and 1239 can collectively develop a number of language skills, including phonology and semantics.

Referring to FIG. 12E, this session of the exercise book 1200 includes two more exercises that are similar to those covered in the previous session (e.g., exercise sheet 1213). A "Pick the Picture" exercise 1241 here is similar to the "Pick the Picture" exercise 1228 described in connection with FIG. 12C, but the pictures that the student is supposed to select here are pictures of the new target word used (e.g., girls). Similarly, the "Find 'n Fill" exercise 1242 here on exercise sheet 1240 is similar to the "Find 'n Fill" exercise 1230 described in connection with FIG. 12C, but exercise 1242 targets a lengthier four-letter word (e.g., girl), thereby introducing more challenging combinations of missing letters that need to be added to complete girl. In this embodiment, this second session of the exercise book 1200 may be completed after the student completes the exercise sheet 1240. As previously described, these exercises 1241 and 1242 can collectively develop language skills such as phonology and semantics. For example, in the "Pick the Picture" exercise 1241, the student can learn phonology skills by writing the letters comprising the target word girl in boxes containing pictures of girls and then reciting girl for each one. In a similar way, the "Find 'n Fill" exercise 1230 can develop a student's phonology skills because the student writes missing letters into each incomplete instance of girl and then recites the word. In the "Pick the Picture" exercise 1241, the student can also learn semantics skills by comprehending the meaning of girl while recognizing pictures of girls in the boxes. The "Find 'n Fill" exercise 1230 can also teach semantics skills because each instance of girl completed and recited by the student reinforces the meaning of the target word.

Referring to FIG. 12F, the next session in the exercise book 1200 may include exercises to introduce a target word pair some/Some 1247 to the student. In this embodiments, the word some is the first non-content words introduced in the exercise book 1200, and the capitalized version Some is included here to begin teaching the use of capital letters at the beginning of sentences. Here, the capital letter version of the target word is included in the presentation because non-content words are known to occur frequently at the beginning of sentences. Teaching non-content words provides the advantage of being able to form meaningful phrases, sentences, and stories not easily formed by using nouns, verbs and adjectives alone. Exercise sheet 1246 includes an assessment instruction 1248 as previously described in connection with exercise sheets 1212, 1213, 1235 and 1240. These instructions in the assessment instruction 1248 here are tailored to the target word pair some/Some 1247.

Still referring to FIG. 12F, the exercise sheet 1246 may include a particular exercise referred to, for example, as a "Write In To Read" exercise 1249. Here, as the "What to Do" instructions describe, the student is asked to write some or Some on the blanks provided, and then read the resultant phrase. For example, as generally done in other exercise sheets, the target word is first pointed to and spoken. Then, within a box 1250*a*, while taking visual cues from a picture of some girls, the student is instructed to write Some on the blank line before kid, resulting in the phrase Some kids. Upon successfully completing the phrase Some kids, the student is asked to read the phrase out loud, and any errors may be immediately corrected with the help of a supervisor (or a computer system in some embodiments). This sequence of actions continues in a box 1250*b* where the student is supposed to write Some on the blank line before girls in response to the picture showing two girls. Similarly, the student is asked to create phrases in box 1250*c* in response to seeing some dogs and some birds. In box 1250*c*, phrases are "completed" using the pictures, contrasting with boxes 1250*a* and 1250*b* which use pictures for reference but result in phrases composed entirely of words. Box 1250*b* also manages to introduce written variations of the previously practiced words kids and girls. Because the words dogs and birds were not previously practiced, the student is not asked to read those words and may instead rely on the images.

The "Write In To Read" exercise 1249 can help the student learn the targeted words while collectively developing a number language skills, including phonology, semantics, syntax and text. For example, the exercise 1249 can develop phonology skills when the student recognizes the letters in the words supplied by the exercise, and when the student recites the sounds of the written phrase. In addition, the exercise 1249 can develop semantics skills when the student associates words (both supplied by the exercise and written in by the student) with the pictures. Furthermore, the exercise 1249 can develop syntax skills when the student combines words in the proper syntactical order to create phrases (e.g., in this embodiment, the student is asked to write and read the non-content word some before the subject that it modifies). Lastly, the exercise 1249 can develop text skills when the student combines words to form meaningful phrases using the target word some (e.g., the student can associate the phrase some kids as meaning more than one kid).

Still referring to FIG. 12F, exercise sheet 1246 also includes another type of language skills exercise referred to, for example, as a "Word Scanner" exercise 1251. Here, as the "What to Do" instructions describe, the student is asked to find occurrences of the target word some, circle them, and recite the words. For example, the instructor points to a row 1252 and says "some of these words say some. Find and 1st some and circle it." Then the student is asked to sound out the word. These actions continue until all instances of some on the row 1252 are located, circled and spoken correctly, with any errors being corrected immediately. When row 1252 is finished, the student can complete the remaining rows, thereby completing the exercise 1251. Here, the "Word Scanner" exercise 1251 can collectively develop the language skill of phonology. For example, the exercise 1251 can teach phonology skills when the student recognizes and recites instances of the target word some. Also, the student is not required to read nontargeted words (such as pink or hat in this example exercise); rather, the student must only recognize that those nontargeted words are different from the target word kid.

Referring to FIG. 12G, this session of the exercise book 1200 may include a type of language skills exercise referred to, for example, as a "Detect 'n Select" exercise 1260, as displayed on exercise sheet 1250. Here, the student locates occurrences of the target word some among several other non-target words in somewhat lengthy paragraphs. For example, in a box 1261a, the leftmost box in the exercise, the student is asked to locate and circle the first occurrence of the word some, then recite the word. This is repeated until all instances of some in the box 1261a are located, circled and spoken. Then, the actions are repeated for boxes 1261b and 1261c, the middle and rightmost boxes in the exercise 1260, until all instances of some are dealt with. Although the target word some is disposed with other non-target words, the student need not read those non-target words. Rather, the student is asked to recognize the target word some. Such an exercise 1260 develops the left-to-right sequencing skills and helps the student to become comfortable with larger groups of words. Indeed, some of the words in the paragraph may be previously practiced words so that the student is able to recognize with confidence that particular words in the paragraph are not the targeted word. The "Detect 'n Select" exercise 1260 can collectively develop a number of language skills, including phonology and text. For example, the exercise 1260 can teach phonology skills when the student recognizes, circles and recites the word some. In addition, the exercise 1260 can teach text semantics skills when the student sees the target word some combined with other words (some of which are already known by the student) to form meaningful phrases (e.g., some kids) or sentences.

Still referring to FIG. 12G, exercise sheet 1246 also includes a language skills exercise referred to, for example, as a "Letter In" exercise 1264. The exercise 1264 include several rows, each containing the target word some with one or more letters missing from the word. Here, the "What to Do" instructions describe how the student is told that "All of these words can become some when you add the right letters." For example, starting on an initial row 1265, the student is led word-by-word, and on each one writes in the missing letter(s) to complete the word some. For example, the letter e is added to som_. and when that's successfully completed, the letters om are added to s___e. These actions continue on the remaining rows of the exercise 1265, until all incomplete instances of some are "lettered in"Upon completion of the "Letter In" exercise 1264, the end of the session is reached. The "Letter In" exercise 1264 can develop language skills such as phonology. For example, the exercise 1264 can teach phonology skills when the student writes in missing letters in the incomplete instances of the target word some.

Figure 12H:
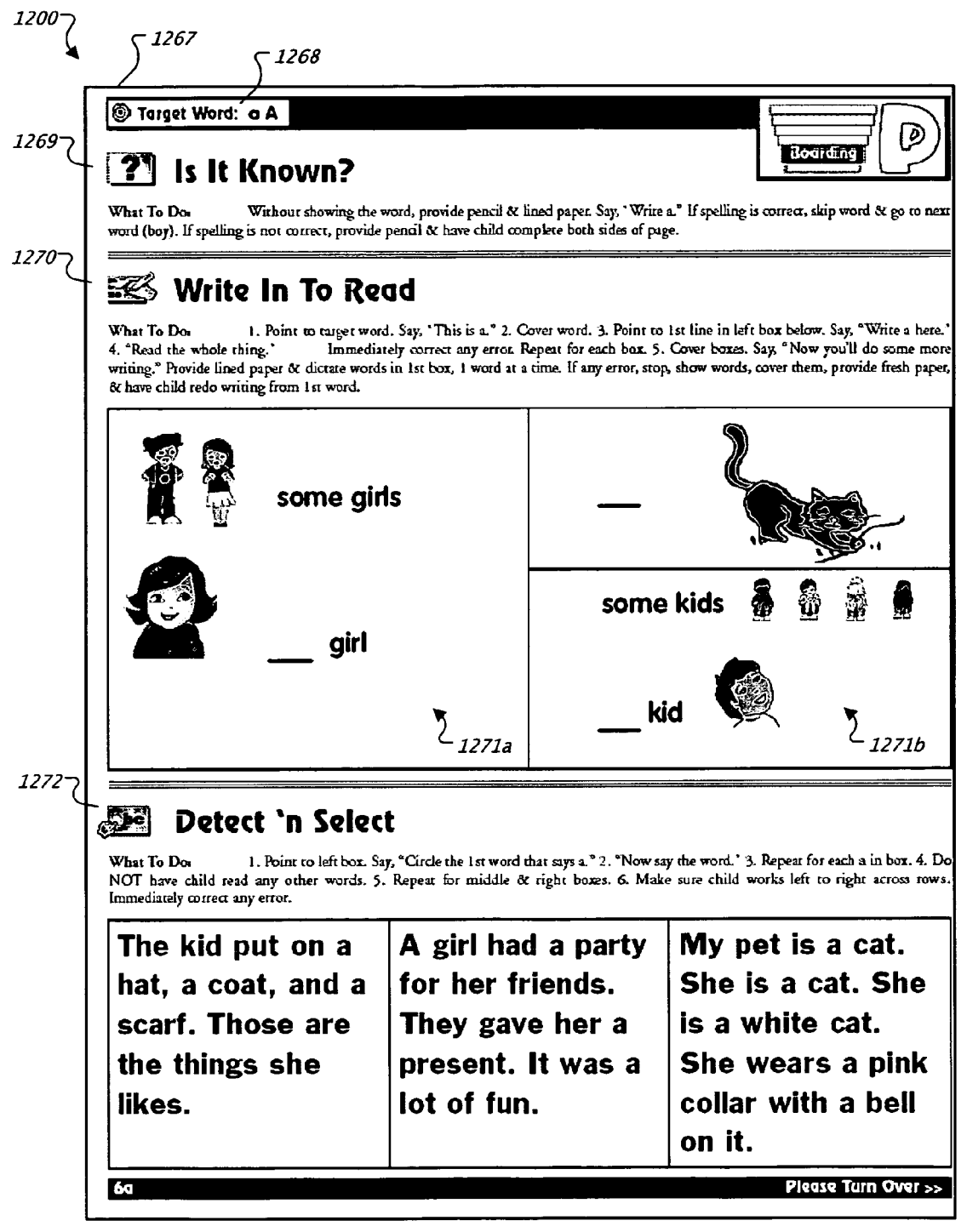

Referring to FIG. 12H, the next session in the exercise book 1200 includes exercises to introduce the student to a target word pair a/A 1268, thereby adding to the student's repertoire of non-content words, such as the target word pair some/Some 1247 learned on exercise sheet 1247 described in connection with FIGS. 12F-G. Again, the capital letter version of the target word can be included in the presentation because non-content words are known to occur frequently at the beginning of sentences. Similar to previously described sessions, exercise sheet 1267 includes an assessment instruction 1269. If the student still needs to learn the target word pair a/A 1268, learning can commence with the first exercise on the exercise sheet 1267.

Still referring to FIG. 12H, the exercise sheet 1267 includes a "Write In To Read" exercise 1270, similar to the "Write In To Read" exercise 1249 described in connection with FIG. 12C, but here it teaches the target word pair a/A 1268. Another difference between the "Write In To Read" exercises 1270 and 1249 is depicted in box 1271a, where the previously-learned non-content word some is presented next to a picture of "some girls". The goal here is to build upon skills already developed by the student in previous sessions by contrasting the plural non-content word some with the singular non-content word a, while using the plural/singular version of girls/girl. In particular, after seeing some girls in the box 1271a, the student should write in the word a on the blank line before girl. Similarly, the student could complete the phrase in box 1271b in the same way, by adding the word a on the blank line before kid, using the picture above it labeled "some kids" as guidance.

As previously described, the "Write In To Read" exercise 1270 can collectively develop a number of language skills such as phonology, semantics, syntax and text. For example, the exercise 1270 can develop phonology skills when the student recognizes the letters in the words supplied by the exercise, and when the student recites the written phrase. In addition, the exercise 1270 can develop semantics skills when the student associates words (both supplied by the exercise and written in by the student) with the pictures. Furthermore, the exercise 1270 can develop syntax skills when the student combines words in the proper syntactical order to create phrases. Lastly, the exercise 1270 can develop the text skill when the student combines words to form meaningful phrases using the target word a (e.g., the phrase a girl is associated with one girl while the phrase some girls is associated with more than one girl).

Still referring to FIG. 12H, exercise sheet 1267 includes a "Detect 'n Select" exercise 1272. The "Detect 'n Select" exercise 1272 here is similar to the "Detect 'n Select" exercise 1260 described in connection with FIG. 12G, except here the exercise focuses on the target word pair a/A 1268.

Referring to FIG. 12I, this session in the exercise book 1200 also includes a type of language skills exercise referred to, for example, as a "Cipher Wiz" exercise 1274. As shown on exercise sheet 1273, the student is asked to scan printed symbols from left-to-right, to locate the word phrases associated with the symbols, and to write the associated word phrases in the order shown. The result of this type of exercise can be a longer phrase, or even a sentence. For example, in a box 1276, the student is asked to scan the box of symbols 1277 containing "2 3 1" from left to right. The student is asked to locate the corresponding words from the choices 1278 listed at the bottom of the box 1276. After studying the words and having them covered, the student then writes the words from memory onto the lines 1279 provided in the box 1276. As writing errors in this process may be expected, correction of student mistakes can include temporarily revealing the words and re-hiding them during the student's next attempt. An added element of exercise sheet 1273 here is the student's first attempt at writing punctuation, because the word phrase "3" in the choices 1278 equates to a comma. In this example, when the student successfully writes the words represented by the symbols "2 3 1", the phrase "some girls, a girl" is formed, and the student may proceed to the next box in the "Cipher Wiz" exercise 1274.

The "Cipher Wiz" exercise 1274 can collectively develop a number of language skills, including phonology, syntax, and text. For example, the exercise 1274 can develop phonology skills when the student writes the words represented by the symbols and reads the resulting sentence phrases. Furthermore, the exercise 1274 can develop syntax skills when the student combines word phrases and punctuation in the proper syntactical order to create sentences. Lastly, the exercise 1274 can develop text skills when the student combines words to form meaningful phrases combining the target word a with words learned in previous exercises.

Still referring to FIG. 12I, exercise sheet 1267 also includes a "Word Scanner" exercise 1280. The "Word Scanner" exercise 1280 here is similar to the "Word Scanner" exercise 1251 described in connection with FIG. 12F, except the exercise 1280 here focuses on the target word pair a/A 1268. In this embodiment, upon successful completion of all rows in the "Word Scanner" exercise 1280, this session covering the target word pair a/A 1268 is complete, and the student may proceed to the next session in exercise book 1200.

Referring to FIG. 12J, the session in the exercise book 1200 teaches a target word pair boy/boys 1283. For example, in this session, exercise sheet 1281 begins with an assessment instruction 1284, which provides instructions for determining if this session can be skipped by the student. Next, exercise sheet 1282 includes a "Savvy Sounds" exercise 1285, which is similar to the "Savvy Sounds" exercise 1219 described in connection with FIG. 12B, however the focus here is on the target word pair boy/boys 1283. Exercise sheet 1281 also includes a "Spot 'n Sort" exercise 1286, which is similar to the "Spot 'n Sort" exercise 1239 described in connection with in FIG. 12D, except the student is asked to cross out words in each row that are neither boy nor boys.

Figure 12K:

Referring to FIG. 12K, this session of exercise book 1200 includes a "Pick the Picture" exercise 1287 as shown on exercise sheet 1282. The exercise 1287 is similar to the "Pick the Picture" exercise 1228 described in connection with FIG. 12C, however the focus here is on the target word pair boy/boys 1283. Similarly, the "Find 'n Fill" exercise 1288 here on exercise sheet 1282 is similar to the "Find 'n Fill" exercise 1242 described in connection with in FIG. 12E, but exercise 1288 targets the word pair boy/boys 1283 and allows the student to search for and complete singular and plural variants.

Referring to FIG. 12L, the next session in the exercise book 1200 covers a target word pair more/More 1290 as shown, for example, on exercise sheet 1289. Exercise sheet 1289 begins with an assessment instruction 1291, which provides instructions for determining if this session can be skipped by the student. If the student still needs to practice the target word pair more/More 1290, the student can continue to a "Write In To Read" exercise 1292, a type of exercise employed previously in the exercise book 1200. For example, the "Write In To Read" exercise 1292 is similar to the "Write In To Read" exercise 1249 described in connection with FIG. 12F, but here the exercise practices the target word pair more/More 1290.

Another difference between the "Write In To Read" exercises 1292 (FIG. 12L) and 1270 (FIG. 12F) is depicted in box 1293, where the two non-content words appear together when the student completes some more [picture of fish]. Upon completion of the "Write In To Read" exercise 1292, the student may proceed to the next exercise in this session.

Still referring to FIG. 12L, exercise sheet 1289 also includes a "Word Scanner" exercise 1293. The "Word Scanner" exercise 1293 here is similar to the "Word Scanner" exercise 1251 described in connection with FIG. 12F, except the exercise 1293 here focuses on a target word pair more/More 1290. In this embodiment, upon successful completion of all rows in the "Word Scanner" exercise 1293, the student may proceed to the next exercise sheet in this session.

Referring to FIG. 12M, this session of exercise book 1200 also includes a "Detect 'n Select" exercise 1295, as shown on exercise sheet 1294. The "Detect 'n Select" exercise 1295 here is similar to the Detect 'n Select"exercise 1260 described in connection with FIG. 12G, except here the exercise focuses on the target word pair more/More 1290. The exercise sheet 1294 also includes a "Letter In" exercise 1296. The "Letter In" exercise 1296 here is similar to the "Letter In" exercise 1264 described in connection with FIG. 12G, except here the exercise focuses on the target word pair more/More 1290. Upon completion of the rows included in the "Letter In" exercise 1296, the student is finished with the final session in the exercise book 1200. To mark this accomplishment, a "Congratulations! Go to Book 1." message 1297 appears at the end of the final exercise sheet. The student may proceed immediately to "Story Book 1" 1300, where the language skills collectively developed in "Exercise Book 1" 1200 can be applied.

Accordingly, the exercise book 1200 may include a first set of exercises (e.g., "Savvy Sounds" exercises (FIGS. 12B, 12D and 12J), "Spot 'n Sort" exercises (FIGS. 12B, 12D and 12J), "Pick the Picture" exercises (FIGS. 12C, 12E and 12K), "Find 'n Fill" exercises (FIGS. 12C, 12E and 12K), "Write In To Read" exercises (FIGS. 12F, 12H and 12L), "Word Scanner" exercises (FIGS. 12F, 12I and 12L), "Detect 'n Select" exercises (FIGS. 12G, 12H and 12M), "Letter In" exercises (FIGS. 12G and 12M), and "Cipher Wiz" exercises (FIG. 12I)) that collectively develop all four of the language skills of phonology, semantics, syntax, and text. In doing so, the set of exercises do not place a supreme emphasis or focus on "phonics," but instead the set of exercises work in combination to teach all four of the language skills. Additionally, the set of exercises in the exercise book 1200 teach the student a first set of content words (e.g., kid, girl, kids, girls, boy and boys) and non-content words (e.g., some, a and more) that can be employed in the associated story book 1300 (described in more detail below) and in other story books of the literacy system 8. As such, the student is exposed to a story book that generally includes only those words which the student previously learned, thereby promoting self-confidence in the student who is reading a story without becoming frustrated by unfamiliar words. Such a technique to promote self-confidence in the reader can be advantageous, especially in the early stages of literacy development.

Figure 13A:
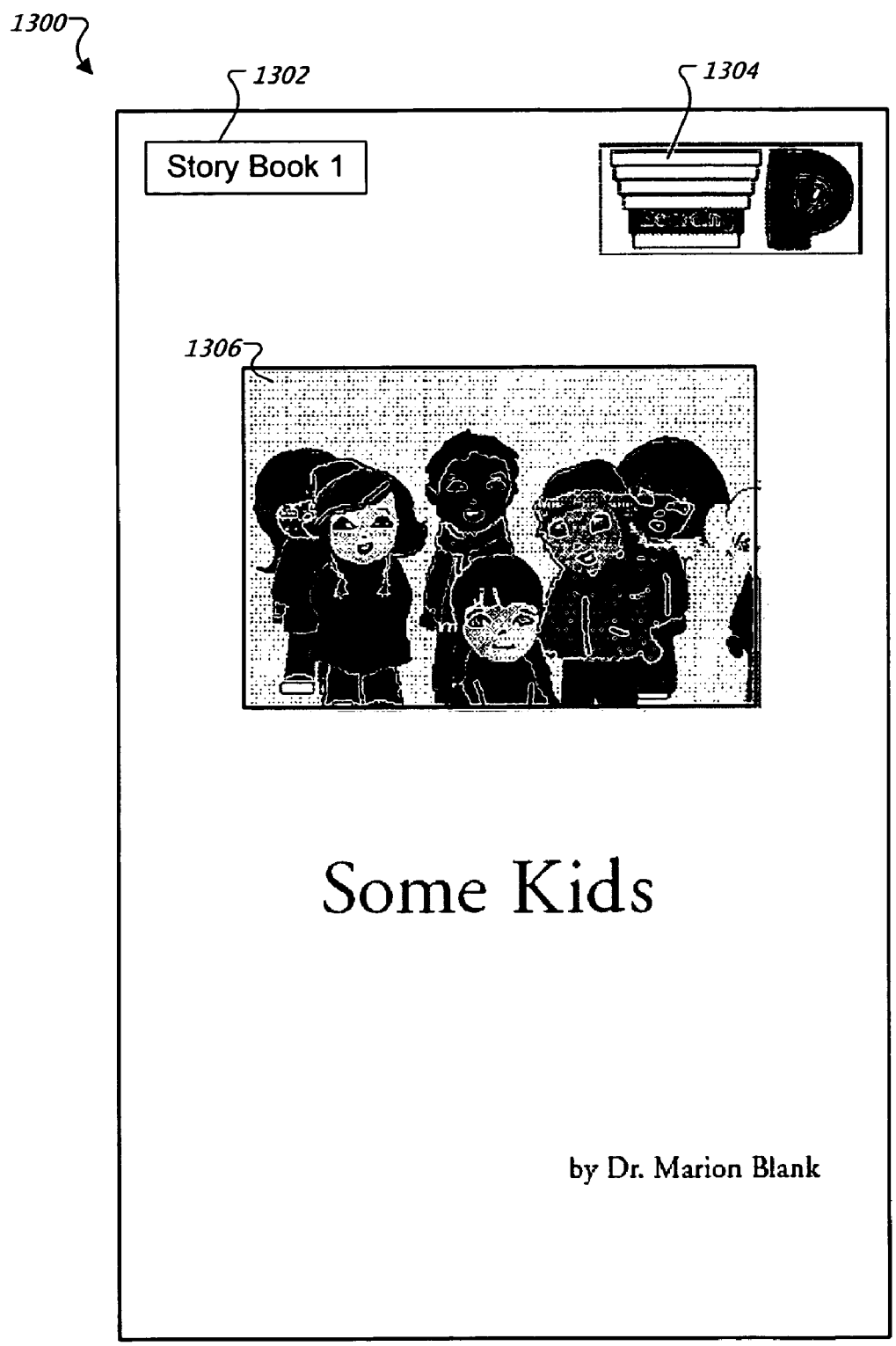

Referring to FIG. 13A, the "Some Kids" story book 1300 is an exemplary story book in the literary system 8. In this example of an early-stage story book, the picture-word combination tells of a group of children gathering together to cooperate in the building of a snowman. The title page of the "Some Kids" story book 1300 includes a "Story Book 1" label 1302, identifying the story book 1300 as the first story book in literacy system 8. The title page also includes an icon 1304 identifying the current learning level as the "Boarding" level, which matches the icon 1215 on the first exercise sheet 1212 of the corresponding exercise book 1200 (FIG. 12B). The student is further presented with a picture 1306, which depicts some kids, matching this early-stage title of the story book that the student is about to read. Having pictures that match words in the story book helps to teach the language skill of semantics to the student. As described below, the words in the "Some Kids" story book 1300 were previously taught to the student in the associated exercise book 1200 (FIGS. 12A-12M), so the student may be able to read the story book in a confident manner. Because the student knows all of the story book's words before reading the story book 1300, the student can concentrate on reading and is not impeded or frustrated by having to "sound out" previously unseen words. Even the story book's title, "Some Kids," is familiar to the student, because it is itself composed of two target words introduced and learned by the student in the exercise book 1200. For example, the word Some is a non-content word introduced in the session described in connection with FIGS. 12F-12G, and the word Kids is a content word introduced in the session described in connection with FIGS. 12B-12C. Here, these two target words are combined to create a meaningful title.

Referring to FIG. 13B, the first page 1310 of the "Some Kids" story book 1300 includes a "What To Do" section 1312, which describes the actions and guidelines for supervising the student's use of the story book 1300. For example, the "What To Do" section 1312 suggests that the student reads one page at a time and repeating an entire page if an error occurs. However, because a student reading the story book 1300 has already learned the words it contains, reading errors are generally less likely to occur, thereby increasing the likelihood that the student will finish the story book without being impeded or frustrated. Student satisfaction is further reinforced upon completion of the story book, because the "What To Do" section 1312 suggests that the student be told "You can keep this book & read it anytime you like."

Figure 13C:
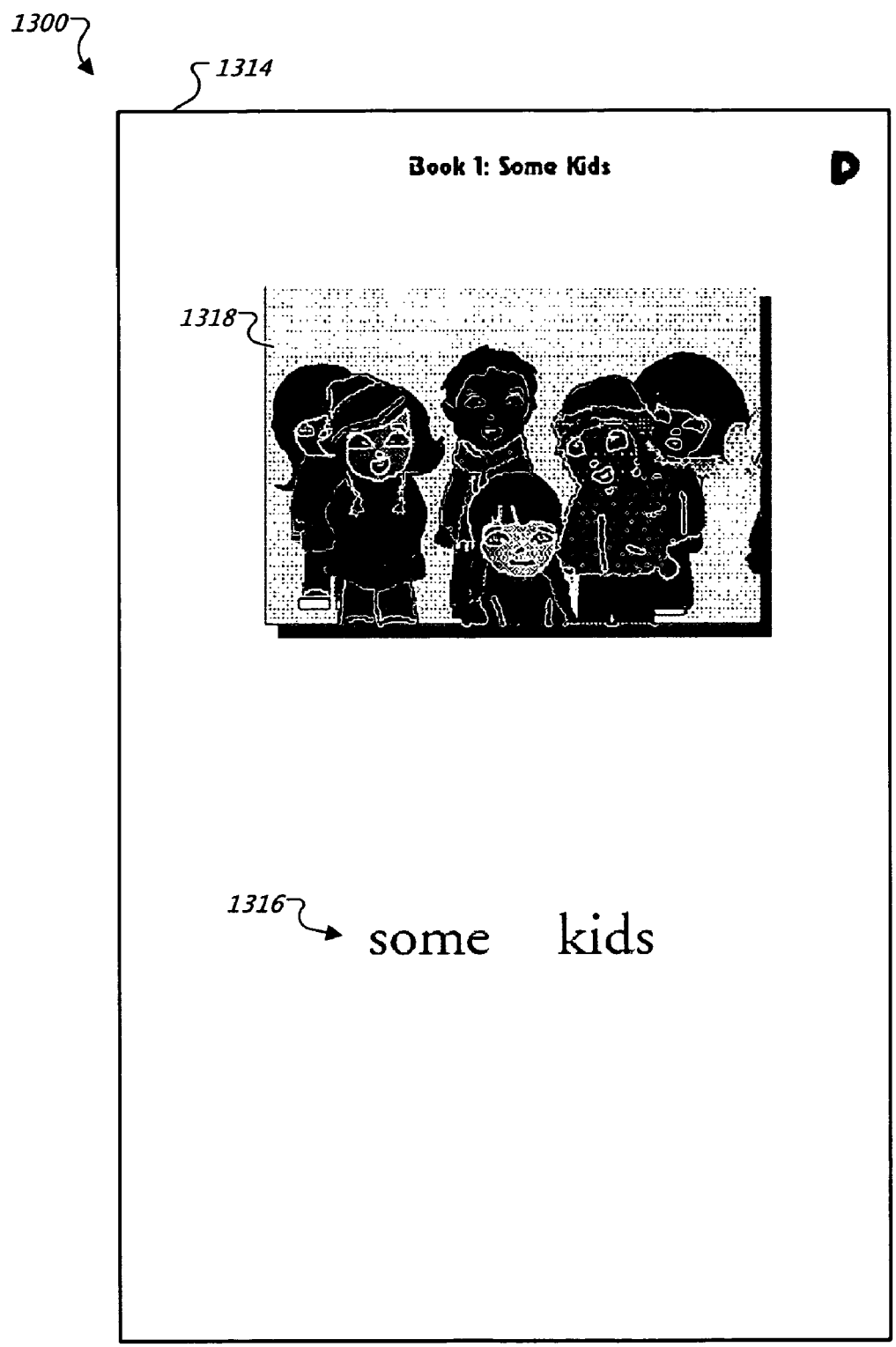

Referring to FIG. 13C, an initial story page 1314 (page "1") in the "Some Kids" story book 1300 includes a first sentence phrase 1316 that includes the first story book words read by the student. Here, the first sentence phrase 1316 is some kids, matching the title of the "Some Kids" story book 1300, which reinforces and develops language skills such as semantics. The page 1314 also displays a picture 1318 showing some kids. In this embodiment, the sentence phrases are not exactly discernible from the accompanying picture, but the subject of the picture 1318 here matches the subject matter of the first sentence phrase 1316. The picture 1318 here also matches the picture 1306 on the story book's cover (refer to FIG. 13A). The expected student action here is to read the sentence phrase 1316, which is likely a generally easier task because the words contained in the sentence phrase 1316 were previously learned by the student. These words include the non-content word some and the content word kids, both of which are previously-learned target words from the exercise book 1200. Upon successfully reading the sentence phrase 1316, the student can turn to the next page. It should be understood from the description herein that the story books of the literacy system 8 moves on to include full sentences rather than sentence phrases. For example, after the student has completed several exercise books and increased his or her vocabulary of content words and non-content words, the subsequent story books may include full sentences having nouns, verbs, and particular non-content words. In this early-stage story book 1300 associated with the first exercise book 1200, the student may be exposed to sentence phrases that are restricted to the words learned up to that point.

Referring to FIG. 13D, a next story page 1320 (page "2") in the "Some Kids" storybook 1300 contains two sentence phrases 1322: some girls and some boys. The sentence phrases 1322 repeat the non-content word some used on the previous page. In addition, the content words girls and boys used here overlap conceptually with kids used in the sentence 1316. Such use of related words and concepts may develop language skills such as semantics and text. A picture 1324, corresponding to the sentence phrases 1322, exhibits another similarity between the two story pages 1320 and 1314. Here, the picture 1324 matches the picture 1318 (FIG. 13C), showing boys and girls, all of which are kids, which further reinforces language skills such as semantics and text. Although the picture 1324 by itself does not teach reading skills, the use of pictures in story books can serve to teaching semantics skills and to retain the student's interest during reading. The expected student action here is to read the sentences, one-by-one, and any reading errors may be immediately corrected by the supervisor (or computer system in some embodiments). While reading, the student naturally glances at the associated picture, which ties the reading exercise into something that can be fun for the student: reading a story book.

Figure 13E:
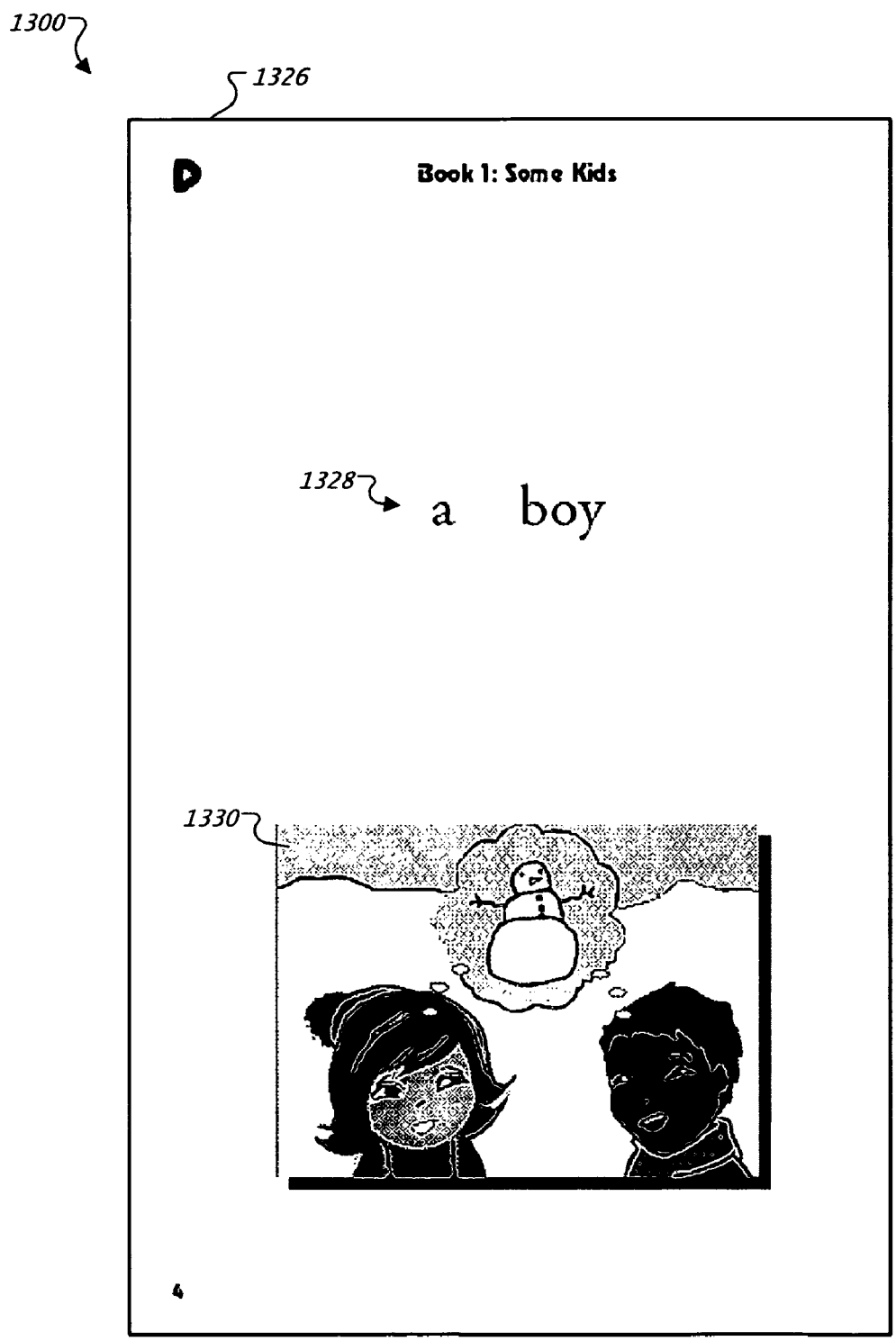

Referring to FIG. 13E, a subsequent story page 1326 (skipping to page "4") in the "Some Kids" story book 1300 contains a single sentence phrase 1328: a boy. The sentence phrase 1328 includes the non-content word a not yet used in the story book 1300. Because the subject of the sentence phrase 1328 is different from the previous story page, a different picture 1330 here depicts a boy. The picture 1330 also happens to show a girl and a snowman, so the student must read the words in the sentence phrase 1328 because the picture 1330 does not readily reveal the exact subject.

Figure 13F:
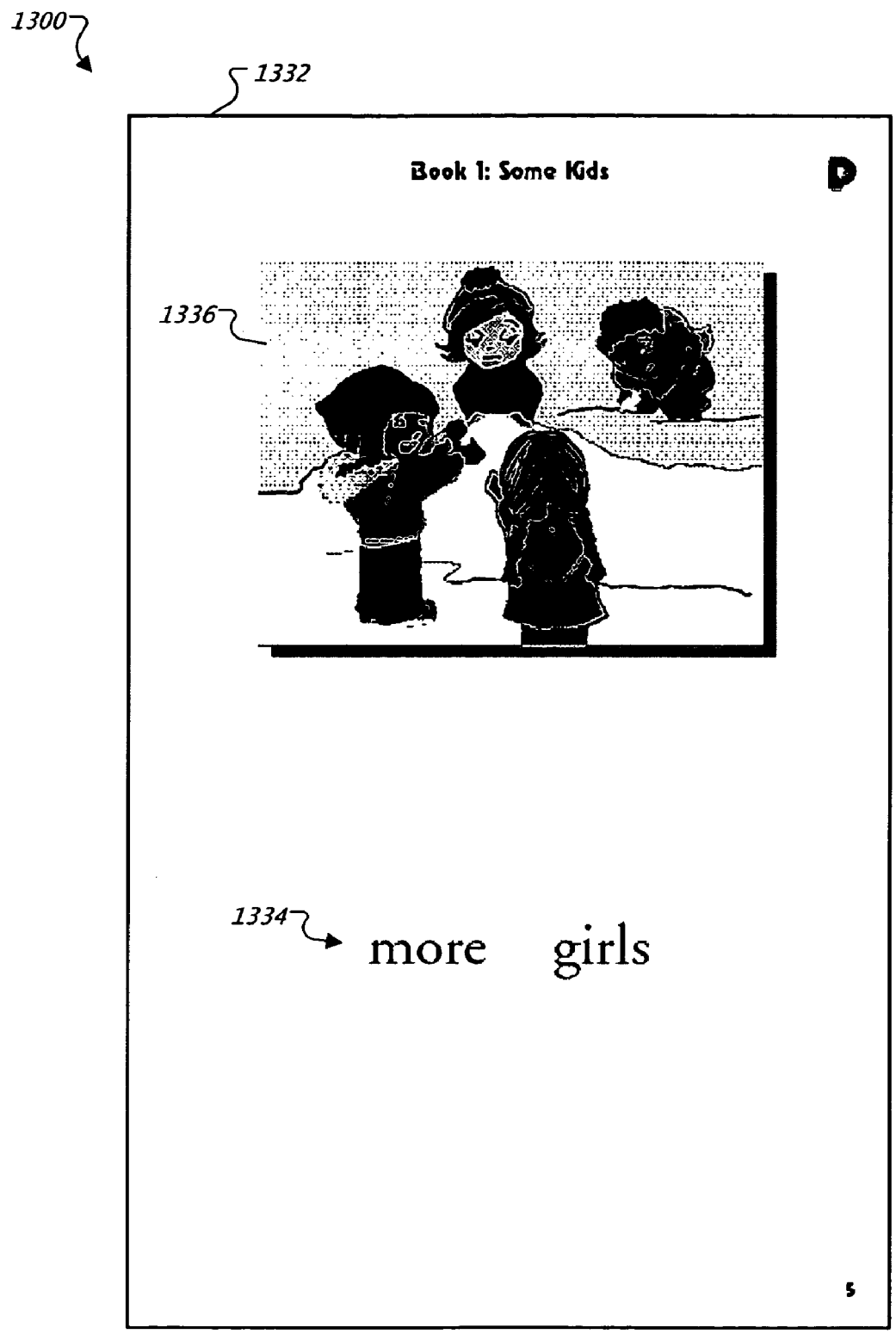

Referring to FIG. 13F, a next story page 1332 (page "5") in the "Some Kids" story book 1300 includes a single sentence phrase 1334: more girls. The sentence phrase 1334 includes the non-content word more not yet used in the story book, as well as the previously used content word girls. Because the subject of the sentence phrase 1334 is different from the previous story page, a different picture 1336 here depicts a group of girls. The picture 1336 also happens to show a boy, thus requiring the student to read the sentence and not make guesses based solely on the picture 1336.

Referring to FIG. 13G, a next story page 1338 (page "6") in the "Some Kids" story book 1300 includes a single sentence phrase 1340: some more girls. The sentence phrase 1340 successively combines the two non-content words some and more to build a meaningful sentence, thereby showing an example of how the target words in the associated exercise book 1200 are selected so as to be combined to tell a story. To reflect the addition here of the word some to the previous page's sentence phrase 1334 more girls (FIG. 13F), a picture 1342 shows two more girls here in the picture 1342 than appeared in the picture 1336.

Figure 13H:
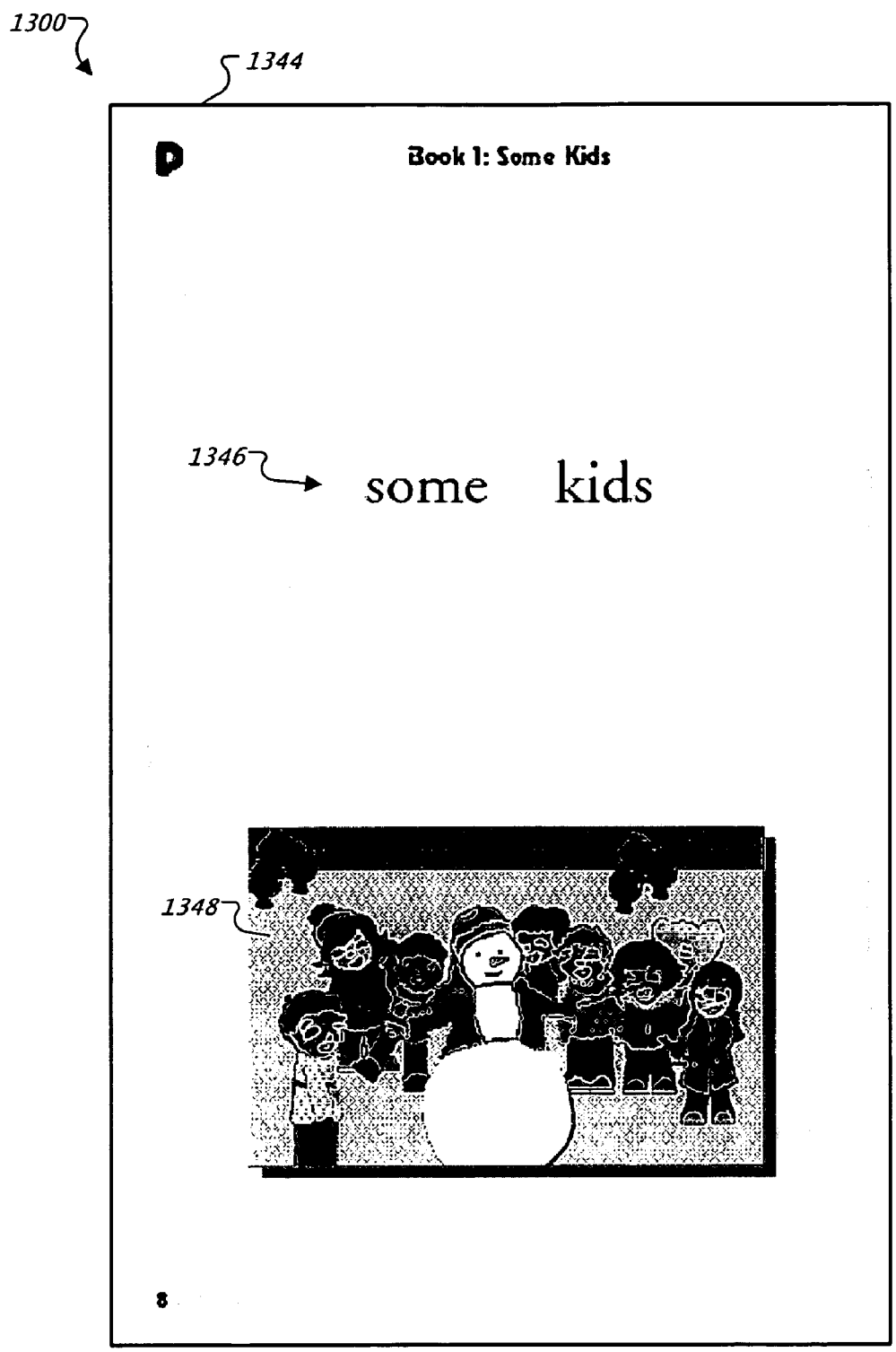

Referring to FIG. 13H, a final story page 1344 (skipping to page "8") in the "Some Kids" story book 1300 includes a single sentence phrase 1346: some kids. The sentence phrase 1346 matches the story book's first sentence 1316 (FIG. 13C) as well as the title of the "Some Kids" story book 1300 (FIG. 13A). A picture 1348 depicts the final outcome of the story book 1300. Concepts shown in the pictures such as snow, clothing and building are central to "story" in the pictures, but at no point do these concepts appear as words. Their meaning is carried by the pictures, allowing the student to take in a meaningful story without the undue challenge of having to decode a relatively large number of words. Thus, the picture 1348 makes reading the last sentence of the story easier and more pleasurable. By successfully reading the sentence 1340 on the final story page 1344, the student has read a complete story book. In some embodiments, the student can now be informed that the story book 1300 can be kept and read at any time. In addition, an enthusiastic student may be challenged to create additional pages for the "Some Kids" story book 1300 using the target words learned in the associated exercise book 1200. Having completed the "Some Kids" story book 1300, the student may proceed to the next workbook in the literacy system 8, the "exercise book 2" 1400.

Referring to FIG. 14A, the language skills section 90 can continue with the exercise book 1400, the next exercise book in the literacy system 8. The exercise book 1400 follows completion of the first exercise book 1200 and its corresponding story book 1300 titled "Some Kids." The exercise book 1400 is similar to the first exercise book 1200 in certain ways. For example, both exercise books 1400 and 1200 have an initial instruction sheet for supervising the student's progress through the exercises included in each exercise book. In particular, the exercise book 1400 contains a sheet 1402 that identifies the exercise book's purpose and instructions to help the student complete the exercise book 1400. One purpose of the second exercise book 1400 is for the student to learn the target words covered by the exercise book. Here, in this embodiment, the target words consist solely of content words 1404 and no new non-content words. The content words 1404 add to the student's repertoire of content words and non-content words learned in previous exercise books. For example, the content words 1404 (cat, cats, bird, birds, pet and pets) learned here in exercise book 1400 will complement the content words and non-content words learned earlier. The student can begin learning the content words 1404 taught by the exercise book 1400 by starting on the first session therein.

Referring to FIG. 14B, the first session of the exercise book 1400 may include a number of exercises that introduce a target word pair cat/cats 1410, as shown, for example, on exercise sheet 1407. To begin learning the target word pair cat/cats 1410, the student can complete a "Savvy Sounds" exercise 1412. The exercise 1412 is similar to the "Savvy Sounds" exercise 1219 described in connection with FIG. 12B, however the exercise 1412 here is slightly more complex. Here, the student must be able to find completed version of both cat and cats. For example, in row 1413a, after hearing "this is ca" for the ca prefix/sound at the beginning of the row, the student must find and pronounce cat (and not cap). Then, for the plural cats, the student must find and pronounce cats (and not cabs) in row 1413b. The singular and plural forms of the target word pair cat/cats 1410 are randomized for the remainder of the exercise in rows 1413c, 1413d and 1413e. As previously described, such a "Savvy Sounds" exercise 1412 may be used to collectively develop language skills such as phonology and semantics, while also practicing the target words.

Still referring to FIG. 14B, the next exercise this session is a "Spot 'n Sort" exercise 1415. The exercise 1415 is similar to the "Spot 'n Sort" exercise 1223 described in connection with FIG. 12B. However, the "Spot 'n Sort" exercise 1415 here covers both variations of cat and cats. For example, in row 1416a, the student is expected to cross out cape and kid, leaving both target words cat and cats unmarked. In contrast, row 1416b contains just the plural variation cats, and row 1416c contains just the singular cat. As previously described, such a "Spot 'n Sort" exercise 1415 may be used to collectively develop language skills such as phonology, while also practicing the target words.

Referring to FIG. 14C, the next exercise this session is a "Pick the Picture" exercise 1419, as shown, for example, on exercise sheet 1418. The exercise 1419 is similar to the "Pick the Picture" exercise 1228 described in connection with FIG. 12C. However, the "Pick the Picture" exercise 1419 here covers both variations of cat and cats. For example, in box 1420a, the student is expected to write cat in the blank line below the picture of a single cat. In boxes 1420b and 1420c, the student is expected to recognize pictures of multiple cats and write cats on the lines provided. Also, this session includes a "Find 'n Fill" exercise 1422 (similar to previous "Find 'n Fill" exercises described in connection with FIG. 12C), in which the student again works with both variations of cat and cats. For example, in row 1424a, the student is expected to add the letter t to ca_. and the letters at to c___. Row 1424b also contains an incomplete cat (as c_t), as well as this exercise's lone plural variation cats, where c and s are to be added to _at_. As previously described, the "Pick the Picture" exercise 1419 and the "Find 'n Fill" exercise 1422 may be used to collectively develop language skills such as phonology and semantics, while contemporaneously teaching the target words.

Referring to FIG. 14D, the next session of the exercise book 1400 includes a number of exercises to teach a target word pair bird/birds 1428, as shown in exercise sheet 1426. Both variations bird and birds are covered in a "Savvy Sounds" exercise 1432, which is similar to the "Savvy Sounds" exercise 1219 described in connection with FIG. 12B, except the exercise 1432 here covers the target word pair bird/birds 1428. For example, in row 1434a, the student finds, circles and says bird based on the prefix bir at the beginning of the row. Similarly, in row 1434b, the student finds processes birds based on the prefix bird. In both rows 1434a and 1434b, the pronunciation of the prefix (bir and bird) is one consonant short of the entire target word. The next exercise in the exercise sheet 1426 is a "Spot 'n Sort" exercise 1436. The exercise 1436 is similar to the "Spot 'n Sort" exercise 1223 described in connection with FIG. 12B. However, the "Spot 'n Sort" exercise 1436 here covers the target word pair bird/birds 1428. For example, in row 1438a, the student is expected to cross out cup and boys, leaving both target words birds and bird unmarked. Similarly, in row 1438b, the student is to cross out dirt and bad, leaving birds and bird. After successfully navigating the various birds in this exercise, the student may proceed to the next exercise in exercise sheet 1436, which will now be described.

Figure 14E:

Referring to FIG. 14E, the next exercise this session is a "Pick the Picture" exercise 1440, as shown in exercise sheet 1439. The exercise 1440 is similar to the "Pick the Picture" exercise 1228 described in connection with FIG. 12C. However, the "Pick the Picture" exercise 1440 here covers both variations of bird and birds. For example, in box 1442a, the student is expected to write bird in the blank line below the picture of a single bird. In boxes 1442b and 1442c, the student is expected to recognize pictures of multiple birds and write birds on the lines provided. Also in this session, a "Find 'n Fill" exercise 1444, similar to previous "Find 'n Fill" exercises (described in connection with FIG. 12C), the student again works with both variations of bird and birds. For example, in row 1446a, the student is expected to add the letter d to bir_. and the letters ir to b___d. In row 1446b, the letters bi are to be added to ___rd. In this embodiment, upon completion of these exercises, the student may proceed to the next session.

Referring to FIG. 14F, the next session in the exercise book 1400 may teach a target word pair pet/pets 1452, as show in exercise sheet 1450. For example, a "Savvy Sounds" exercise 1454 included here, similar to the one described in connection with FIG. 12B, has the student locating the completed versions of pet or pets based on their prefixes pe or pet on the same row. Also, a "Spot 'n Sort" exercise 1456 here, similar to the one described in connection with FIG. 12B, has the student crossing out words that are neither pet nor pets.

Referring to FIG. 14G, this session also includes exercise sheet 1457 that displays a "Pick the Picture" exercise 1458, similar to the one described in connection with FIG. 12C, that has the student writing pet or pets under pictures depicting one or more pets. Also, a "Find 'n Fill" exercise 1460, similar to the one described in connection with FIG. 12C, has the student competing the missing letters in partial word instances of pet. After completing exercise sheet 1457, the student has completed exercise book 1400 and may proceed to the associated story book 1500, as described below.

Figure 15A:
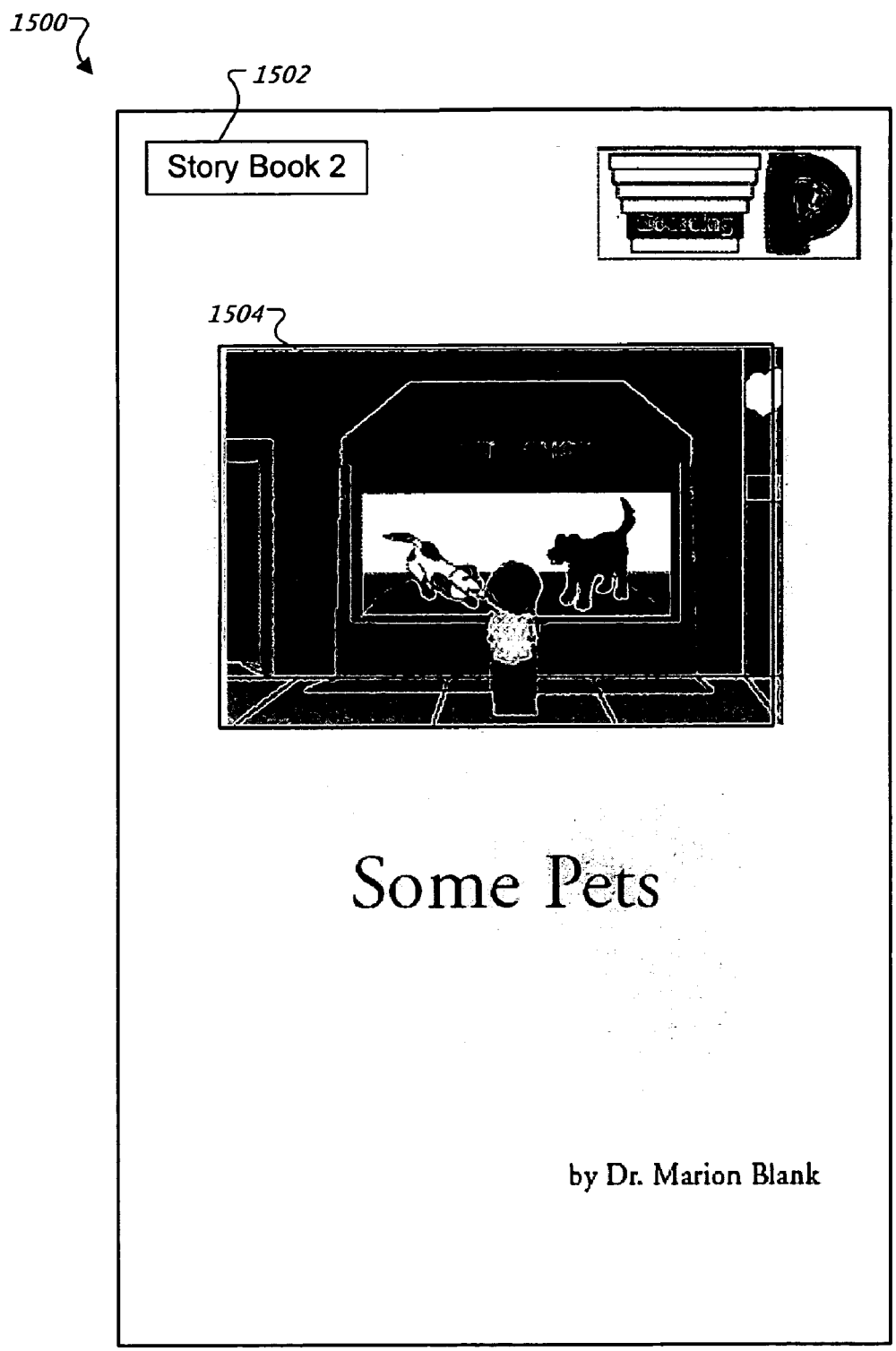
FIGS. 15A-G depict an example story book associated with the exercise book of FIGS. 14A-G

Referring to FIG. 15A, the "Some Pets" story book 1500 is an example of the story book associated with the exercise book 1400. In this example, a "Story Book 2" label 1502 identifies the story book 1500 as the second story book in literacy system 8. The story book's title page includes a picture 1504 which depicts some pets inside a pet shop window. By having a match between the title "Some Pets" and the picture 1504, the student is asked to practice and develop particular language skills, such as semantics and text, before opening the story book. The "Some Pets" story book 1500 may integrate target words from exercise books 1200 and 1400, all of which are familiar to the student.

Figure 15B:
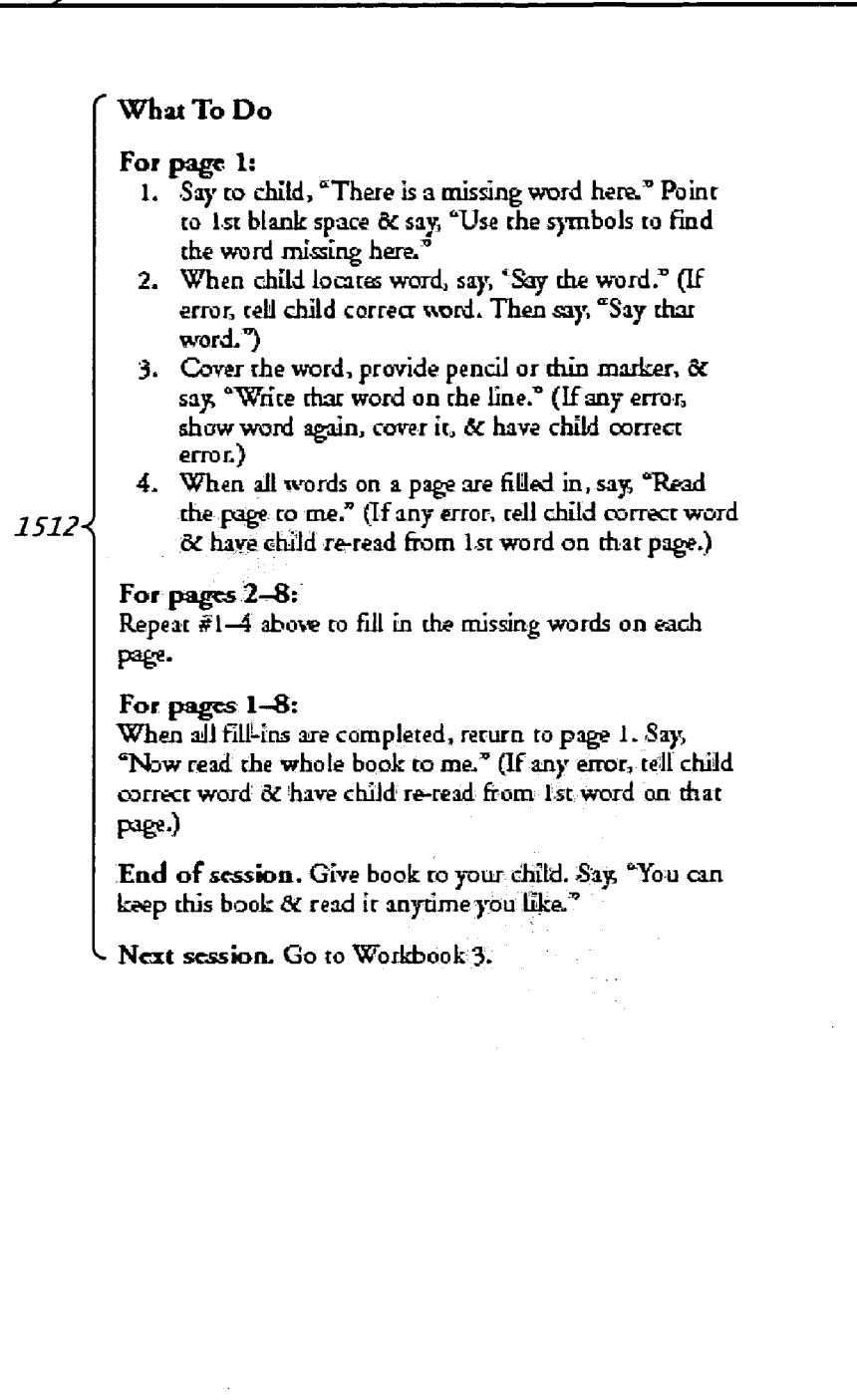

Referring to FIG. 15B, the first page 1510 of the "Some Pets" story book 1500 includes a "What To Do" section 1512, which describes the actions and guidelines for supervising the student's use of the story book 1500. The "What To Do" section 1512 is similar to the "What To Do" section 1312 (FIG. 13B), except additional instructions are included here for the writing element of "Some Pets" story book 1500. For example, the "What To Do" section 1512 suggests that the student be told that words are missing, and that they can be filled in based on the symbols. As these words are filled in by the student, the words are also to be spoken. Eventually, when all of the words in the story book 1500 have been filled in, the student is to read the entire story book out loud. Because the student reading the story book 1500 has already learned the words therein, as well as written some in, the student is generally more likely to finish the story book without becoming impeded or frustrated by unknown words. Student satisfaction is further reinforced upon completion of the story book, because the "What To Do" section 1512 suggests that the student be told "You can keep this book & read it anytime you like."

Figure 15C:
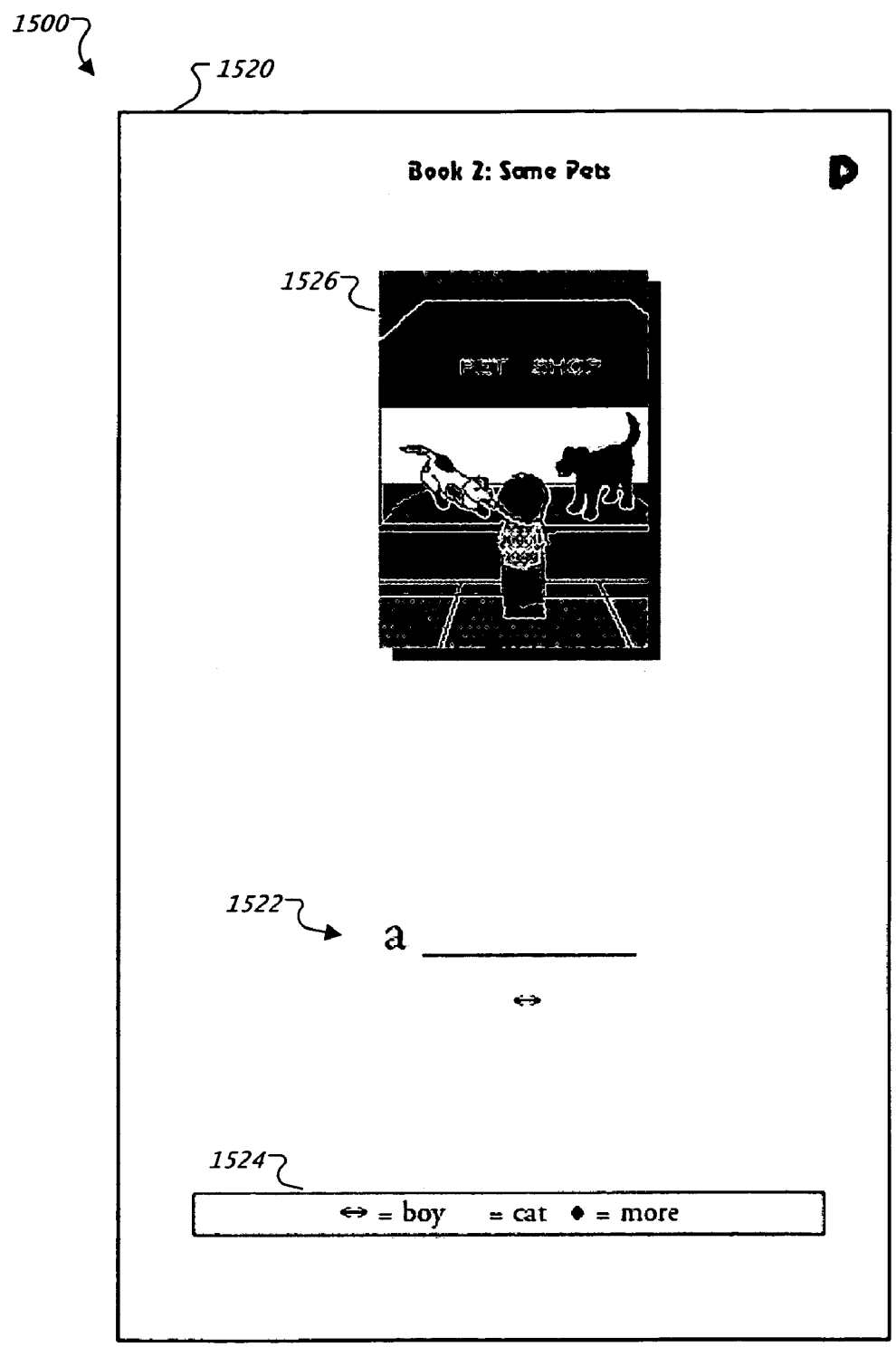

Referring to FIG. 15C, an initial story page 1520 (page "1") in the "Some Pets" story book 1500 includes a first sentence phrase 1522. Here, the first sentence phrase 1522 is a boy, except the word boy has been replaced with a blank line to be completed by the student. To determine the correct word to write in the blank, the student is to match the double arrow symbol underneath the line to find the corresponding word boy in the choices 1524. The student can also receive a clue by looking at the picture 1526 depicting a boy in front of a pet store. After successfully writing boy and reading the sentence phrase 1522, the student can turn to the next page in the story book 1500.

These exercises of matching, writing and reading to complete the sentence phrase 1522 can collectively develop language skills such as phonology, semantics, and text. For example, the student can develop phonology skills by recognizing and reciting the words a and boy in the sentence phrase 1522. Also, the student can develop semantics skills by associating the meanings of the words in the sentence phrase 1522 to the picture 1526. The student can also develop text skills by combining the words to form a meaningful sentence phrase 1522.

Figure 15D:
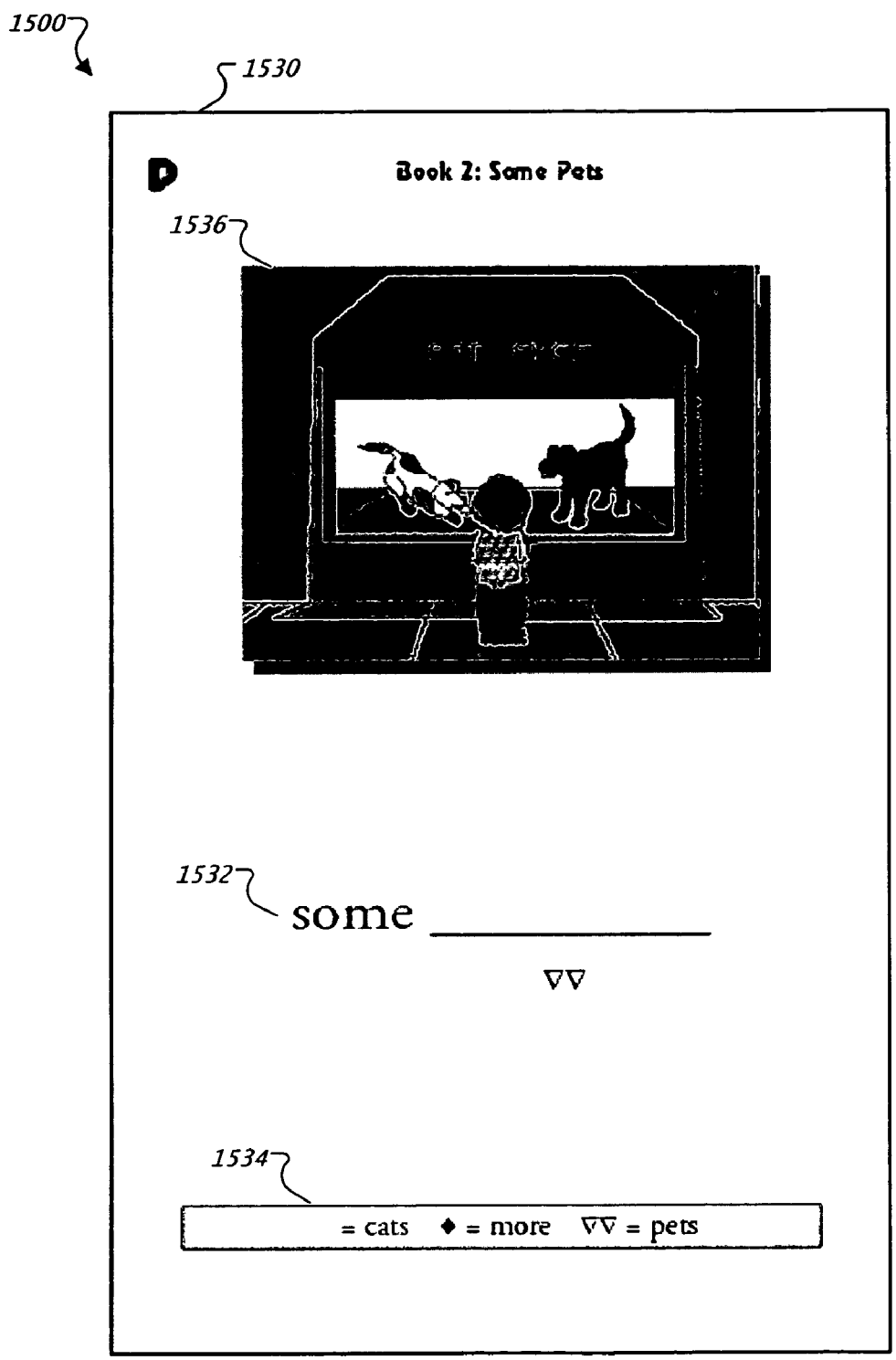

Referring to FIG. 15D, a next story page 1530 (page "2") in the "Some Pets" story book 1500 includes a sentence phrase 1532. Here, the sentence phrase 1532 is some pets, except the word pets has been replaced with a blank line to be completed by the student. To determine the correct word to write in the blank, the student is to match the double triangle symbol underneath the line to find the corresponding word pets in the choices 1534. The student can also receive a clue by looking at the picture 1536 depicting a boy in front of a pet store with some pets in the window. After successfully writing pets and reading the sentence phrase 1532, the student can turn to the next page in the story book 1500.

Figure 15E:
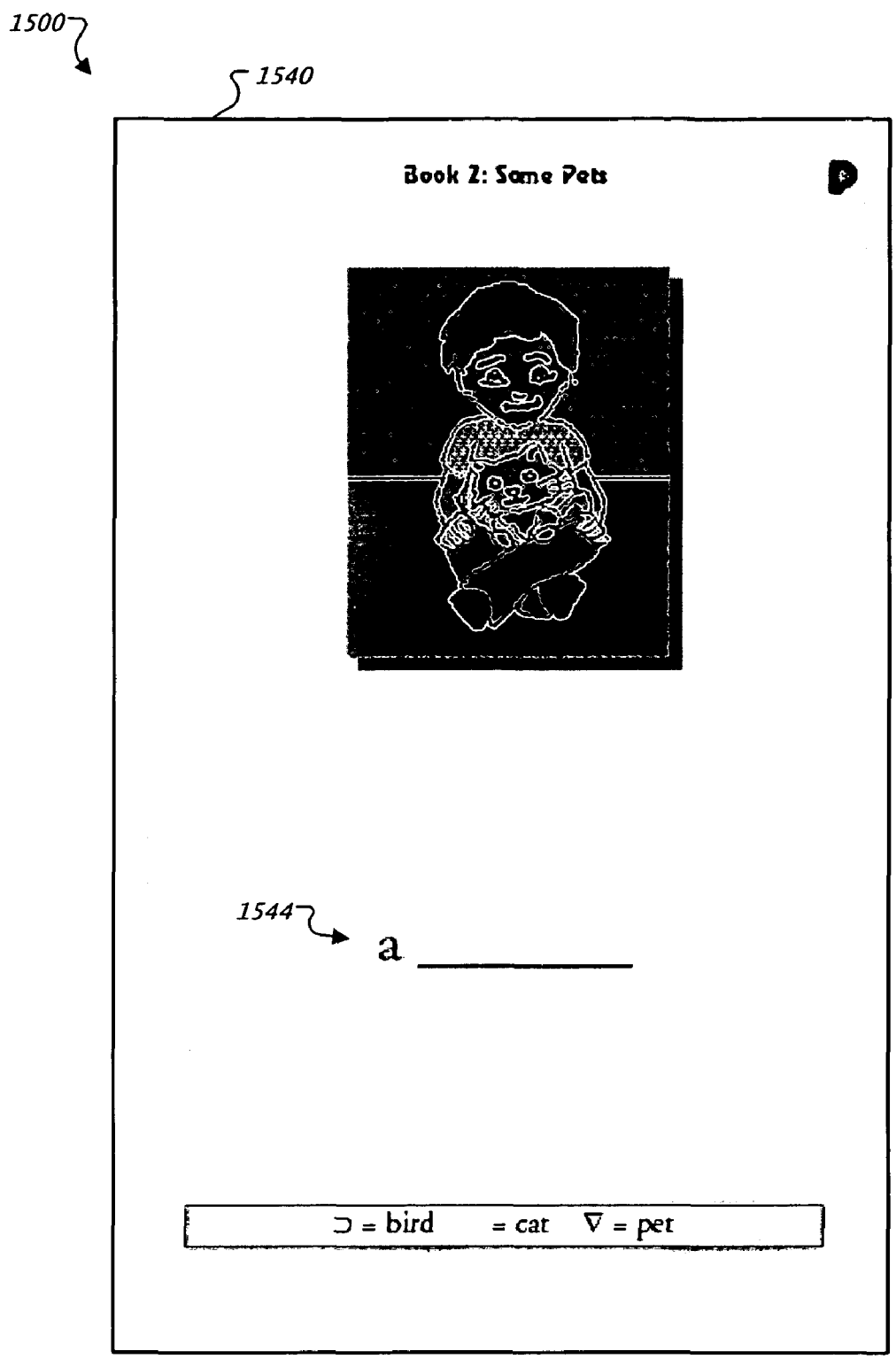

Referring to FIG. 15E, a next story page 1540 (page "3") in the "Some Pets" story book 1500 includes a sentence phrase 1544. Here, the sentence phrase 1544 is a cat, except the word cat has been replaced with a blank line to be completed by the student. As done before, the student can find the appropriate word to complete the sentence by matching any symbol, which in this case is blank, to the choices provided. After successfully writing cat and reading the sentence phrase 1544, the student can turn to the next page in the storybook 1500.

Figure 15F:
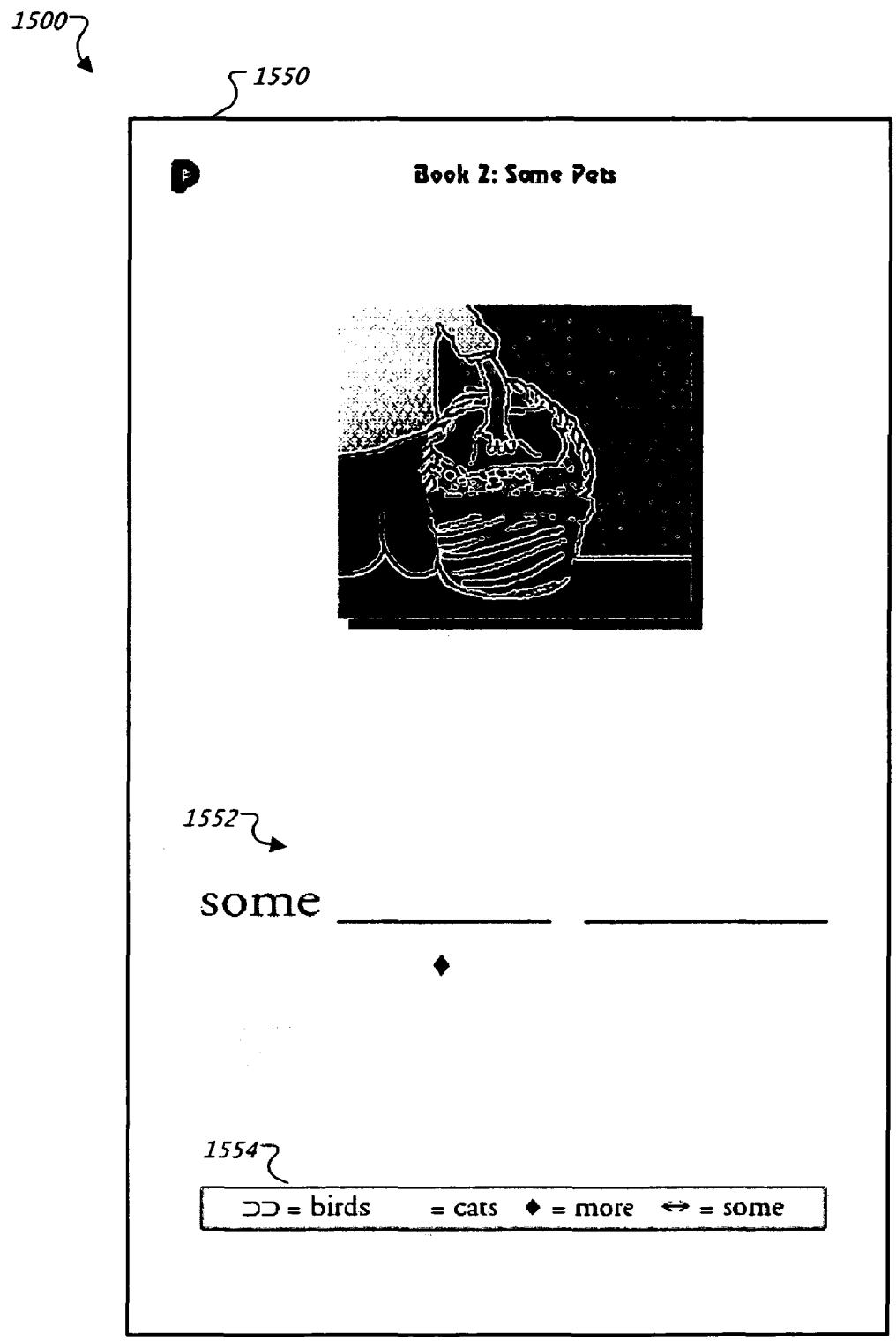

Referring to FIG. 15F, a next story page 1550 (page "4") in the "Some Pets" story book 1500 includes a sentence phrase 1552. Here, the sentence phrase 1552 is some more cats, except the words more and cats have been replaced with individual blank lines to be completed by the student. Using the same process as before, the student can match symbols underneath the lines to the symbols and words in the choices 1554 to complete the sentence phrase 1552. As previously described, such an exercise may be used to collectively develop a number of language skills, such as phonology, semantics, and text.

Figure 15G:
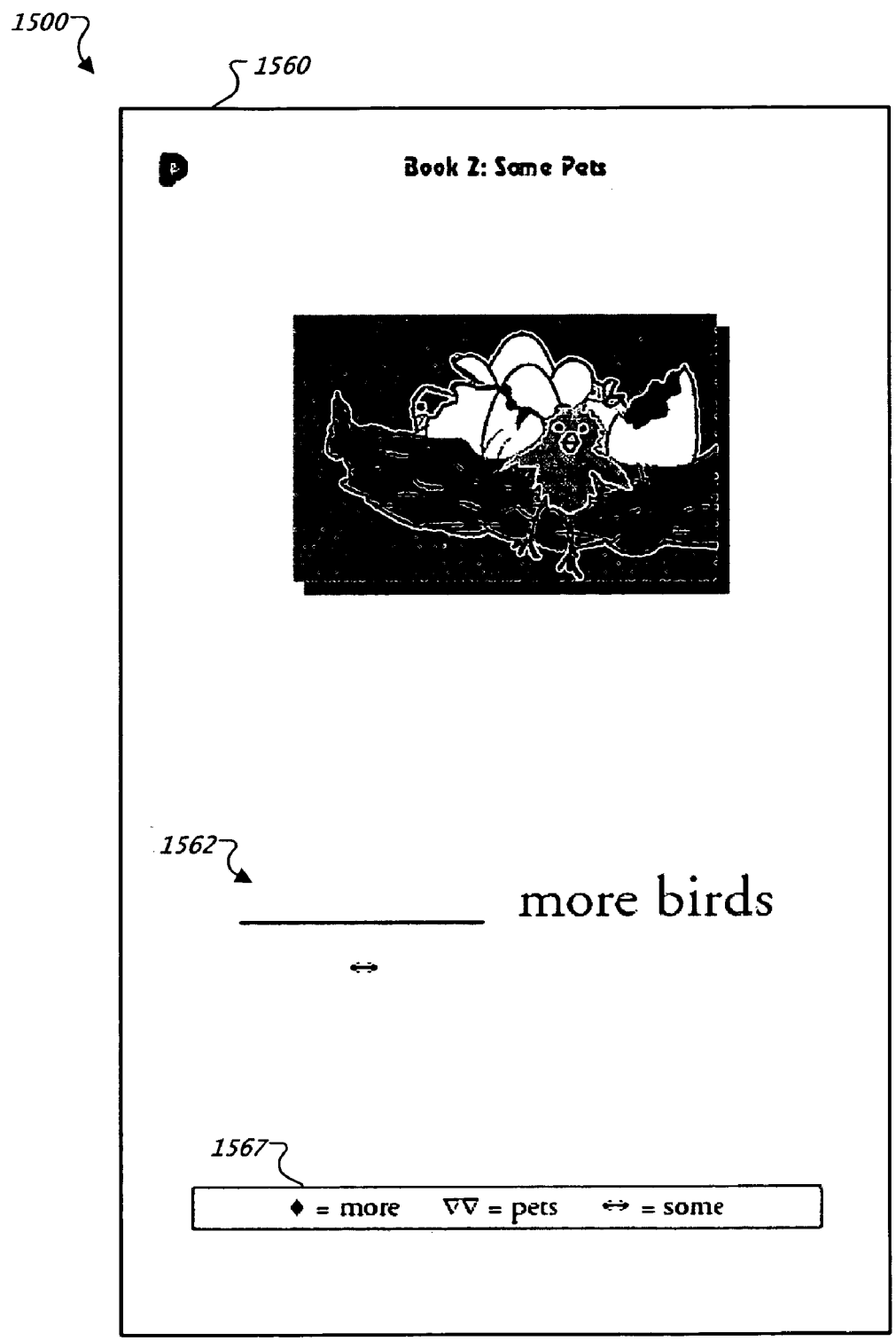

Referring to FIG. 15G, a subsequent story page 1560 (skipping ahead to page "8") in the "Some Pets" story book 1500 includes a sentence phrase 1562. Here, the sentence phrase 1562 is some more birds, except the word some has been replaced with a blank line to be completed by the student. Using the same process as before, the student can match symbols underneath the lines using the choices 1567 to complete the sentence phrase 1522. After successfully writing some, then reading the sentence phrase 1562, the student has completed the writing exercises of the story book 1500.

The student's next task is to read the entire story book 1500, which may be more satisfying because the student helped to furnish the story book's missing words. Reading the story book may be readily accomplished because the words contained in the story book 1500 were previously taught in previous exercise books 1200 and 1400. In this embodiment, to further simplify reading at this early stage in the literacy system 8, none of the words in the story book are capitalized, and no punctuation is used. However, these advance features can be introduced in subsequent exercise books and their associated story books (described in more detail below).

It should be understood from the description herein that the story books of the literacy system 8 may be include writing exercises in addition to reading exercises. For example, after the student has completed several exercise books and increased his or her vocabulary of content words and non-content words, the subsequent story books may include exercises in which the student is to write full sentences having nouns, verbs, and particular non-content words. In this early-stage story book 1500 associated with the second exercise book 1400, the student may be exposed to writing sentence phrases so as to avoid overwhelming the student in the early stage of writing.

As described in connection with FIG. 16, some embodiments of the literacy system 8 may include a number of exercise books and associated story books for each level 30, 40, 50, 60, or 70 of the language skills section 90. For example, the early level III 30 may include six exercise books and six story books (including, for example, the exercise books 1200 and 1400 and the story books 1300 and 1500 as previously described). The exercise books and story books may increase in difficulty while continuing to collectively develop the language skills of phonology, semantics, syntax and text. For example, the exercise books and story books in the later level VII 70 (refer, for example, to FIGS. 17A-20G) may be more difficult compared to the workbooks of earlier levels, but the exercise books and story books in level VII 70 can maintain the underlying theme of collectively developing the four language skills, without a supreme emphasis on phonics alone. As previously described, some or all of the literacy system 8 (including the exercise books and story books of the language skills section 90) may be implemented using a computer system, one or more workbooks, a video or classroom presentation, or the like to enable the student to practice the sequencing exercises.

Referring to FIG. 16, the literacy system 8 may include a number of workbooks for each of the levels 30, 40, 50, 60, and 70 (refer to FIG. 1). For example, in this embodiment, each level of the literacy system 8 includes about six exercise books and six associated story books. Each of the exercise books may introduce a new set of content words and non-content words that are selected to facilitate a meaningful story in the associated story book. FIG. 16 shows a table 1602 of example content words and non-content words that may be introduced by the exercise books, in accordance with some embodiments. The table 1602 is organized by exercise book number column 1604. For example, the table lists target words for exercise books through 30. The content words in table 1604 are further divided into columns for content words 1606 and non-content words 1608. These content and non-content words correspond to the target words listed in the instruction sheets appearing at the start of each exercise sheet. For example, the words kid, girl, kids, girls, boy and boys listed as target words 1204 in exercise book 1 (FIG. 12A) match the content words 1610 here in the table 1602. Similarly, the lists of non-content words, including some, a and more, match between non-content words 1205 and non-content words 1612. Although not always listed in the table 1602, word variations, such as plural forms, may be covered in the exercise books. As the student completes each exercise book, the target words and some word variations can be learned. For example, by completing the exercise book 1, the student will have learned content words 1610 and non-content words 1612. Then, by going on to complete the remaining workbooks in the literacy system 8, the student will have learned all of the words in the target words table 1602. For example, having completed the "Some Kids" story book 1300 and successfully reading the target words it contains, the student may proceed to the "Exercise Book 2" 1400, which is within level III 30 of the literacy system 8. After completing the books in level III 30 of the literacy system 8, the student may proceed to the books of level IV 40, which can introduce new sets of content words and non-content words while also incorporating the previously learned words from level III 30. Such a pattern can continue through level VII 70, which introduces new words while incorporating some or all of the words learned previously.

Referring to FIG. 17A, the higher levels in the language skills section 90 can include exercise books and reading books exhibiting increased difficulty while continuing to collectively develop the language skills of phonology, semantics, syntax and text. For example, FIGS. 17A-17U show an exemplary exercise book 1700 that is the second-to-last exercise book in the final level VII 70. In this embodiment, the exercise book 1700 follows completion of exercise book "28" (not shown) and its corresponding story book "28" (not shown). In this embodiments, an initial instruction sheet 1702 is included at the front of this exercise book 1700. The instruction sheet 1702 lists this exercise's target words: content words 1703 and non-content words 1704. As the complexity of the exercise books has increased since the previously described exercise books in the literacy system 8, the number of targeted content words may be greater. In addition, many of the words 1703 are grouped together based on meaning and initial word prefixes. For example, the content words 1703 include a group of four words that are related: hand, hands, handed and handy, all beginning with the same four letter prefix. In addition, penny and pennies comprise a group, which helps to teach the transformation of penny to the plural pennies by changing the y to an ies. The "What to Do" section on the instruction sheet 1702 describes the supervision of the student's learning in this exercise book 1700.

Referring to FIG. 17B, the first session of the exercise book 1700 is started, in this example, on exercise sheet 1707. To track and reinforce the progress through the various phases of the literacy system 8, the top portion of exercise sheet 1707 includes an icon 1708 which identifies the current level or learning. Here, the "Soaring" level is highlighted, indicating that exercise sheet 1707 is part of that learning level (e.g., level VII 70 in this embodiment). To begin learning a target word pair penny/pennies 1709, the student can complete a "Savvy Sounds" exercise 1710, similar to the "Savvy Sounds" exercise 1219 described in connection with FIG. 12B. However, in the "Savvy Sounds" exercise 1710 here, the student is tasked to locate the full version of penny using the prefix pen, and the full version of pennies using the prefix penni. In both cases, the prefixes are "missing" two letters of the complete words. As previously described, the "Savvy Sounds" exercise 1710 may be used to collectively develop a number of language skills, such as phonology and semantics.

Still referring to FIG. 17B, another type of exercise displayed on exercise sheet 1707 is referred to, for example, as a "Spot 'n Sort" exercise 1711. The exercise 1711 is similar to the "Spot 'n Sort" exercise 1223 described in connection with FIG. 12B, but here penny and pennies are the target words. As previously described, the "Spot 'n Sort" exercise 1711 may be used to develop a number of language skills, such as phonology. After successfully finding the instances of penny and pennies in this exercise, the student may proceed to the next exercise in this session.

Referring to FIG. 17C, this session also includes exercise sheet 1712 that displays the "Symbol Search" exercise 1715. Here, the student completes full sentences by filling in missing words represented by symbols above the blank lines where the words are to be written. For example, the first sentence 1717 contains a blank line after "How many . . . ." With the help of instructions and guidance from the instructor, a double clover symbol 1718 above the blank line signals the student to locate the symbol and corresponding word pennies 1719 from the choices below the sentence. However, because the first sentence 1717 is just missing pennies, only one choice 1719 exists, so selecting the correct choice is simple. Then the student writes the word pennies on the blank line and reads (out loud) the completed sentence. It should be understood from the description herein that the other words in the first sentence 1717 were previously learned by the student when practicing the previous exercise books in the literacy system 8 (refer to the list of content words and non-content words shown in FIG. 16). Moving on to the next sentence 1721, the difficulty increases with the existence of three blank lines. Here, the student is to write in pennies to replace the double clover leaf symbol 1722a, could for the """ symbol 1722b, and much for the diamond symbol 1722c to complete the sentence.

Such an exercise 1715 may be used to collectively develop a number of language skills such as phonology, syntax and text. For example, when the student reads the completed sentence, the student develops phonology skills by recognizing and producing the sounds of the letter groupings in the target word (and in other words). Moreover, the student develops syntax skills by combining words in the proper syntactical order to create phrases and by recognizing the proper use commas, periods and questions marks. In another example, when the student writes the missing words in the blanks and reads the completed sentences, the student develops text skills by combining words, in the correct order, to form meaningful messages.

Still referring to FIG. 17C, the next exercise in exercise sheet 1712 is a "Find 'n Fill" exercise 1724. The exercise 1724 is similar to the "Find 'n Fill" exercise 1230 described in connection with FIG. 12C, but here penny is the target word. As previously described, the "Find 'n Fill" exercise 1724 may be used to collectively develop a number of language skills, such as phonology and semantics.

Referring to FIG. 17D, the next session of the exercise book 1700 is exercise sheet 1726. In this example, a target word group tell/tells/telling 1727 is the focus of this exercise sheet. The first exercise here is a "Savvy Sounds" exercise 1728, similar to the "Savvy Sounds" exercise 1219 described in connection with FIG. 12B, but here it covers the target word group tell/tells/telling 1727. This session also includes a "Find 'n Fill" exercise 1729. The exercise 1729 is similar to the "Find 'n Fill" exercise 1230 described in connection with FIG. 12C, however tells is the target word here.

Referring to FIG. 17E, the session also includes exercise sheet 1730, which displays a "Stay 'n Play" exercise 1731. The object of this exercise 1731 is to cross out extraneous words from each sentence, resulting in a complete sentence that makes sense. For example, in the first row, dot 1731a appears over the word can, and dot 1731b appears over the word went. By removing can and went below the dots 1731a and 1731b, the rest of the words "stay and play" together to make a whole sentence. After crossing out the words that don't belong, the student is left with a sentence that is to be read out loud. This process is repeated for the remaining sentences in the exercise. In some embodiments, the student may be asked to write out the connected sentence in one or more rows. Such an exercise 1731 can be used to develop a number of language skills such as phonology, syntax, and text. For example, when the student reads the completed sentence, the student is recognizing and producing the sounds of the letter groupings in the target word (and in other words). In another example, when the student crosses out extraneous words to complete meaningful sentences, the student is developing the ability to combine words, in the correct order, to form meaningful messages.

Still referring to FIG. 17E, the next exercise on exercise sheet 1726 is a "Spot 'n Sort" exercise 1733. The exercise 1733 is similar to the "Spot 'n Sort" exercise 1223 described in connection with FIG. 12B, but here tell and tells are the target words. After successfully finding the instances of tell and tells in this exercise, the student may proceed to the next session.

Referring to FIG. 17F, the next session in the exercise book 1700 covers a target word pair every/Every 1735. As shown for example, on exercise sheet 1734, the "Write In To Read" exercise 1736 can be used here. The exercise 1736 is similar to the "Write In To Read" exercise 1249 described in connection with FIG. 12F, but here every and Every are the target words. In addition, wherever the capitalized version Every is needed, the initial letter E is provided, requiring the student to complete the word. Otherwise, where every is used in the middle of a sentence, the whole word is to be written in. As previously described, such an exercise 1736 can be used to collectively develop a number of language skills, such as phonology, semantics, syntax and text.

Still referring to FIG. 17F, the next exercise on exercise sheet 1734 is a "Word Scanner" exercise 1737. The exercise 1737 is similar to the "Word Scanner" exercise 1251 described in connection with FIG. 12F, but here every and Every are the target words. As previously described, the "Word Scanner" exercise can be used to develop language skills such as phonology.

Referring to FIG. 17G, the session also includes a "Replace the Space" exercise 1739, as shown on exercise sheet 1738. The object of the "Replace the Space" exercise 1739 is for the student to complete incomplete words in the paragraph using a template of words as a guide. For example, the first incomplete word "E_e_y" 1739a is missing the letters it needs to become Every, which is a target word of exercise sheet 1738. The student may immediately know the correct letters to write in, but if not, a box listing choices 1740 is included below the paragraph. In particular, the student can find the word every as the third choice in the box listing choices 1740, and use it as a guide to determine the letters needed to complete Every. The process continues until the remaining incomplete words in the paragraph are complete. Along the way, the student can encounter several words learned previously. For example, every is the only word in the box listing choices 1740 that is a target word of the current exercise book, thus all, could, float, they, tried and who were learned previously. As previously described, continuously re-acquainting the student with words learned in previous exercise books is a strategy used throughout the literacy system 8. Upon completing the paragraph and reading it out loud, the student may proceed to the next exercise. Such an exercise 1739 can be used to collectively develop a number of language skills such as phonology, syntax, and text. For example, when the student writes missing letters in incomplete words and reads the completed paragraph, the student is recognizing and producing the sounds of the letter groupings in the target word (and in other words). In another example, when the student reads the completed paragraphs, the student is developing the ability to combine words, in the correct order, to form meaningful messages.

Still referring to FIG. 17G, the next exercise in exercise sheet 1738 is a "Detect 'n Select" exercise 1741. The exercise 1741 is similar to the "Detect 'n Select" exercise 1260 described in connection with FIG. 12G, but here every and Every are the target words. After successfully finding, circling and saying the instances of every and Every in this exercise, the student may proceed to the next session. As previously described, this exercise 1741 can be used to collectively develop a number of language skills such as phonology and text.

Referring to FIG. 17H, the next session in the exercise book 1700 teaches a target word pair is kite/kites 1743, as shown on exercise sheet 1742. The first exercise here is the "Savvy Sounds" exercise 1744, which is similar to the "Savvy Sounds" exercise 1219 described in connection with FIG. 12B, but here kite and kites are the target words. The next exercise is the "Stay 'n Play" exercise 1745, which is similar to the "Stay 'n Play" exercise 1731 described in connection with FIG. 17E. After crossing out extraneous words to create sentences including kite or kites, the student may proceed to the next exercise in this session.

Referring to FIG. 17I, the next exercise in this session is a "Pick the Picture" exercise 1747, as shown on exercise sheet 1746. The exercise 1747 is similar to the "Pick the Picture" exercise 1228 described in connection with FIG. 12C. Here the student writes kite or kites under the pictures of one or more kites. As previously described, the "Pick the Picture" exercise 1747 can be used to collectively develop a number of language skills, such as phonology and semantics. The practicing of the target words kite and kites continues in the "Spot 'n Sort" exercise 1748, which is similar to the "Spot 'n Sort" exercise 1223 described in connection with FIG. 12B. After completing the exercise here, the student may proceed to the next session.

Referring to FIGS. 17J-K, the next session in the exercise book 1700 teaches a target word group hand/hands/handed/handy. Exercise sheets 1750 and 1751 include a number of previously described exercises, such as a "Savvy Sounds" exercise 1752, a "Stay 'n Play" exercise 1753, a "Pick the Picture" exercise 1754, and a "Find 'n Fill" exercise 1755. After successfully completing these exercises, the student may proceed to the next session.

Referring to FIGS. 17L-M, the next session in the exercise book 1700 teaches a target word pair idea/ideas 1757. Exercise sheets 1756 and 1761 include a number of previously described exercises, such as a "Savvy Sounds" exercise 1759, a "Spot 'n Sort" exercise 1760, a "Symbol Search" exercise 1762, and a "Find 'n Fill" exercise 1763. After successfully completing these exercises, the student may proceed to the next session.

Referring to FIGS. 17N-O, the next session in the exercise book 1700 teaches a target word pair high/higher 1766. Exercise sheets 1765 and 1769 include a number of previously described exercises, such as a "Savvy Sounds" exercise 1767, a "Spot 'n Sort" exercise 1768, a "Pick the Picture" exercise 1770, and a "Find 'n Fill" exercise 1771. After successfully completing these exercises, the student may proceed to the next session.

Referring to FIG. 17P, the next session in the exercise book 1700 teaches a target word true 1773. Exercise sheet 1772 includes a "Write In To Read" exercise 1774, which is similar to the "Write In To Read" exercise 1249 described in connection with FIG. 12F. The exercise 1774 here focuses on the target word true, and the student is asked to write the word true in the blank lines of the sentences within the exercise. Another type of exercise displayed on exercise sheet 1772 is the "Detect 'n Select" exercise 1775. The exercise 1775 is similar to the "Detect 'n Select" exercise 1260 described in connection with FIG. 12G, but here true is the target word. After successfully finding, circling and saying the instances of true in this exercise, the student may proceed to the next exercise in this session.

Referring to FIG. 17Q, the next exercise in this session is a "Cipher Wiz" exercise 1777, as shown on exercise sheet 1776. The exercise 1777 is similar to the "Cipher Wiz" exercise 1274 described in connection with FIG. 12I. Here the student uses the box of symbols containing "2 6 7 2 3 6 7 5 1 4 7" to build sentences from the corresponding sentence parts (e.g., words, phrases and punctuation) from the choices 1778. In general, some or all of the words in this exercise 1777 are words that the student has learned in previous exercise books. Many of the symbols appear more than once in the box of symbols 1777, including the "7" representing a period. Thus, the student can complete the sentences: "It is true. It is really true. Some plants can eat small bugs." As previously described, the "Cipher Wiz" exercise 1777 can be used to develop a number of language skills, such as phonology, syntax, and text.

Still referring to FIG. 17Q, this session also includes a "Word Scanner" exercise 1779. The exercise 1779 is similar to the "Word Scanner" exercise 1251 described in connection with FIG. 12F, but here true is the target word. After successfully finding the instances of true in this exercise, the student may proceed to the next session.

Figure 17R:
FIGS. 17A-U depict an example second-to-last exercise book in the embodiment of the literacy system of FIG. 11.

Referring to FIGS. 17R-S, the next session in the exercise book 1700 teaches a target word group hear/hears/hearing 1782. Exercise sheets 1780 and 1781 include a number of previously described exercises, such as a "Savvy Sounds" exercise 1783, a "Spot 'n Sort" exercise 1784, a "Pick the Picture" exercise 1785, and a "Find 'n Fill" exercise 1786. After successfully completing these exercises, the student may proceed to the next session.

Referring to FIGS. 17T-U, the next session in the exercise book 1700 teaches a target word told. Exercise sheets 1788 and 1789 include a number of previously described exercises, such as a "Savvy Sounds" exercise 1790, a "Stay 'n Play" exercise 1791, a "Find 'n Fill" exercise 1792, and a "Symbol Search" exercise 1793. After successfully completing these exercises, the student may proceed to the next session. After completing the "Symbol Search" exercise 1793, a completion message 1795, such as "Congratulations! Go to Book 29" can appear on the bottom of the exercise sheet. If the literacy system 8 is computer-based, for example, the message 1795 can be contained in a popup or other graphical display that appears on the computer screen. Thus, after completion of the exercise book 1700, the student can advance to the associated story book 1800 (described in more detail below).

Accordingly, the exercise book 1700 may include a set of exercises (e.g., "Savvy Sounds" exercises (FIGS. 17B, 17D, 17H, 17J, 17L, 17N, 17R, and 17T), "Spot 'n Sort" exercises (FIGS. 17B, 17E, 17I, 17L, 17N, and 17R), "Pick the Picture" exercises (FIGS. 17I, 17K, 17O, and 17S), "Find 'n Fill" exercises (FIGS. 17C, 17D, 17K, 17M, 17O, 17S, and 17U), "Stay 'n Play" exercises (FIGS. 17E, 17H, 17J, and 17T), "Write In To Read" exercises (FIGS. 17F and 17P), "Word Scanner" exercises (FIGS. 17F and 17Q), "Detect 'n Select" exercises (FIGS. 17G and 17P), "Symbol Search" exercises (FIGS. 17C, 17M, and 17U), "Replace the Space" exercises (FIG. 17G), and "Cipher Wiz" exercises (FIG. 17Q)) that collectively teach all four of the language skills of phonology, semantics, syntax, and text. In doing so, the set of exercises do not place a supreme emphasis or focus on "phonics," but instead the set of exercises work in combination to teach all four of the language skills.

Figure 18A:
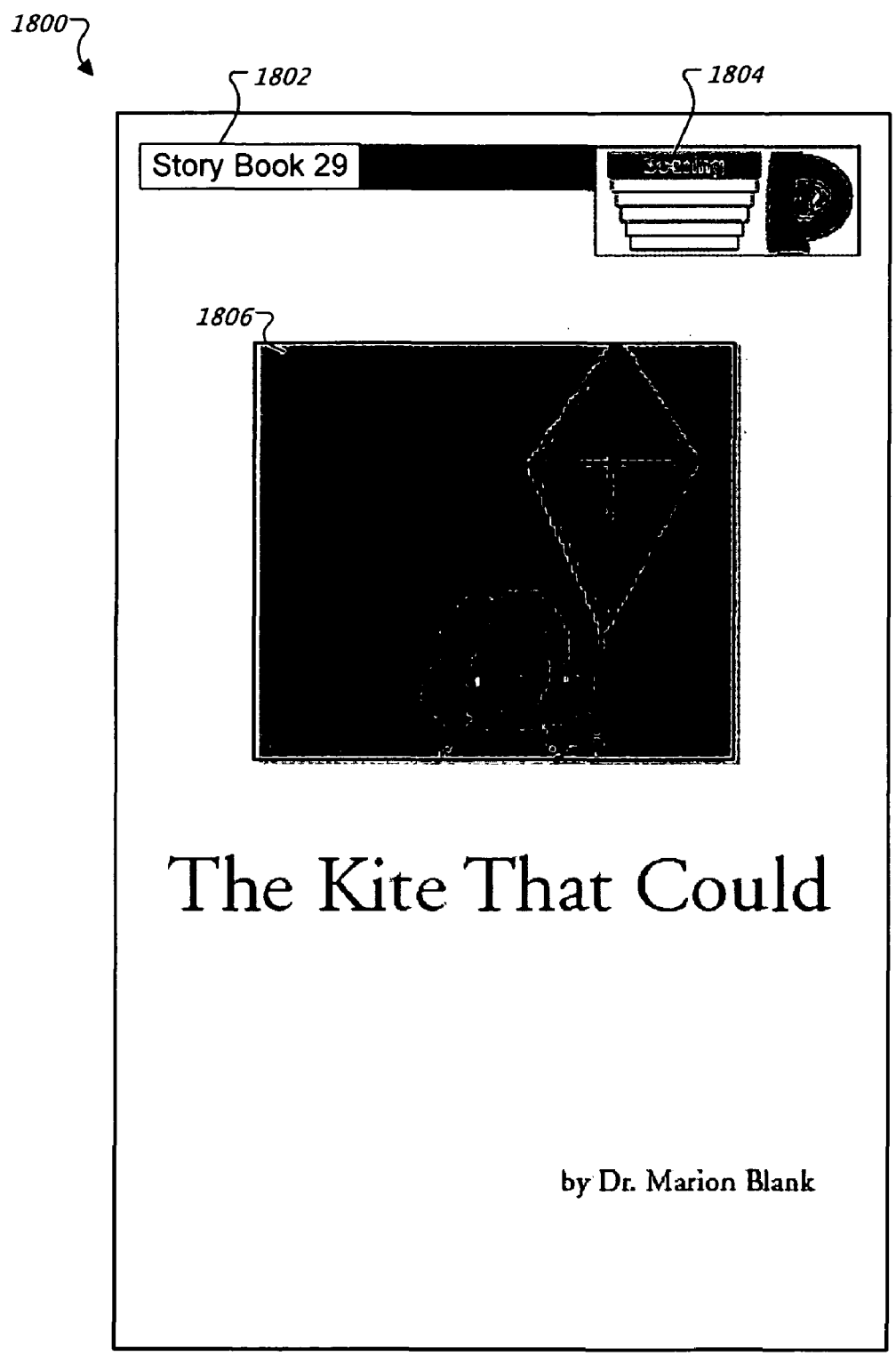

Referring to FIG. 18A, the "The Kite That Could" story book 1800 is an example of a story book associated with the exercise book 1700. A "Story Book 29" label 1802 identifies the story book 1800 as the twenty-ninth story book in literacy system 8. The title page includes an icon 1804 identifying the current learning level as the "Soaring" level (e.g., level VII 70 in this embodiment), which matches the icon 1708 on the first exercise sheet 1707 of the corresponding prerequisite exercise book "29" 1700 (FIG. 17B). The story book's title page also includes a picture 1806 which depicts a girl with a kite, matching the title of the story book. Similar to previously described story books, the "The Kite That Could" story book 1800 integrates words from previously completed exercise books (refer to FIG. 16 for an exemplary list of words taught through exercise book "29").

Referring to FIG. 18B, the first page 1808 of the "The Kite That Could" story book 1800 includes a "What To Do" section 1810, which includes guidelines for supervising the student's use of the story book 1800. The "What To Do" section 1810 is similar to the "What To Do" section 1312 described in connection with FIG. 13B, except additional instructions are included here for assessing the student's reading comprehension. For example, "Gleaning Meaning" instructions 1812 explain how the student, after reading the story book, can be led through a process of completing missing words in a summary of the story book. The completed summary can be included with the "The Kite That Could" story book 1800 that the student is permitted to keep.

Figure 18C:
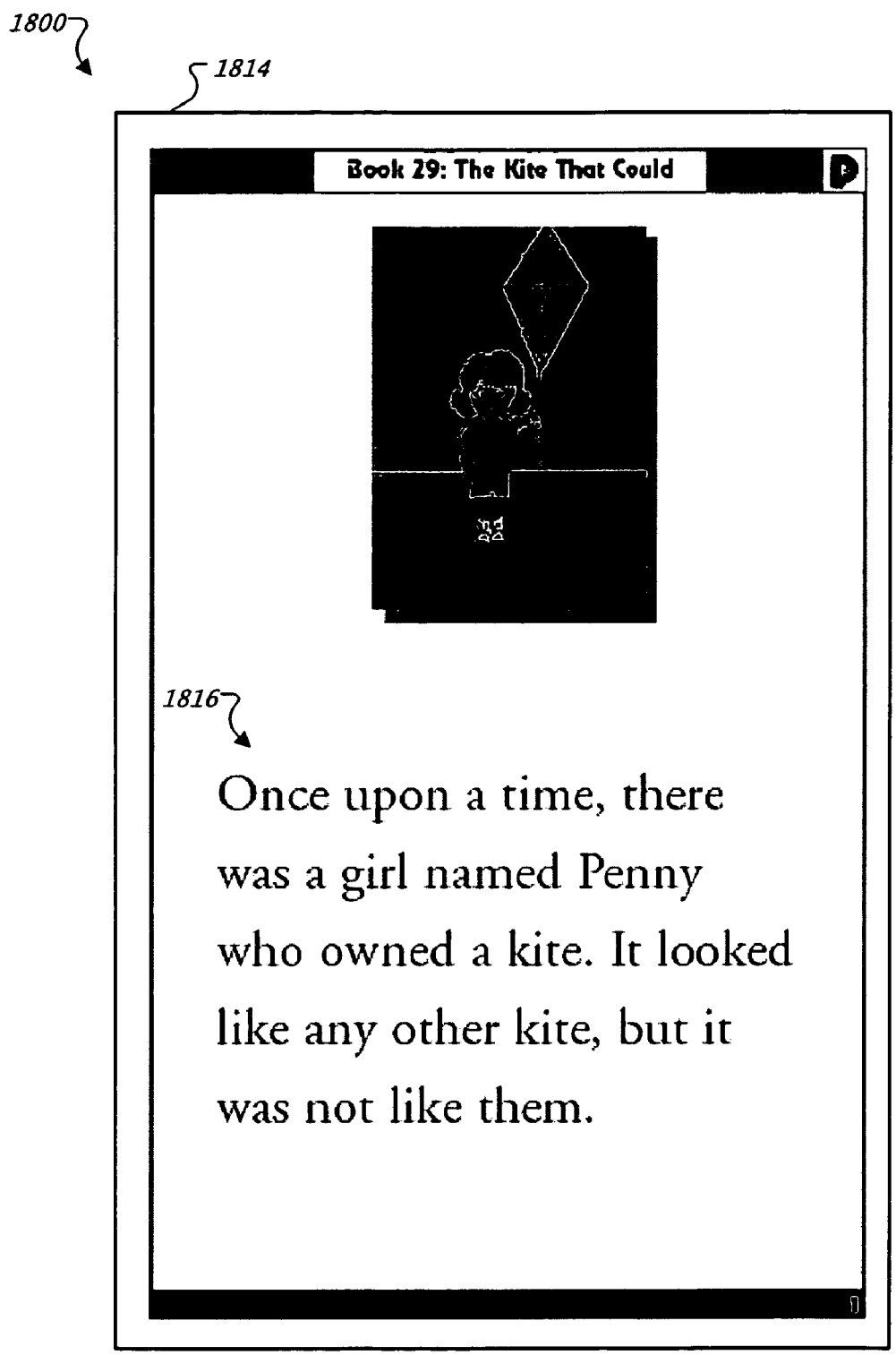

Referring to FIG. 18C, an initial story page 1814 (page "1") in the "The Kite That Could" story book 1800 includes a paragraph 1816. The initial story page 1814 here is much more complex than the initial story pages of earlier story books. For example, the paragraph 1822 here contains multiple sentences, contrasting with the sentence phrases in story books 1300 and 1500 (FIGS. 13C and 15C). In particular, those sentence phrases included some kids in sentence phrase 1316 and a boy in sentence phrase 1522. In addition to increased sentence complexity, the sentences in the first paragraph 1822 use punctuation, including commas and periods. Paragraph 1822 also includes capital letters, including those used at the beginning of sentences. By now (e.g., after completing the previous exercise books 1-29 as described in connection with FIG. 16), the student has learned these generally more complex elements of the English language. It should be understood that the words included in the first paragraph 1822 and other paragraphs (described below) in the "The Kite That Could" story book 1800 have been previously taught in previous exercise books.

Figure 18D:
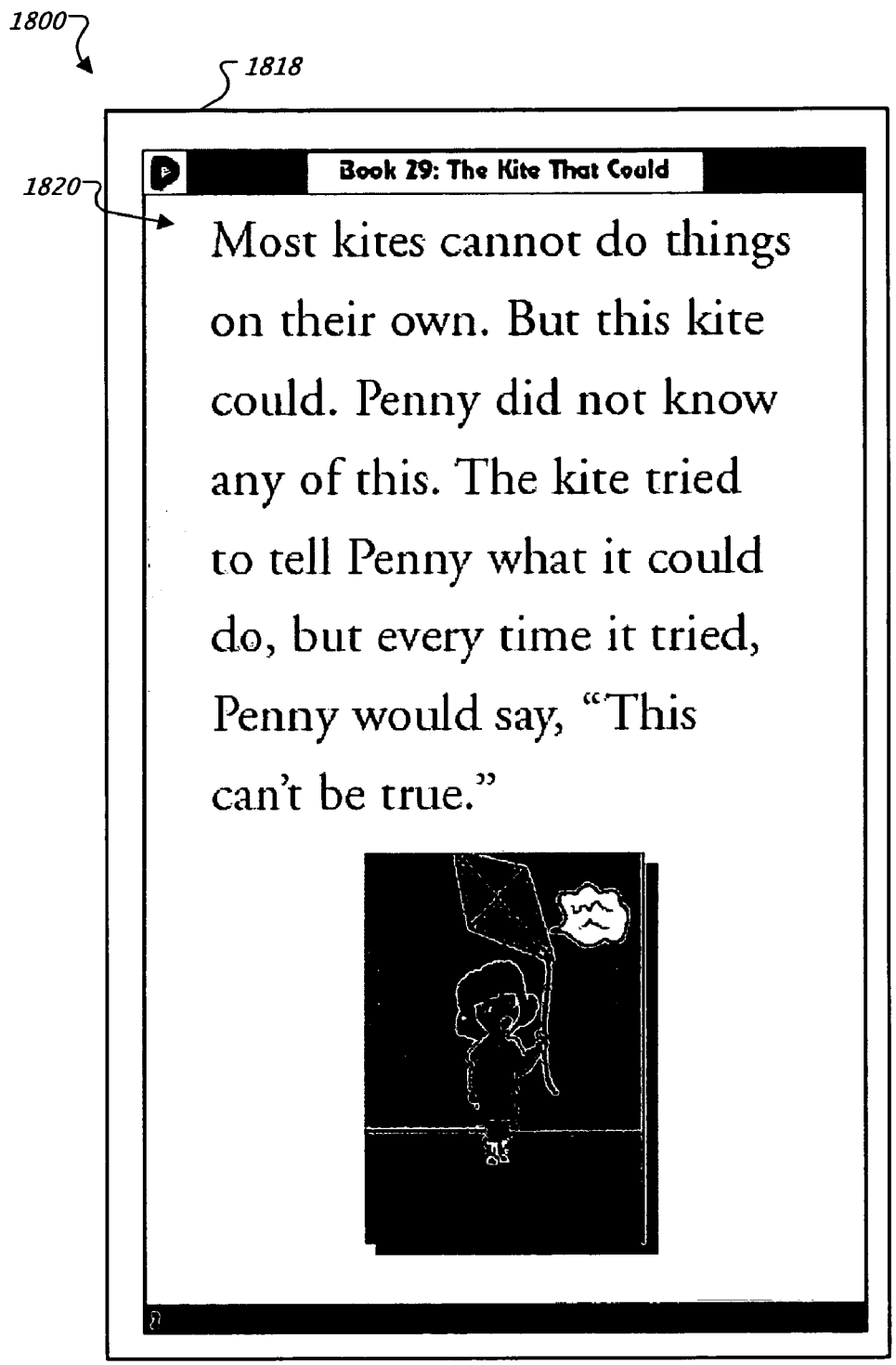

Referring to FIG. 18D, a next story page 1818 (page "2") in the "The Kite That Could" story book 1800 includes a paragraph 1820. In this example, paragraph 1820 continues the story begun on the previous page regarding Penny and her kite. In the last sentence of paragraph 1820, an apostrophe and double quotes are used, indicating that the student has learned additional punctuation in the previous exercise books leading up to the story book 1800. Using double quotes to frame conversation can be used to encourage the student to change voice inflection to indicate conversation while reading the story book out loud.

Figure 18E:
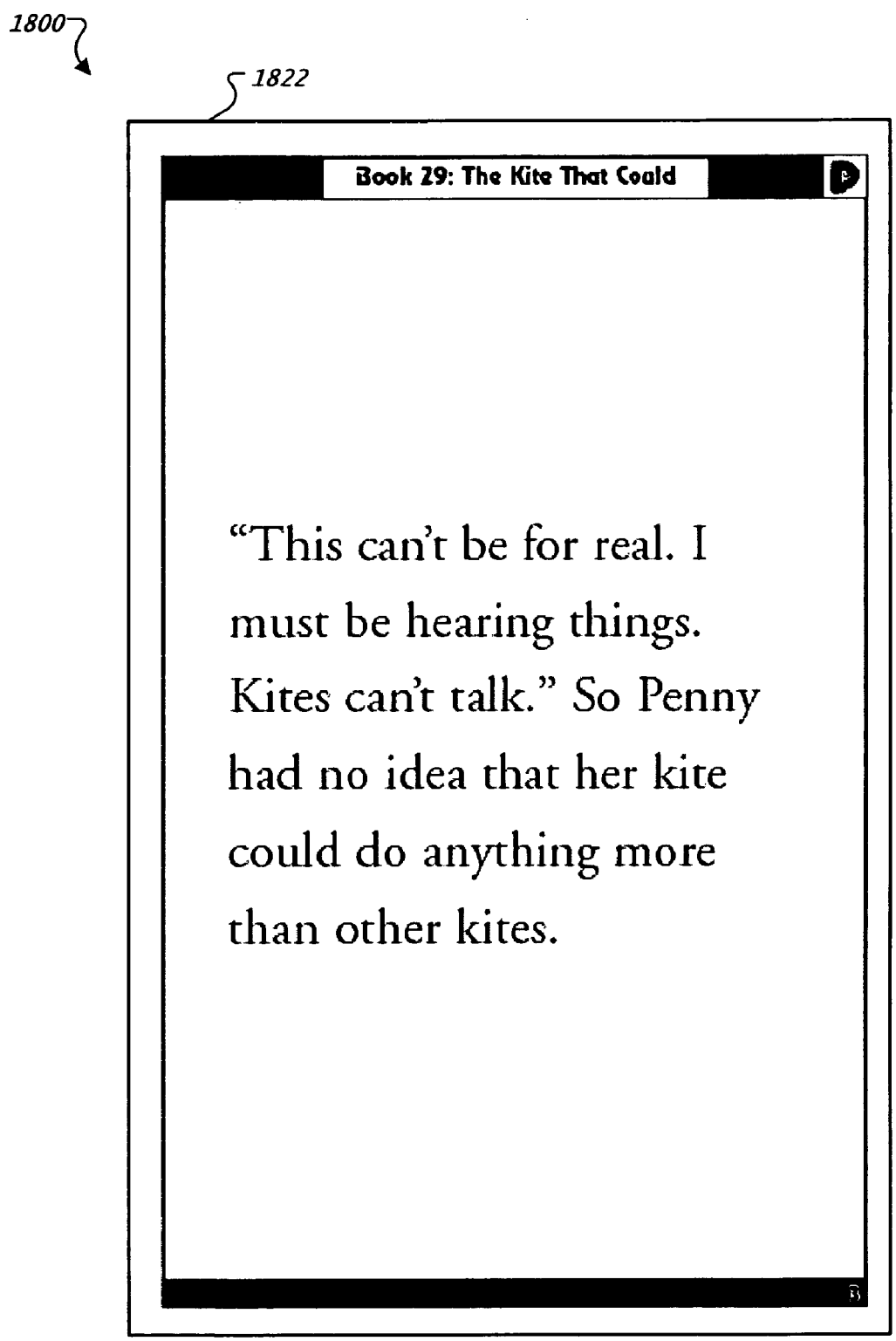

Referring to FIG. 18E, a next story page 1822 (page "3") in the "The Kite That Could" story book 1800 includes text, but no picture. As is common with some books that the student will someday read, not all pages contain pictures. Starting earlier in the literacy system and then continuing throughout, pictures may play a reduced role, because generally more words appear on each story page, focusing the student's attention on reading.

Figure 18F:
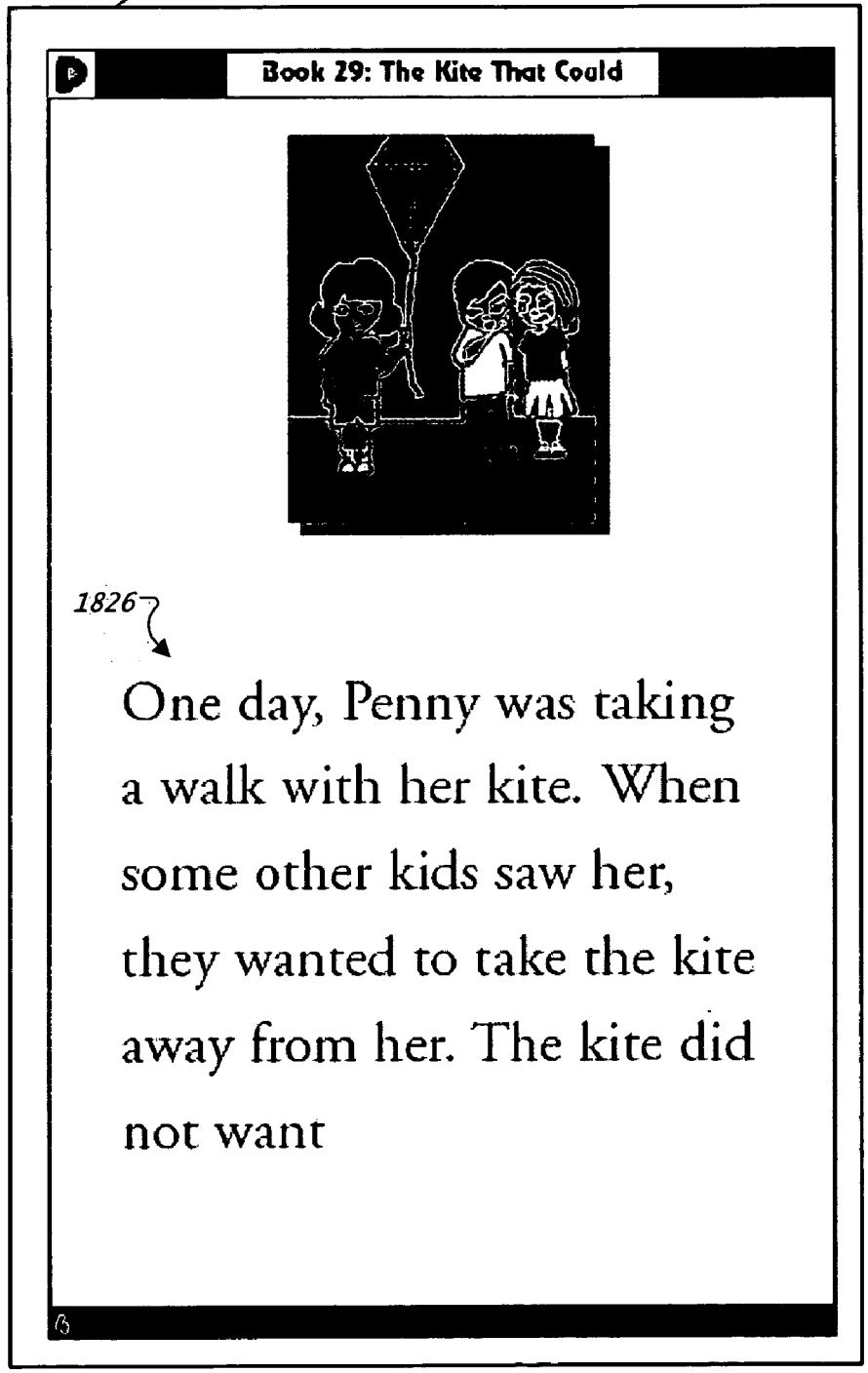
Figure 18G:
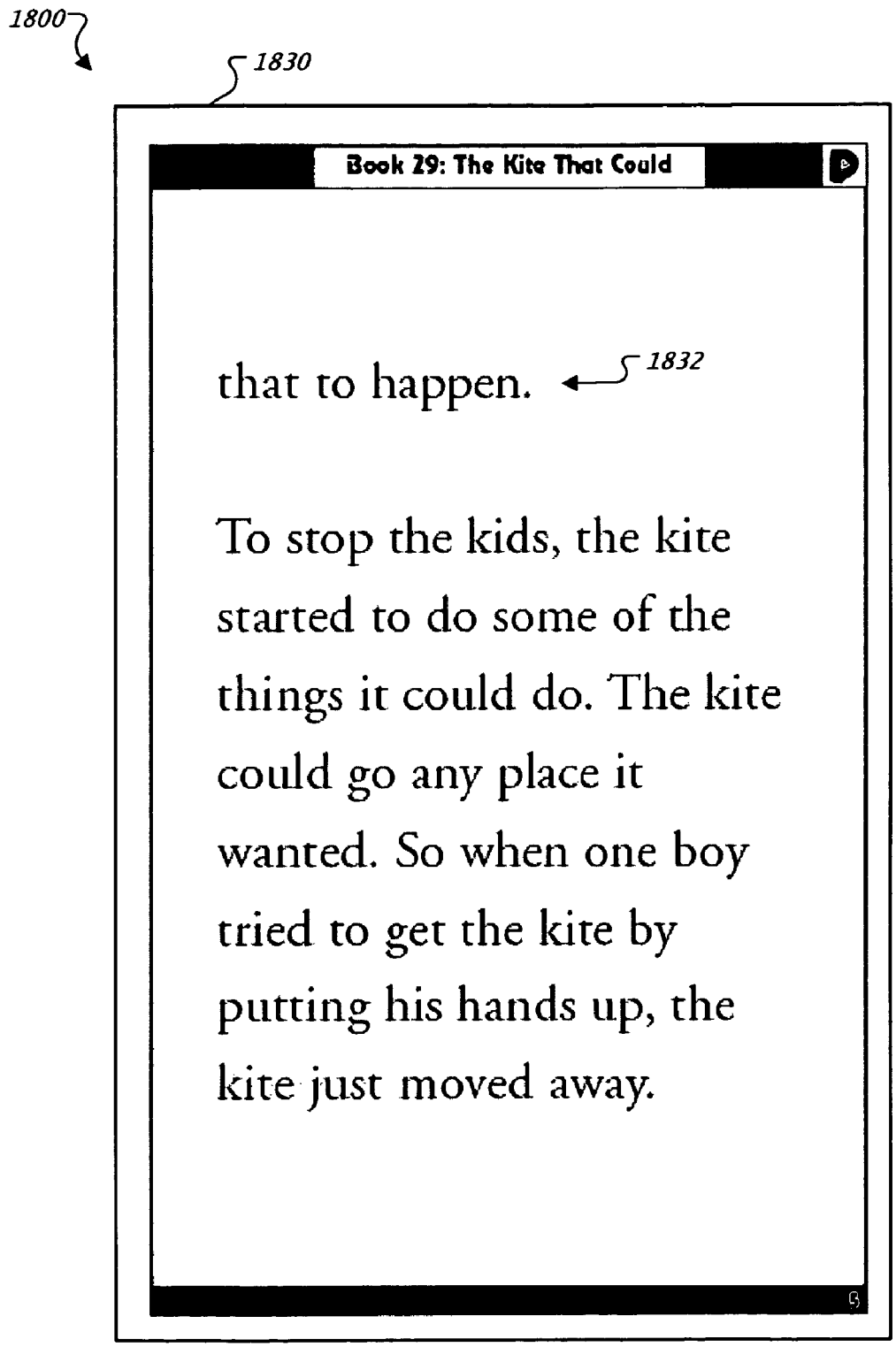

Referring to FIG. 18F, a next story page 1824 (page "4") in the "The Kite That Could" story book 1800 includes a paragraph 1826. In this example, the paragraph 1826 begins on the page, but the last few words of its last sentence are missing and presumed to be on the next page (FIG. 18G). This reinforces the notion that sentences can span pages. As the student reads last sentence "The kite did not want . . . ", the student can learn to quickly turn the page to avoid losing focus.

Referring to FIG. 18G, a next story page 1830 (page "5") in the "The Kite That Could" story book 1800 includes a sentence ending ". . . that to happen." 1832 which completes the sentence from the previous story page 1824 (page "4"). In this example, story page 1830 also contains a complete paragraph of its own.

Figure 18H:
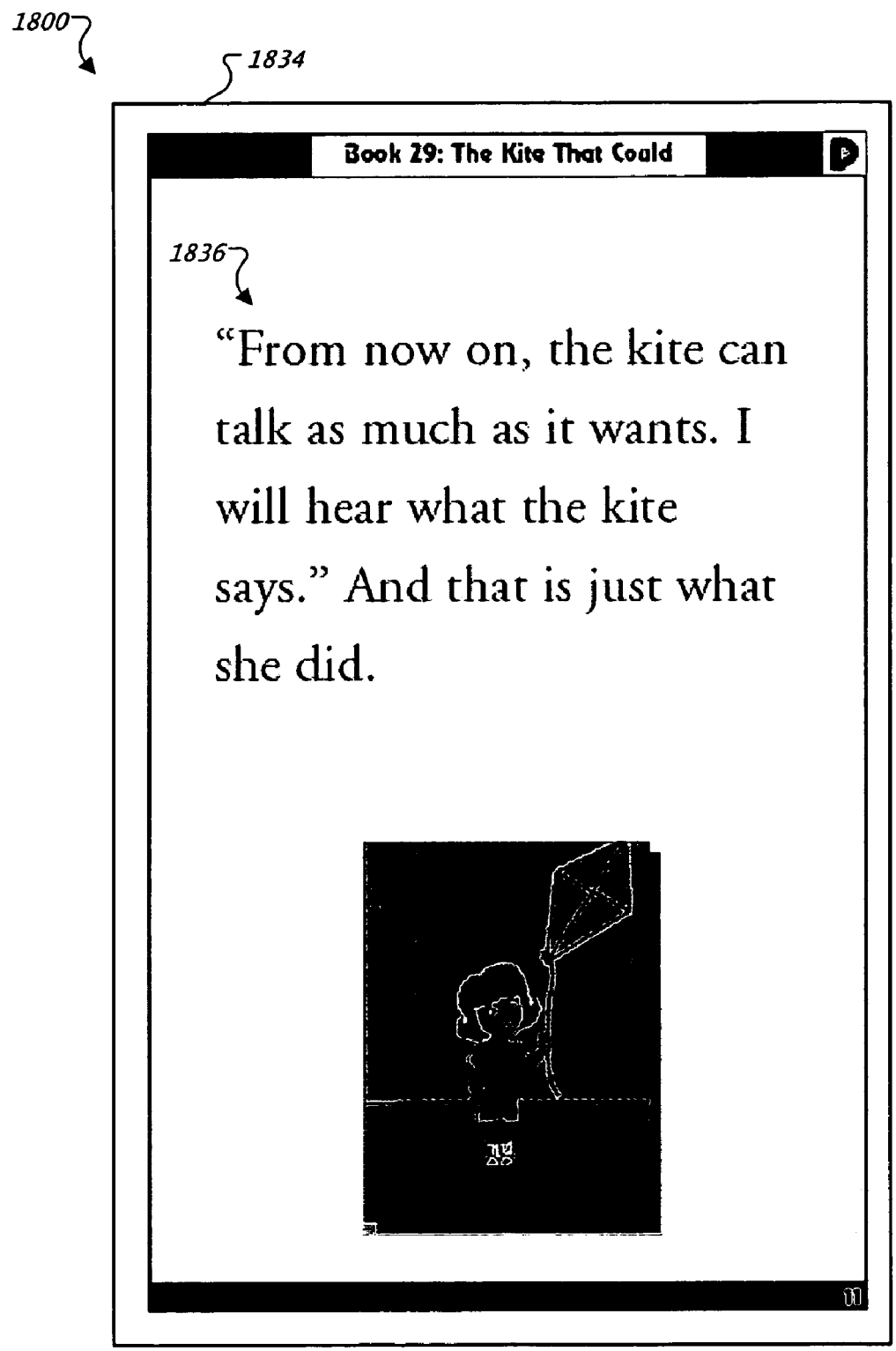

Referring to FIG. 18H, a subsequent story page 1834 (skipping ahead to page "11") in the "The Kite That Could" storybook 1800 includes the final paragraph 1836 of the story book. After successful reading paragraph 1836, the student may proceed to the next page of the story book 1800 which can assess the student's comprehension, as will now be described.

Referring to FIG. 18I, a subsequent "Gleaning Meaning" exercise 1838 (page "12") in the "The Kite That Could" story book 1800 includes a summary of the story book that includes blank lines on which the student is to write the missing words. To help the student through the process of completing the missing words, the "Gleaning Meaning" instructions 1812 (FIG. 18B) can be followed. For example, to complete the first blank line 1840 following "A girl had a . . . ," the student can locate the word kite in the box of choices 1842 and write kite on the blank line 1840. Relying on the box of choices 1842 is optional, and perhaps many of the students reading the "The Kite That Could" story book 1800 can comprehend so much that writing in the missing words is second nature. After writing kid in the first blank line 1840, the student can continue on, reading additional words in the sentence "A girl had a kite that could do many . . . " and arriving at the second blank line 1844. Here, the student can write in things, optionally using the box of choices 1842. The student can also add girl to the third blank line 1846. After adding the missing words to the summary's remaining blank lines, the student can read the entire summary out loud. Such an exercise 1838 can be used to collectively develop a number of language skills, such as phonology, semantics, syntax and text. For example, when the student writes words missing from incomplete sentences and reads the paragraphs containing the those sentences, the student is recognizing and producing the sounds of the letter groupings in words associated with the story book. In another example, when the student reads the completed paragraphs, the student is developing the ability to combine words, in the correct order, to form meaningful messages. In yet another example, when the student completes the summary of the story book and relates it to the story book's subject matter and pictures, the student is developing semantics.

Referring to FIG. 19A, upon completion of the story book 1800, the language skills section 90 can continue with the exercise book 1900, the next exercise book (e.g., exercise book 30) in the literacy system 8. The exercise book 1900 follows completion of exercise book 1700 (e.g., exercise book 29) and its corresponding story book 1800 (e.g., story book 29). In this exemplary embodiment, exercise book 1900 is the last of the thirty exercise books of the language skills section 90 (and the last of level VII 70). An initial instruction sheet 1901 is included at the front of this exercise book 1900, which sheet 1901 lists this exercise's target words: content words 1903 and non-content words 1904. Also, the "What to Do" section on the instruction sheet 1901 provides guidelines for the supervision of the student's learning in this exercise book 1900.

Figure 19B:
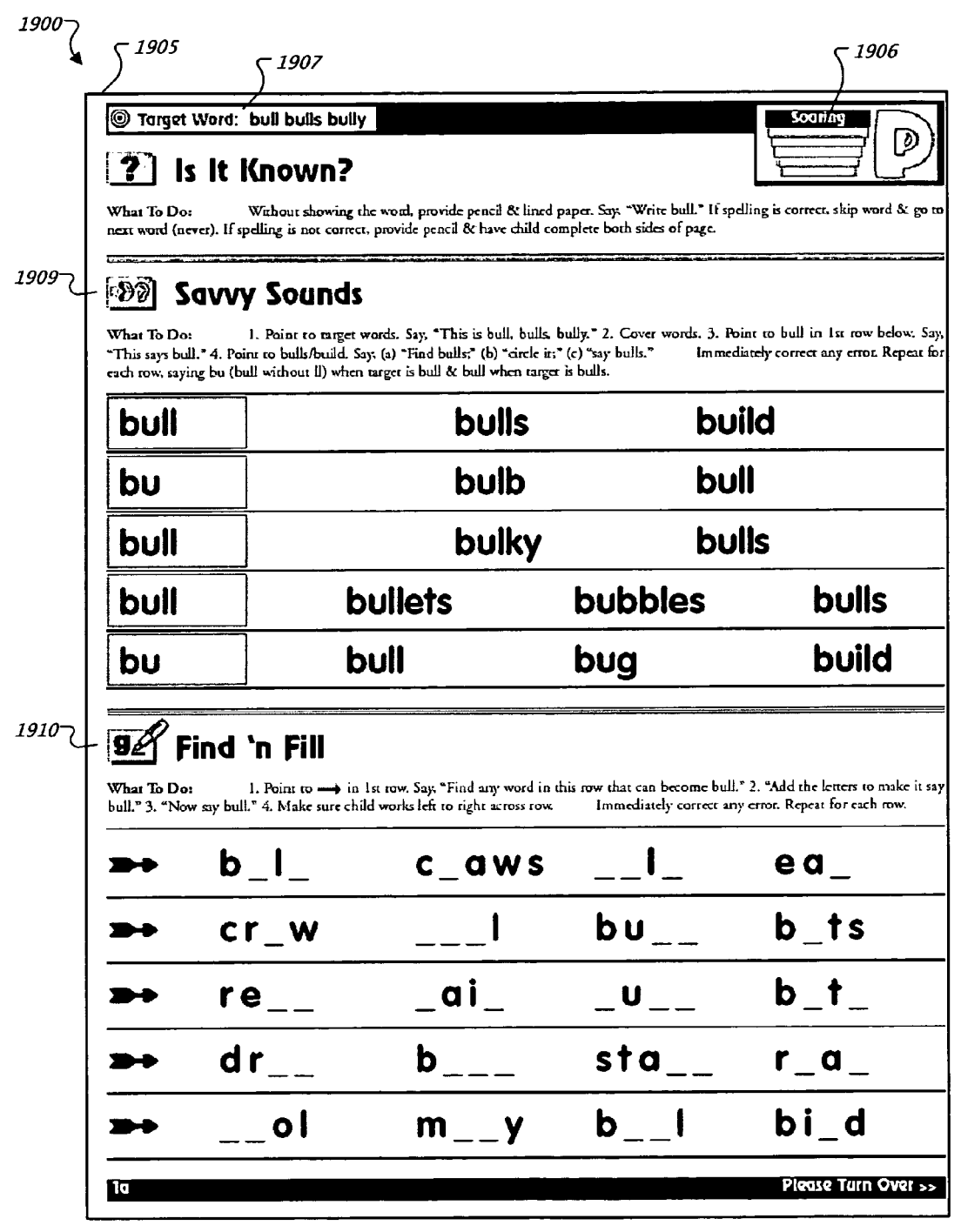

Referring to FIG. 19B, the first session of the exercise book 1900 includes exercises to teach a target word group bull/bulls/bullies 1907, as shown on exercise sheet 1905. To track and reinforce the progress through the various phases of the literacy system 8, the top portion of exercise sheet 1905 includes an icon 1906 which identifies the current level or learning. Here, the "Soaring" level is highlighted, indicating that exercise sheet 1905 is part of that learning level (e.g., level VII 70 in this embodiment). To begin learning the target word group bull/bulls/bullies 1907, the student completes a "Savvy Sounds" exercise 1909, similar to the "Savvy Sounds" exercise 1219 described in connection with FIG. 12B. However, in the "Savvy Sounds" exercise 1909 here, the student is tasked to locate the full version of bulls using the prefix bull, and the full version of bull using the prefix bu.

Still referring to FIG. 19B, the next exercise in exercise sheet 1905 is a "Find 'n Fill" exercise 1910. The exercise 1910 is similar to the "Find 'n Fill" exercise 1230 described in connection with FIG. 12C, but here bull is the target word. After successfully finding the instances of bull in this exercise and filling in the missing letters, the student may proceed to the next exercise in this session.

Referring to FIG. 19C, the next exercise in this session is a "Stay 'n Play" exercise 1912, as shown in exercise sheet 1911. The exercise 1912 is similar to the "Stay 'n Play" exercise 1731 described in connection with FIG. 17E, except the resulting sentences here contain words from the target word group bull/bulls/bullies 1907.

Still referring to FIG. 19C, the next exercise in exercise sheet 1911 is a "Spot 'n Sort" exercise 1913. The exercise 1913 is similar to the "Spot 'n Sort" exercise 1223 described in connection with FIG. 122B, but here bull and bulls are the target words. After successfully finding the instances of bull and bulls in this exercise, the student may proceed to the next session in exercise book 1900.

Referring to FIGS. 19D-E, the next session in the exercise book 1900 teaches a target word pair never/Never 1916. Exercise sheets 1915 and 1919 include a number of previously described exercises, such as a "Write In To Read" exercise 1917, a "Word Scanner" exercise 1918, a "Detect 'n Select" exercise 1921, and a "Letter In" exercise 1922. After successfully completing these exercises, the student may proceed to the next session.

Referring to FIGS. 19F-G, the next session in the exercise book 1900 teaches a target word group head/heads/headed/heading 1926. Exercise sheets 1925 and 1929 include a number of previously described exercises, such as a "Savvy Sounds" exercise 1927, a "Spot 'n Sort" exercise 1928, a "Pick the Picture" exercise 1930, and a "Find 'n Fill" exercise 1931. After successfully completing these exercises, the student may proceed to the next session.

Referring to FIGS. 19H-I, the next session in the exercise book 1900 teaches a target word pair slow/slower 1936. Exercise sheets 1935 and 1939 include a number of previously described exercises, such as a "Savvy Sounds" exercise 1937, a "Spot 'n Sort" exercise 1938, a "Symbol Search" exercise 1940, and a "Find 'n Fill" exercise 1941. After successfully completing these exercises, the student may proceed to the next session.

Referring to FIG. 19J, the next session of the exercise book 1900 teaches a new non-content word, a target word -self 1946, which is a word "particle" not having a direct meaning unto itself. The goal here is to teach the student that the target word -self 1946 can be combined with other words or prefixes to form new words. The first exercise in exercise sheet 1945 is a "Write In To Read" exercise 1948 which is similar to the "Write In To Read" exercise 1249 described in connection with FIG. 12F. Here, the student is asked to combine the target word -self 1946 with prefixes my, him and her in the blanks provided to create myself, himself and herself, respectively. After succeeding in each case, the student can read each completed paragraph. The exercise sheet 1945 also includes a "Word Scanner" exercise 1949 which is similar to the "Word Scanner" exercise 1251 described in connection with FIG. 12F, except the exercise 1949 here focuses on the target word -self 1946. In particular, the student is to find words that end in self, such as himself, itself, herself, yourself and myself. Upon successful completion of all rows in the "Word Scanner" exercise 1949, the student may proceed to the next exercise in this session.

Referring to FIG. 19K, the next exercise in this session includes a "Replace the Space" exercise 1950, as shown in exercise sheet 1947. The "Replace the Space" exercise 1950 here is similar to the "Replace the Space" exercise 1739 described in connection with FIG. 17G, except the exercise 1950 here includes the use of himself which contains the target word -self 1946. Upon completion of the blank lines presented by the "Replace the Space" exercise 1950, the student may proceed to the next exercise in the session.

Still referring to FIG. 19K, exercise sheet 1947 further includes a "Detect 'n Select" exercise 1952. The "Detect 'n Select" exercise 1952 is similar to the "Detect 'n Select" exercise 1260 described in connection with FIG. 12G, except the exercise 1952 here asks the student to find, circle and read words that contain the target word -self 1946. For example, these words can include words such as myself, herself and himself. Upon completion of the boxes presented by the "Detect 'n Select" exercise 1952, the student may proceed to the next session.

Figure 19M:
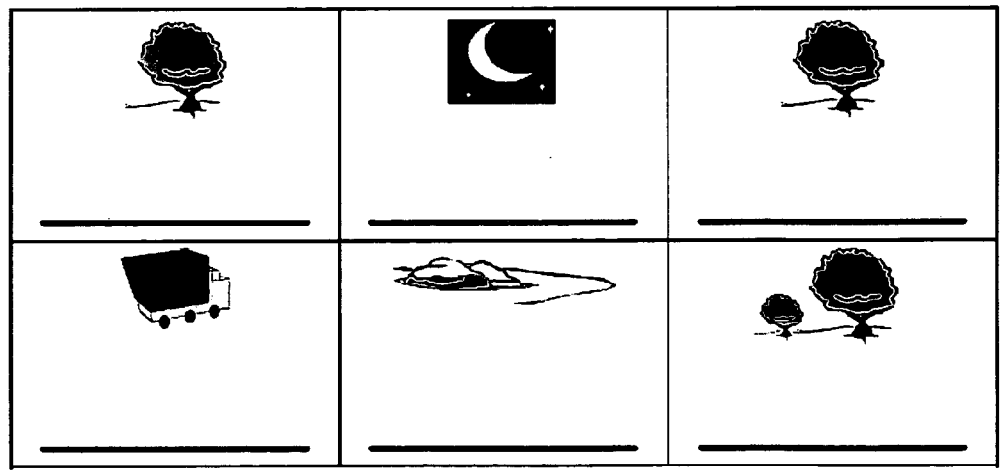
FIGS. 19A-P depict an example last exercise book in the embodiment of the literacy system of FIG. 11.

Referring to FIGS. 19L-M, the next session in the exercise book 1900 teaches a target word pair tree/trees 1956. Exercise sheets 1955 and 1957 include a number of previously described exercises, such as a "Savvy Sounds" exercise 1958, a "Stay 'n Play" exercise 1959, a "Spot 'n Sort" exercise 1960, and a "Pick the Picture" exercise 1962. After successfully completing these exercises, the student may proceed to the next session.

Referring to FIGS. 19N-0, the next session in the exercise book 1900 teaches a target word pair down/Down 1966. Exercise sheets 1965 and 1968 include a number of previously described exercises, such as a "Write In To Read" exercise 1967, a "Word Scanner" exercise 1969, a "Replace the Space" exercise 1970, and a "Detect 'n Select" exercise 1972. After successfully completing these exercises, the student may proceed to a progress check exercise, as indicated by message 1975.

Accordingly, the exercise book 1900 may include a set of exercises (e.g., "Savvy Sounds" exercises (FIGS. 19B, 19F, 19H and 19L), "Spot 'n Sort" exercises (FIGS. 19C, 19F, 19H and 19M), "Pick the Picture" exercises (FIGS. 19G and 19M), "Find 'n Fill" exercises (FIGS. 19B, 19G and 19I), "Stay 'n Play" exercises (FIGS. 19C and 19L), "Write In To Read" exercises (FIGS. 19D, 19J and 19N), "Word Scanner" exercises (FIGS. 19D, 19J and 19N), "Detect 'n Select" exercises (FIGS. 19E, 19K and 19O), "Symbol Search" exercises (FIG. 19I), "Replace the Space" exercises (FIGS. 19K and 19O), and "Letter In" exercises (FIG. 19E)) that collectively teach all four of the language skills of phonology, semantics, syntax, and text. In doing so, the set of exercises do not place a supreme emphasis or focus on "phonics," but instead the set of exercises work in combination to teach all four of the language skills.

Referring to FIG. 19P, in this embodiment of the literacy system 8, exercise book 1900 can further include a progress check sheet 1980 designed to assess the student's ability to write certain target words learned up to this point. This type of progress check sheet 1980 can be included, for example, as the last sheet within each of the five levels 30-70. For example, the progress check sheet 1980 here is the last sheet for the Soaring program (e.g., level VII 70), as indicated by the title 1982. The sheet 1980 includes an introductory statement 1984 to be read by the instructor who is supervising of the student's progress check. Following the statement 1984, a "What to do" section 1986 provides detailed instructions covering instructor and student actions in completing the progress check. For example, the "What to do" section 1986 suggests that the instructor read the first sentence 1987 to the student and have the student write one word at a time, as it is repeated by the instructor, on a clean piece of paper. During the progress check, errors made by the student are not to be corrected by the instructor. After completing the first sentence 1987, the student can repeat the process with the remaining sentences in the sentence table 1988, writing each sentence on a clean sheet of paper. After all sentences are complete, the instructor can score the student's sentences by following the instructions in a scoring section 1990. For example, directions here can inform the instructor to circle totally correct words in each sentence, then count the number of correct words and write that number in the number of words correct column 1992. After summing the correct words for the sentences covered by the progress check, the instructor can use that sum in an "Action to Take" section 1994 to determine a subsequent course of action. For example, if the student manages to correctly write 25 or fewer words, as indicated by box 1996, additional review may be suggested. Otherwise, if the student manages to score 26 or more correct words, as indicated by box 1998, the student can proceed to the story book 2000 (described in detail below).

Figure 20A:
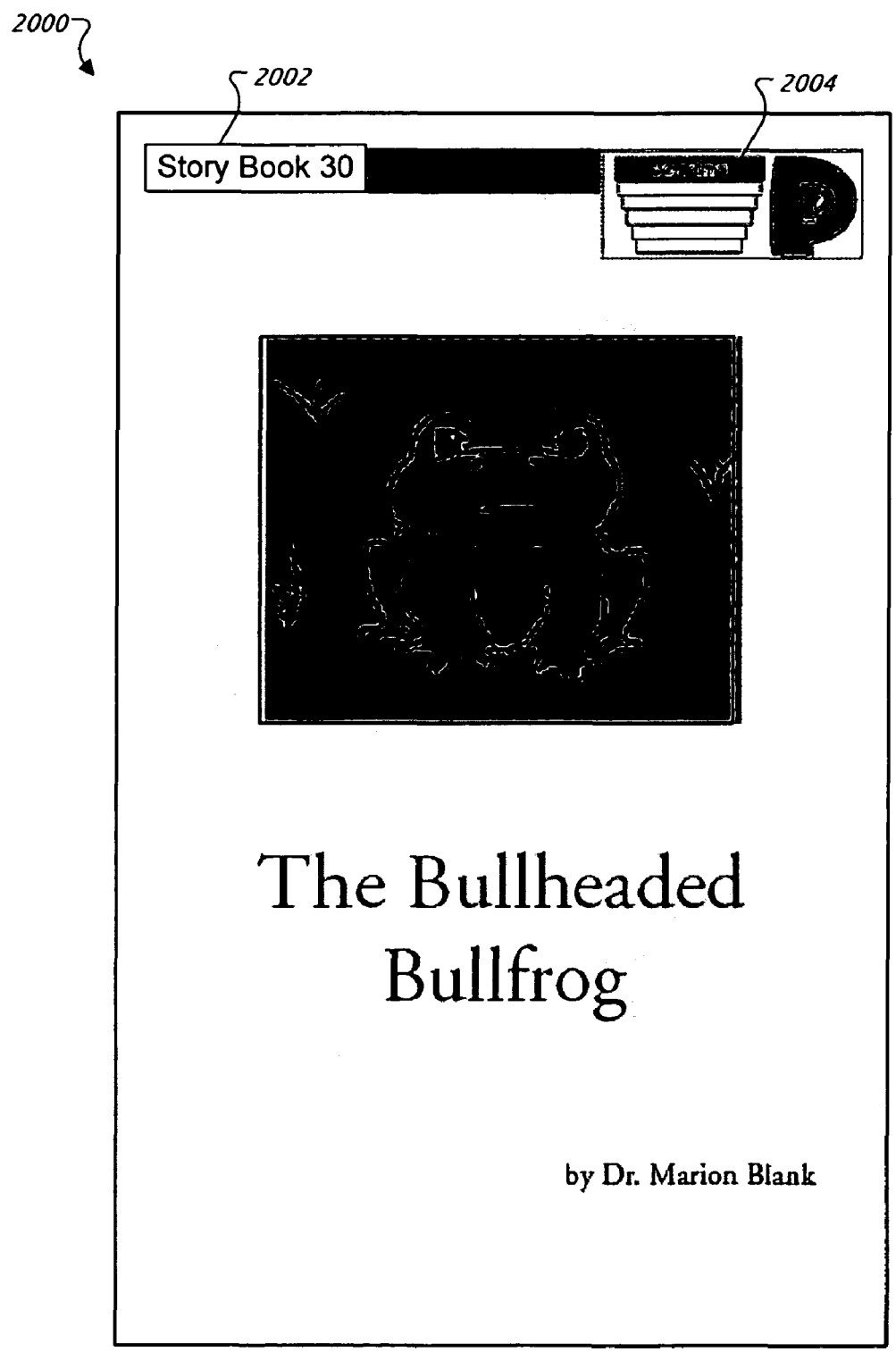

Referring to FIG. 20A, the "The Bullheaded Bullfrog" story book 2000 is an example of a story book associated with the exercise book 1900. A "Story Book 30" label 2002 on the story book's title page identifies the story book 2000 as the thirtieth story book in literacy system 8, which in this embodiment, is the final story book of level VII 70 and the literacy system 8. The title page includes an icon 2004 identifying the current learning level as the "Soaring" level, which matches the icon 1906 on the first exercise sheet 1905 of the corresponding associated exercise book 1900 (FIG. 19B). Similar to previously described story books, the "The Bullheaded Bullfrog" story book 2000 integrates the words that were previously taught in the exercise books leading up to the story book 2000 (refer, for example, to the list of words in FIG. 16 leading up to book "30").

Figure 20B:
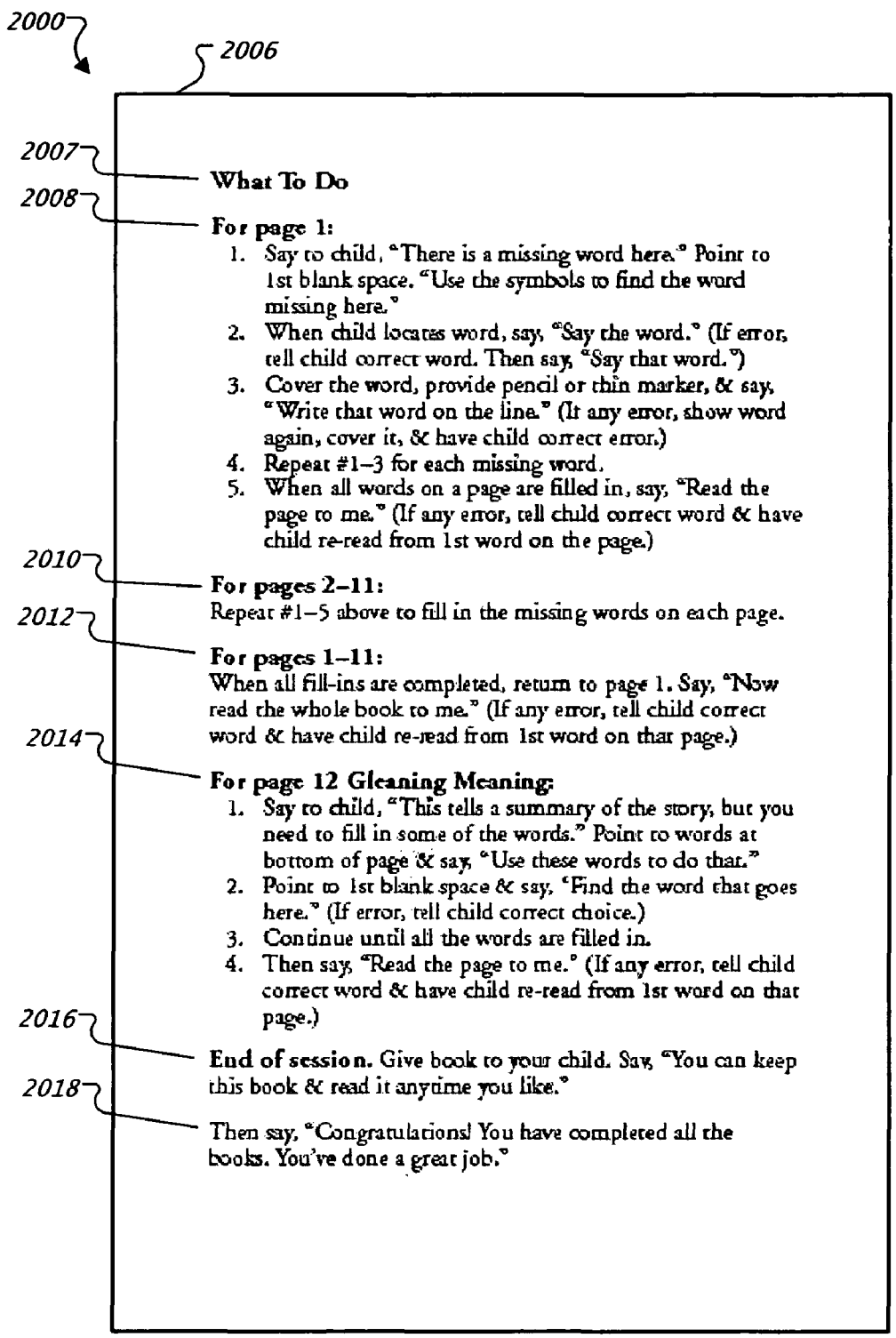

Referring to FIG. 20B, the first page 2006 of the "The Bullheaded Bullfrog" story book 2000 includes a "What To Do" section 2007 that provides guidelines for supervising the student's use of the story book 2000. The exercise book 2000 includes a writing element, so the "What To Do" section 2007 includes instructions 2008 for page "1" of the story book, and instructions 2010 suggest that same instructions be followed for the remainder of the pages in the story. In particular, the student is to follow printed symbols adjacent to blank lines in the story book to find the corresponding words to be written into those blank lines. Once the student has filled in all of the blank lines in the story book 2000, instructions 2012 suggest that the student read the entire book. Instructions 2014 outline the process for completing a "page 12 Gleaning Meaning" comprehension section of the story book. Instructions 2016 explain that the student can keep the story book to "read it anytime." In this example, instructions 2018 suggest that the student be congratulated upon completion of all the books of the literacy system 8 in this embodiment.

Referring to FIG. 20C, an initial story page 2020 (page "1") in the "The Bullheaded Bullfrog" story book 2000 contains sentences that require written completion by the student. For example, a blank line 2022 at the end of the first sentence "Rocky was a . . . " needs the word bullfrog in order to complete the sentence. If the student needs help in determining that bullfrog is the word needed here, the student can use the symbol underneath the blank line 2022, and then look in a box of choices 2024 to find the word corresponding to the matching symbol. Once bullfrog is successfully written into the blank line 2022, the student may proceed to blank line 2026, writing in still, and then to blank line 2028, writing in bullheaded. In each case, the student can use the symbols underneath the blank lines 2026 and 2028 to locate the correct word in the box of choices 2024. Once all blank lines are filled in, the student can read the entire story page 2020.

Figure 20D:
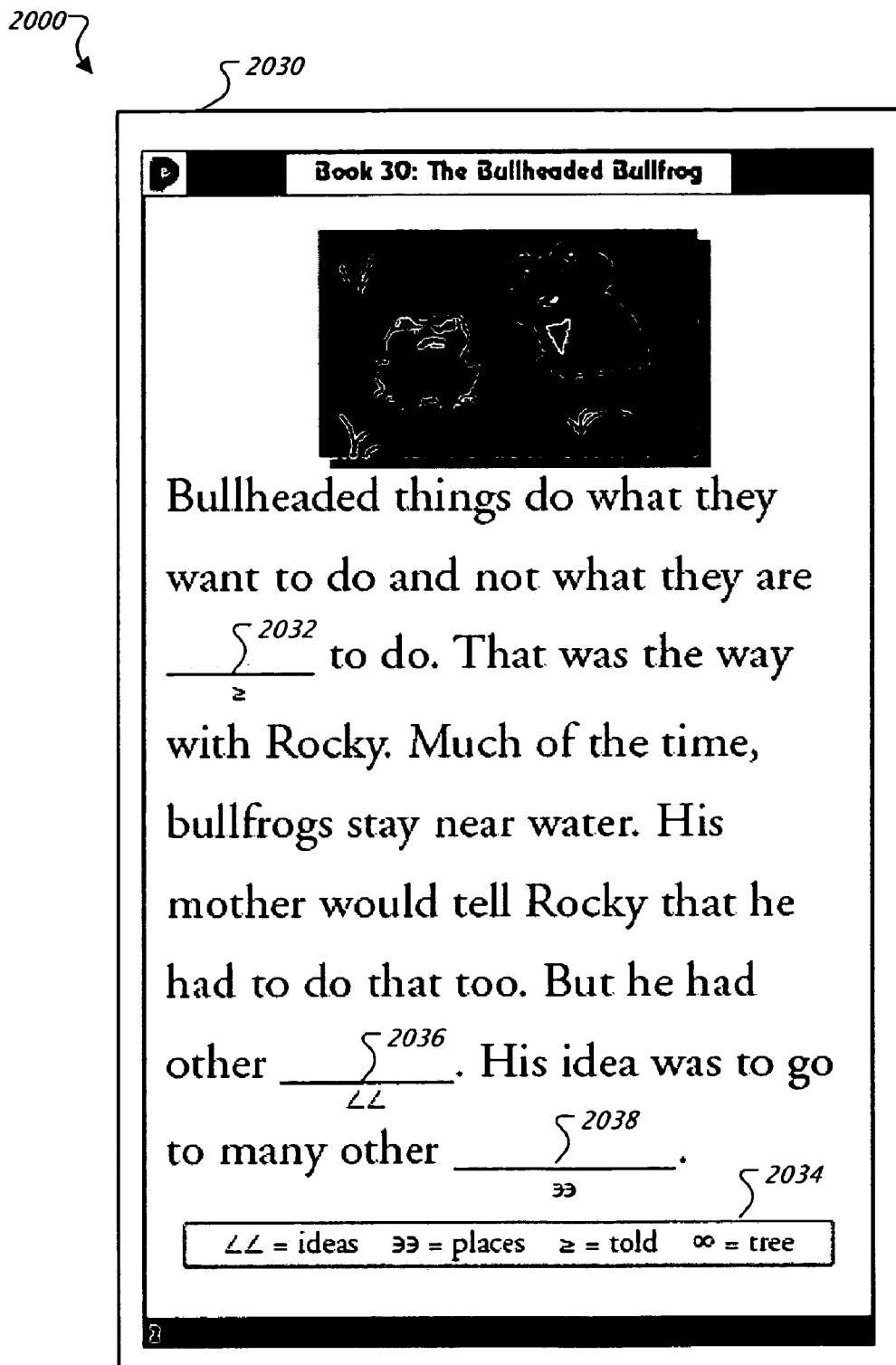

Referring to FIG. 20D, a next story page 2030 (page "2") in the "The Bullheaded Bullfrog" story book 2000 contains additional blank lines that the student is to complete as part of the writing element of the story page 2030. For blank line 2032, the student is expected to look up the word told using the symbol underneath the line that to find the matching one in a choices box 2034. This process continues for blank lines 2036 and 2038 for which the student looks up and writes in the words ideas and places, respectively. After writing in all the missing words, the student can read the entire story page 2030.

Figure 20E:
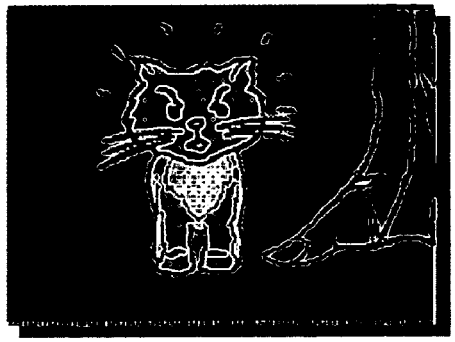

Referring to FIG. 20E, a subsequent story page 2040 (skipping ahead to page "9") in the "The Bullheaded Bullfrog" story book 2000 contains additional blank lines to be completed. For example, to complete blank line 2042, the student can locate the word saw from the box of choices 2044, and write it into the blank line 2042. The student can then repeat the process for blank lines 2046 and 2048, using the words there and now, respectively. Here, the story page 2040 uses an exclamation point and a question mark, both of which add additional dynamics to the story which can enhance reading skills. After successfully writing in the missing words, the student can read the entire story page 2040.

Figure 20F:

Referring to FIG. 20F, a final story page 2050 (skipping ahead to page "11") in the "The Bullheaded Bullfrog" story book 2000 contains the last three blank lines that the student needs to complete. After successfully writing in the missing words, the student can read the entire story page.

Referring to FIG. 20G, a subsequent "Gleaning Meaning" page 2052 (page "12") in the "The Bullheaded Bullfrog" story book 2000 contains a summary of the story book that includes blank lines on which the student is to write the missing words. The "Gleaning Meaning" page 2052 is similar to the "Gleaning Meaning" page 1838 described in connection with FIG. 181, except here it summarizes the story book 2000. After adding the missing words to the summary's blank lines, the student can read the entire summary out loud, thereby finishing the thirtieth and last story book in this particular embodiment of the literacy system 8.

Figure 21:
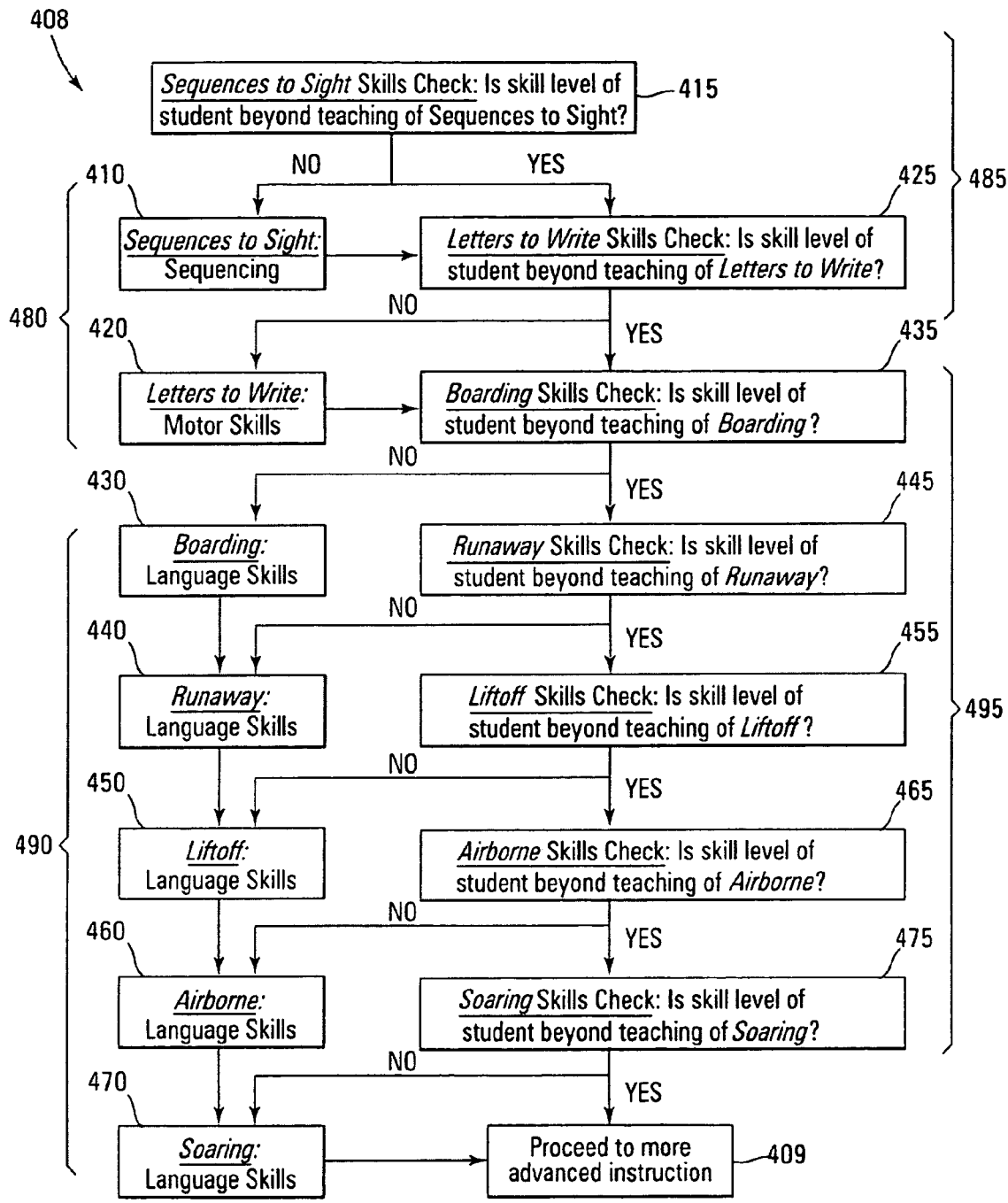
FIG. 21 a flow diagram of a further embodiment of the literacy system.

An exemplary embodiment of a literacy system 408 is shown in FIG. 21, which may be implemented using a computer system, a workbook, an instructional video or classroom presentation, or a combination thereof. Similar to the embodiment shown in FIG. 2, the literacy system 408 teaches the skills of visual sequencing, motor skills, phonology, semantics, syntax, and text via multiple levels of instruction. The first section, termed "Get Set" 480, teaches visual sequencing and motor skills of alphabet writing through two preparation levels: "Sequences to Sight" 410 and "Letters to Write" 420. While both levels 410 and 420 are building blocks for the subsequent levels, they may be independent from each other such that one does not build upon the other. For example, a student may already have the satisfactory motor skills in handwriting, but may not have satisfactory sequencing skills. In such a case, the "Sequences to Sight" Skills Check 415 and the "Letters to Write" Skills Check 425 would show that the student should complete "Sequences to Sight" 410 while bypassing "Letters to Write" 420.

The subsequent levels 430, 440, 450, 460, and 470 teach the language skills of phonology, semantics, syntax, and text while building upon the visual sequencing and motor skills covered in "Get Set" 480. The level progression includes "Boarding" 430, "Runway" 440, "Liftoff" 450, "Airborne" 460, and "Soaring" 470, and the exercises increase in difficulty with each subsequent level. These levels may not isolate each of the language skills in different exercises, but instead the language skills section 490 combines the four language skills (phonology, semantics, syntax, and text) in exercises using content words, non-content words, and books. The content steadily increases in complexity so that with each succeeding level, the words become more intricate, the concepts more abstract, the sentences longer, and the books richer.

A set of skill checks 415, 425, 435, 445, 455, 465, and 475 assess the student's ability such that the student may bypass levels that teach content already known by the student. Similar to the literacy system 8 of FIG. 2, the student may bypass levels by successfully completing skill checks until a particular skill check suggests that the student completes a certain level. The literacy system 408 may be implemented such that the student progresses through the subsequent levels without returning to the skill checks. Alternatively, the literacy system 408 may be implemented such that the student returns to the skill checks on a regular basis to determine if any subsequent levels may be bypassed.

A number of embodiments of the invention have been described. Nevertheless, it will be understood that various modifications may be made without departing from the spirit and scope of the invention. Accordingly, other embodiments are within the scope of the following claims.

What is claimed is:

1. A method for presenting a series of exercise books and story books through a literacy software program to collectively teach all four of the language skills of phonology, semantics, syntax, and text, the method being implemented on a computer system including a computer-readable storage medium comprising executable instructions stored thereon that, when executed, cause the following operations to be performed:
   presenting on a display device, through a computer processor coupled with the display device, a first exercise book of the series of exercise books, each exercise book comprising a set of language skills exercises introducing a targeted set of content words and non-content words;
   determining, at the computer processor, an associated story book to present based on a shared content property of the associated story book and one or more exercise books including the first exercise book after user completion of the one or more exercise books from the series of exercise books, the shared content property being a story of the associated story book consisting only of those content words and non-content words that were introduced by the one or more previously completed exercise books from the series of exercise books such that the user viewing the associated story book on the display device is exposed only to those content words and non-contents words that were previously introduced with the language skills exercises of the one or more previously completed exercise books; and
   presenting on the display device, by the computer processor, the associated story book.

2. The method of claim 1, wherein the user interface device comprises at least one of a keyboard, a computer mouse, and a touchscreen so that the user can interact with the literacy software program.

3. The method of claim 1, wherein the user interface device interacts with at least one of a speech recognition software program and a pattern recognition software program stored on the computer memory storage device so that the user can interact with the literacy software program according to any of spoken words or written text, respectively.

4. The method of claim 1, wherein each exercise book further comprises at least one session and each session comprises at least one exercise, each exercise teaching one or more of the language skills of phonology, semantics, syntax, and text.

5. The method of claim 4, wherein each session uses content words and non-content words and the language skills of phonology, semantics, syntax, and text introduced in any of previously completed sessions or previous completed exercise books.

6. The method of claim 4, wherein each session is directed to only one word in the targeted set of words.

7. The method of claim 4, wherein each session is directed to a target word pair in the set of target words.

8. The method of claim 4, wherein each session comprises at least one of a matching, a writing, and a reading exercise.

9. The method of claim 4, where each session further comprises an assessment instruction to solicit input from the user.

10. The method of claim 9, wherein in response to receiving the input from the user, the literacy software program determines if the user must complete the session or skip ahead to a later session in the exercise book.

11. The computer system method of claim 10, wherein in response to the literacy software program determining that the user must skip ahead to the later session in the exercise book, the computer processor causes the display device to thereafter present the later session.

12. The method of claim 1, wherein each exercise book further comprises a summary section specifying the targeted set of content words and non- content words that the exercise book contains.

13. The method of claim 1, wherein in response to completing the associated story book, the computer processor causes the display device to thereafter present a subsequent exercise book in the series of exercise beak books.

14. The computer system method of claim 1, wherein at least one story book includes at least one missing content word or non-content word so that the user inputs the one or more missing words according to symbols associated with the one or more missing words.

15. A method for presenting a series of exercise books and a series of story books through a literacy software program, the method being implemented on a computer system including a computer-readable storage medium comprising instructions that when executed by a computer processor the following operations to occur:
   presenting on a display device, via the computer processor, a first exercise book of the series of exercise books, each exercise book comprising a set of language skills exercises introducing a targeted set of content words and non-content words; and
   determining, by the computer processor, an associated story book to present based on a shared content property of the associated story book and one or more exercise books including the first exercise book after user completion of the one or more exercise books from the series of exercise books, the shared content property being a story of the associated story book consisting only of those content words and non-content words that were introduced by the one or more previously completed exercise books from the series of exercise books such that the user viewing the associated story book on the display device is exposed only to those content words and non-contents words that were previously introduced with the language skills exercises of the one or more previously completed exercise books.

16. The method of claim 15, wherein the literary software program interacts with at least one of a speech recognition software program and a pattern recognition software program so that the user can interact with the literacy software program according to any of spoken words or written text, respectively.

17. The method of claim 15, wherein each exercise book further comprises at least one session and each session comprises at least one exercise, each exercise teaching one or more of the language skills of phonology, semantics, syntax, and text.

18. The method of claim 17, wherein each session uses content words and non-content words and the language skills of phonology, semantics, syntax, and text introduced in any of previously completed sessions or previous completed exercise books.

19. The method of claim 17, wherein each session is directed to only one word in the targeted set of words.

20. The method of claim 17, wherein each session is directed to a target word pair in the set of target words.

21. The method of claim 17, wherein each session comprises at least one of a matching, a writing, and a reading exercise.

22. The method of claim 17, where each session further comprises an assessment instruction to solicit input from the user.

23. The method of claim 22, wherein in response to receiving the input from the user, the literacy software program determines if the user must complete the session or skip ahead to a later session in the exercise book.

24. The method of claim 23, wherein in response to the literacy software program determining that the user must skip ahead to the later session in the exercise book, the literacy software program thereafter presents the later session.

25. The method of claim 15, wherein each exercise book further comprises a summary section specifying the targeted set of content words and non-content words that the exercise book contains.

26. The method of claim 15, wherein in response to completing the associated story book, a subsequent exercise book in the series of exercise books is immediately presented on the display device.

27. The method of claim 15, wherein at least one story book includes at least one missing content word or non-content word so that the user inputs the one or more missing words according to symbols associated with the one or more missing words.

* * * * *